US006034790A

United States Patent [19]

Kamei et al.

[11] Patent Number: 6,034,790

[45] Date of Patent: Mar. 7, 2000

[54] SOFT-STARTING SYSTEM FOR A LAMP IN AN IMAGE FORMING DEVICE OR THE LIKE

[75] Inventors: Naoyuki Kamei; Koichi Eto, both of Nara, Japan

[73] Assignee: Sharp Kabushiki Kaisha, Osaka, Japan

[21] Appl. No.: 08/957,724

[22] Filed: Oct. 24, 1997

[30] Foreign Application Priority Data

Oct. 25, 1996 [JP] Japan .................................... 8-284287

[51] Int. Cl.[7] ........................................................ H04N 1/04

[52] U.S. Cl. .......................... 358/475; 358/474; 358/471; 315/307; 315/197; 315/198; 315/199; 399/50

[58] Field of Search ............................... 399/220, 50, 44, 399/43, 41; 358/475; 315/307, 194–199, DIG. 2

[56] References Cited

U.S. PATENT DOCUMENTS

| | | | |
|---|---|---|---|
| 4,680,536 | 7/1987 | Roszel et al. | 323/321 |
| 4,855,648 | 8/1989 | Yagasaki | 315/307 |
| 5,057,867 | 10/1991 | Ishigaki et al. | 355/208 |
| 5,331,433 | 7/1994 | Sato | 399/43 |

FOREIGN PATENT DOCUMENTS 4-10634 8/1983 Japan .

OTHER PUBLICATIONS

American Microsemiconductor, inc.; Tutorial: Triac; www.americanmicrosemi.com/tutorials/triac.htm, Jul. 20, 1999.

American Microsemiconductor, inc.; Tutorial: SCR; www.americanmicrosemi.com/tutorials/scr.htm, Jul. 20, 1999.

*Primary Examiner*—Edward L. Coles
*Assistant Examiner*—Coulter Henry
*Attorney, Agent, or Firm*—David G. Conlin; David A. Tucker

[57] ABSTRACT

A lamp power supply circuit for an image forming device, which is not provided with a full-wave rectifier and any additional noise reducing circuit but is capable of effectively suppressing inrush current not to produce noise that may cause erroneous operation of the image forming device and affect any external appliance. A lamp lighting control system for use in an image forming device, which can realize soft-starting of an exposure lamp or a fixing heater-lamp by gradually increasing a conducting angle $\beta_i$ (i=0, 1 . . . ) for applying a voltage to a lamp through phase control of an AC power-supply voltage $V_{AC}$ for an initial period of energizing the exposure lamp or the fixing heater-lamp. Wherein, the conducting angle is gradually increased per even-number unit of cycles of AC power-supply voltage $V_{AC}$ on the condition that even numbers of cycles in the same unit have the same conducting angle, e.g., $\beta_0=\beta_1<\beta_2=\beta_3<\beta_4=\beta_5<\beta_6=\beta_7< . . . <\beta_{16}=\beta_{17}$.

12 Claims, 36 Drawing Sheets

FIG.5

(a)

42a

| COUNT VALUE OF ZERO-CROSS -COUNTER VARIABLE Nz | TIME-INTERVAL $t_i$ TO BE PRESET ON TIMER |
|---|---|
| 0 | $t_0$ = 9 msec |
| 1 | $t_1$ = 9 msec |
| 2 | $t_2$ = 8 msec |
| 3 | $t_3$ = 8 msec |
| 4 | $t_4$ = 7 msec |
| 5 | $t_5$ = 7 msec |
| 6 | $t_6$ = 6 msec |
| 7 | $t_7$ = 6 msec |
| 8 | $t_8$ = 5 msec |
| 9 | $t_9$ = 5 msec |
| 10 | $t_{10}$ = 4 msec |
| 11 | $t_{11}$ = 4 msec |
| 12 | $t_{12}$ = 3 msec |
| 13 | $t_{13}$ = 3 msec |
| 14 | $t_{14}$ = 2 msec |
| 15 | $t_{15}$ = 2 msec |
| 16 | $t_{16}$ = 1 msec |
| 17 | $t_{17}$ = 1 msec |

( TRIGGER TIMING TABLE )

(b)

| FIRING ANGLE $\alpha_i$ | CONDUCTING ANGLE $\beta_i$ |
|---|---|
| $\alpha_0$ (= $\alpha_1$) | $\beta_0$ (= $\beta_1$) |
| $\alpha_1$ (= $\alpha_0$) | $\beta_1$ (= $\beta_0$) |
| $\alpha_2$ (= $\alpha_3$) | $\beta_2$ (= $\beta_3$) |
| $\alpha_3$ (= $\alpha_2$) | $\beta_3$ (= $\beta_2$) |
| $\alpha_4$ (= $\alpha_5$) | $\beta_4$ (= $\beta_5$) |
| $\alpha_5$ (= $\alpha_4$) | $\beta_5$ (= $\beta_4$) |
| $\alpha_6$ (= $\alpha_7$) | $\beta_6$ (= $\beta_7$) |
| $\alpha_7$ (= $\alpha_6$) | $\beta_7$ (= $\beta_6$) |
| $\alpha_8$ (= $\alpha_9$) | $\beta_8$ (= $\beta_9$) |
| $\alpha_9$ (= $\alpha_8$) | $\beta_9$ (= $\beta_8$) |
| $\alpha_{10}$ (= $\alpha_{11}$) | $\beta_{10}$ (= $\beta_{11}$) |
| $\alpha_{11}$ (= $\alpha_{10}$) | $\beta_{11}$ (= $\beta_{10}$) |
| $\alpha_{12}$ (= $\alpha_{13}$) | $\beta_{12}$ (= $\beta_{13}$) |
| $\alpha_{13}$ (= $\alpha_{12}$) | $\beta_{13}$ (= $\beta_{12}$) |
| $\alpha_{14}$ (= $\alpha_{15}$) | $\beta_{14}$ (= $\beta_{15}$) |
| $\alpha_{15}$ (= $\alpha_{14}$) | $\beta_{15}$ (= $\beta_{14}$) |
| $\alpha_{16}$ (= $\alpha_{17}$) | $\beta_{16}$ (= $\beta_{17}$) |
| $\alpha_{17}$ (= $\alpha_{16}$) | $\beta_{17}$ (= $\beta_{16}$) |

FIG.10

(a)

42b

| COUNT VALUE OF ZERO-CROSS -COUNTER VARIABLE Nz | TIME INTERVAL ti TO BE PRESET ON TIMER |
|---|---|
| 0 | $t_0$ = 9 msec |
| 1 | $t_1$ = 9 msec |
| 2 | $t_2$ = 8 msec |
| 3 | $t_3$ = 8 msec |
| 4 | $t_4$ = 8 msec |
| 5 | $t_5$ = 8 msec |
| 6 | $t_6$ = 8 msec |
| 7 | $t_7$ = 8 msec |
| 8 | $t_8$ = 7 msec |
| 9 | $t_9$ = 7 msec |
| 10 | $t_{10}$ = 6 msec |
| 11 | $t_{11}$ = 6 msec |
| 12 | $t_{12}$ = 5 msec |
| 13 | $t_{13}$ = 5 msec |
| 14 | $t_{14}$ = 4 msec |
| 15 | $t_{15}$ = 4 msec |
| 16 | $t_{16}$ = 3 msec |
| 17 | $t_{17}$ = 3 msec |
| 18 | $t_{18}$ = 2 msec |
| 19 | $t_{19}$ = 2 msec |
| 20 | $t_{20}$ = 1 msec |
| 21 | $t_{21}$ = 1 msec |

( TRIGGER TIMING TABLE )

(b)

| FIRING ANGLE $\alpha i$ | CONDUCTING ANGLE $\beta i$ |
|---|---|
| $\alpha_0$ (= $\alpha_1$) | $\beta_0$ (= $\beta_1$) |
| $\alpha_1$ (= $\alpha_0$) | $\beta_1$ (= $\beta_0$) |
| $\alpha_2$ (= $\alpha_3$) | $\beta_2$ (= $\beta_3$) |
| $\alpha_3$ (= $\alpha_2$) | $\beta_3$ (= $\beta_2$) |
| $\alpha_4$ (= $\alpha_2$) | $\beta_4$ (= $\beta_2$) |
| $\alpha_5$ (= $\alpha_2$) | $\beta_5$ (= $\beta_2$) |
| $\alpha_6$ (= $\alpha_2$) | $\beta_6$ (= $\beta_2$) |
| $\alpha_7$ (= $\alpha_2$) | $\beta_7$ (= $\beta_2$) |
| $\alpha_8$ (= $\alpha_9$) | $\beta_8$ (= $\beta_9$) |
| $\alpha_9$ (= $\alpha_8$) | $\beta_9$ (= $\beta_8$) |
| $\alpha_{10}$ (= $\alpha_{11}$) | $\beta_{10}$ (= $\beta_{11}$) |
| $\alpha_{11}$ (= $\alpha_{10}$) | $\beta_{11}$ (= $\beta_{10}$) |
| $\alpha_{12}$ (= $\alpha_{13}$) | $\beta_{12}$ (= $\beta_{13}$) |
| $\alpha_{13}$ (= $\alpha_{12}$) | $\beta_{13}$ (= $\beta_{12}$) |
| $\alpha_{14}$ (= $\alpha_{15}$) | $\beta_{14}$ (= $\beta_{15}$) |
| $\alpha_{15}$ (= $\alpha_{14}$) | $\beta_{15}$ (= $\beta_{14}$) |
| $\alpha_{16}$ (= $\alpha_{17}$) | $\beta_{16}$ (= $\beta_{17}$) |
| $\alpha_{17}$ (= $\alpha_{16}$) | $\beta_{17}$ (= $\beta_{16}$) |
| $\alpha_{18}$ (= $\alpha_{19}$) | $\beta_{18}$ (= $\beta_{19}$) |
| $\alpha_{19}$ (= $\alpha_{18}$) | $\beta_{19}$ (= $\beta_{18}$) |
| $\alpha_{20}$ (= $\alpha_{21}$) | $\beta_{20}$ (= $\beta_{21}$) |
| $\alpha_{21}$ (= $\alpha_{20}$) | $\beta_{21}$ (= $\beta_{20}$) |

FIG.12

| FIG.12A | FIG.12B | FIG.12C |
|---|---|---|

FIG.12A (a)

42c

| COUNT VALUE OF ZERO-CROSS-COUNTER VARIABLE Nz | TIME-INTERVAL ti ON TIMER |
|---|---|
| 0 | 3 msec |
| 1 | 3 msec |
| 2 | 2 msec |
| 3 | 2 msec |
| 4 | 1 msec |
| 5 | 1 msec |

#1 (85～90V)

(b)

42d

| COUNT VALUE OF ZERO-CROSS-COUNTER VARIABLE Nz | TIME-INTERVAL ti ON TIMER |
|---|---|
| 0 | 4 msec |
| 1 | 4 msec |
| 2 | 3 msec |
| 3 | 3 msec |
| 4 | 2 msec |
| 5 | 2 msec |
| 6 | 1 msec |
| 7 | 1 msec |

#2 (90～95V)

(c)

42e

| COUNT VALUE OF ZERO-CROSS-COUNTER VARIABLE Nz | TIME-INTERVAL ti ON TIMER |
|---|---|
| 0 | 5 msec |
| 1 | 5 msec |
| 2 | 4 msec |
| 3 | 4 msec |
| 4 | 3 msec |
| 5 | 3 msec |
| 6 | 2 msec |
| 7 | 2 msec |
| 8 | 1 msec |
| 9 | 1 msec |

#3 (95～100V)

FIG.12B (d)

42f

| COUNT VALUE OF ZERO-CROSS-COUNTER VARIABLE Nz | TIME-INTERVAL ti ON TIMER |
|---|---|
| 0 | 6 msec |
| 1 | 6 msec |
| 2 | 5 msec |
| 3 | 5 msec |
| 4 | 4 msec |
| 5 | 4 msec |
| 6 | 3 msec |
| 7 | 3 msec |
| 8 | 2 msec |
| 9 | 2 msec |
| 10 | 1 msec |
| 11 | 1 msec |

#4 (100~105V)

(e)

42g

| COUNT VALUE OF ZERO-CROSS-COUNTER VARIABLE Nz | TIME-INTERVAL ti ON TIMER |
|---|---|
| 0 | 7 msec |
| 1 | 7 msec |
| 2 | 6 msec |
| 3 | 6 msec |
| 4 | 5 msec |
| 5 | 5 msec |
| 6 | 4 msec |
| 7 | 4 msec |
| 8 | 3 msec |
| 9 | 3 msec |
| 10 | 2 msec |
| 11 | 2 msec |
| 12 | 1 msec |
| 13 | 1 msec |

#5 (105~110V)

(f)

42h

| COUNT VALUE OF ZERO-CROSS-COUNTER VARIABLE Nz | TIME-INTERVAL ti ON TIMER |
|---|---|
| 0 | 8 msec |
| 1 | 8 msec |
| 2 | 7 msec |
| 3 | 7 msec |
| 4 | 6 msec |
| 5 | 6 msec |
| 6 | 5 msec |
| 7 | 5 msec |
| 8 | 4 msec |
| 9 | 4 msec |
| 10 | 3 msec |
| 11 | 3 msec |
| 12 | 2 msec |
| 13 | 2 msec |
| 14 | 1 msec |
| 15 | 1 msec |

#6 (110~115V)

FIG.12C (g)

42i

| COUNT VALUE OF ZERO-CROSS-COUNTER VARIABLE Nz | TIME-INTERVAL ti ON TIMER |
|---|---|
| 0 | 9 msec |
| 1 | 9 msec |
| 2 | 8 msec |
| 3 | 8 msec |
| 4 | 7 msec |
| 5 | 7 msec |
| 6 | 6 msec |
| 7 | 6 msec |
| 8 | 5 msec |
| 9 | 5 msec |
| 10 | 4 msec |
| 11 | 4 msec |
| 12 | 3 msec |
| 13 | 3 msec |
| 14 | 2 msec |
| 15 | 2 msec |
| 16 | 1 msec |
| 17 | 1 msec |

#7 (115V MORE)

FIG.13

42j

| DIGITAL VALUE OF DETECTED POWER-SUPPLY VOLTAGE AFTER ANALOG-TO-DIGITAL CONVERSION | TRIGGER TIMING TABLE NUMBER |
|---|---|
| 0 H | #1 |
| 1 H | #2 |
| 2 H | #3 |
| 3 H | #4 |
| 4 H | #5 |
| 5 H | #6 |
| 6 H | #7 |

(DETECTED VOLTAGE-TABLE NUMBER-CORRELATION TABLE)

FIG.16A

42m

| COUNT VALUE OF ZERO-CROSS -COUNTER VARIABLE Nz | TIME INTERVAL ti TO BE PRESET ON TIMER |
|---|---|
| 0 | 9 msec |
| 1 | 9 msec |
| 2 | 8 msec |
| 3 | 8 msec |
| 4 | 7 msec |
| 5 | 7 msec |
| 6 | 6 msec |
| 7 | 6 msec |
| 8 | 5 msec |
| 9 | 5 msec |
| 10 | 4 msec |
| 11 | 4 msec |
| 12 | 3 msec |
| 13 | 3 msec |
| 14 | 2 msec |
| 15 | 2 msec |
| 16 | 1 msec |
| 17 | 1 msec |

(TRIGGER TIMING TABLE FOR 50Hz)

FIG.16B

42n

| COUNT VALUE OF ZERO-CROSS -COUNTER VARIABLE Nz | TIME INTERVAL ti TO BE PRESET ON TIMER |
|---|---|
| 0 | 6msec |
| 1 | 6msec |
| 2 | 5msec |
| 3 | 5msec |
| 4 | 4msec |
| 5 | 4msec |
| 6 | 3msec |
| 7 | 3msec |
| 8 | 2 msec |
| 9 | 2 msec |
| 10 | 1 msec |
| 11 | 1 msec |

(TRIGGER TIMING TABLE FOR 60Hz)

FIG.18

| FIG.18A | FIG.18B |
|---|---|

FIG.18A (a)

42p

| COUNT VALUE OF ZERO-CROSS-COUNTER VARIABLE Nz | TIME-INTERVAL ti ON TIMER |
|---|---|
| 0 | 8 msec |
| 1 | 8 msec |
| 2 | 7 msec |
| 3 | 7 msec |
| 4 | 6 msec |
| 5 | 6 msec |
| 6 | 5 msec |
| 7 | 5 msec |
| 8 | 4 msec |
| 9 | 4 msec |
| 10 | 3 msec |
| 11 | 3 msec |
| 12 | 2 msec |
| 13 | 2 msec |
| 14 | 1 msec |
| 15 | 1 msec |

#1 (0~3000 SHEETS)

(b)

42q

| COUNT VALUE OF ZERO-CROSS-COUNTER VARIABLE Nz | TIME-INTERVAL ti ON TIMER |
|---|---|
| 0 | 7 msec |
| 1 | 7 msec |
| 2 | 6 msec |
| 3 | 6 msec |
| 4 | 5 msec |
| 5 | 5 msec |
| 6 | 4 msec |
| 7 | 4 msec |
| 8 | 3 msec |
| 9 | 3 msec |
| 10 | 2 msec |
| 11 | 2 msec |
| 12 | 1 msec |
| 13 | 1 msec |

#2 (3001~6000 SHEETS)

(c)

42r

| COUNT VALUE OF ZERO-CROSS-COUNTER VARIABLE Nz | TIME-INTERVAL ti ON TIMER |
|---|---|
| 0 | 6 msec |
| 1 | 6 msec |
| 2 | 5 msec |
| 3 | 5 msec |
| 4 | 4 msec |
| 5 | 4 msec |
| 6 | 3 msec |
| 7 | 3 msec |
| 8 | 2 msec |
| 9 | 2 msec |
| 10 | 1 msec |
| 11 | 1 msec |

#3 (6001~9000 SHEETS)

FIG.18B (d)

42s

| COUNT VALUE OF ZERO-CROSS-COUNTER VARIABLE Nz | TIME-INTERVAL ti ON TIMER |
|---|---|
| 0 | 5 msec |
| 1 | 5 msec |
| 2 | 4 msec |
| 3 | 4 msec |
| 4 | 3 msec |
| 5 | 3 msec |
| 6 | 2 msec |
| 7 | 2 msec |
| 8 | 1 msec |
| 9 | 1 msec |

#4 (9001~12000 SHEETS)

(e)

42t

| COUNT VALUE OF ZERO-CROSS-COUNTER VARIABLE Nz | TIME-INTERVAL ti ON TIMER |
|---|---|
| 0 | 4 msec |
| 1 | 4 msec |
| 2 | 3 msec |
| 3 | 3 msec |
| 4 | 2 msec |
| 5 | 2 msec |
| 6 | 1 msec |
| 7 | 1 msec |

#5 (12001 SHEETS MORE)

FIG.19

42u

| COUNT VALUE OF COPY COUNTER VARIABLE $N_P$ | TRIGGER TIMING TABLE NUMBER |
|---|---|
| 0 ~ 3,000 | #1 |
| 3,001 ~ 6,000 | #2 |
| 6,001 ~ 9,000 | #3 |
| 9,001 ~ 12,000 | #4 |
| 12,001 MORE | #5 |

(NUMBER OF COPIES -TABLE NUMBERS-CORRELATION TABLE)

FIG.21

(a)

42v

| COUNT VALUE OF ZERO-CROSS-COUNTER VARIABLE Nz | TIME-INTERVAL ti ON TIMER |
|---|---|
| 0 | 6 msec |
| 1 | 6 msec |
| 2 | 5 msec |
| 3 | 5 msec |
| 4 | 4 msec |
| 5 | 4 msec |
| 6 | 3 msec |
| 7 | 3 msec |
| 8 | 2 msec |
| 9 | 2 msec |
| 10 | 1 msec |
| 11 | 1 msec |

#1 (NOT HIGHER THAN 50 ℃)

(b)

42w

| COUNT VALUE OF ZERO-CROSS-COUNTER VARIABLE Nz | TIME-INTERVAL ti ON TIMER |
|---|---|
| 0 | 5 msec |
| 1 | 5 msec |
| 2 | 4 msec |
| 3 | 4 msec |
| 4 | 3 msec |
| 5 | 3 msec |
| 6 | 2 msec |
| 7 | 2 msec |
| 8 | 1 msec |
| 9 | 1 msec |

#2 (50～100 ℃)

(c)

42x

| COUNT VALUE OF ZERO-CROSS-COUNTER VARIABLE Nz | TIME-INTERVAL ti ON TIMER |
|---|---|
| 0 | 4 msec |
| 1 | 4 msec |
| 2 | 3 msec |
| 3 | 3 msec |
| 4 | 2 msec |
| 5 | 2 msec |
| 6 | 1 msec |
| 7 | 1 msec |

#3 (101～150 ℃)

(d)

42y

| COUNT VALUE OF ZERO-CROSS-COUNTER VARIABLE Nz | TIME-INTERVAL ti ON TIMER |
|---|---|
| 0 | 3 msec |
| 1 | 3 msec |
| 2 | 2 msec |
| 3 | 2 msec |
| 4 | 1 msec |
| 5 | 1 msec |

#4 (150 ℃ MORE)

FIG.22

42z

| DETECTED LAMP TEMPERATURE $T_L$ | TRIGGER TIMING TABLE NUMBER |
|---|---|
| ~ 50 ℃ | # 1 |
| 51 ~ 100 ℃ | # 2 |
| 101 ~ 150 ℃ | # 3 |
| 151 ℃ ~ | # 4 |

(DETECTED LAMP TEMPERATURE-TABLE NUMBER-CORRELATION TABLE)

FIG.27A

42A

1

| COUNT VALUE OF ZERO-CROSS -COUNTER VARIABLE Nz | TIME INTERVAL ti TO BE PRESET ON TIMER |
|---|---|
| 0 | 9 msec |
| 1 | 9 msec |
| 2 | 8 msec |
| 3 | 8 msec |
| 4 | 7 msec |
| 5 | 7 msec |
| 6 | 6 msec |
| 7 | 6 msec |
| 8 | 5 msec |
| 9 | 5 msec |
| 10 | 4 msec |
| 11 | 4 msec |
| 12 | 3 msec |
| 13 | 3 msec |
| 14 | 2 msec |
| 15 | 2 msec |
| 16 | 1 msec |
| 17 | 1 msec |

(TRIGGER TIMING TABLE FOR INDEPENDENT LIGHTING)

FIG.27B

42B

2

| COUNT VALUE OF ZERO-CROSS -COUNTER VARIABLE Nz | TIME INTERVAL ti TO BE PRESET ON TIMER |
|---|---|
| 0 | 9.5 msec |
| 1 | 9.5 msec |
| 2 | 8.5 msec |
| 3 | 8.5 msec |
| 4 | 7.5 msec |
| 5 | 7.5 msec |
| 6 | 6.5 msec |
| 7 | 6.5 msec |
| 8 | 5.5 msec |
| 9 | 5.5 msec |
| 10 | 4.5 msec |
| 11 | 4.5 msec |
| 12 | 3.5 msec |
| 13 | 3.5 msec |
| 14 | 2.5 msec |
| 15 | 2.5 msec |
| 16 | 1.5 msec |
| 17 | 1.5 msec |

(TRIGGER TIMING TABLE FOR INDEPENDENT LIGHTING)

SOFT-STARTING SYSTEM FOR A LAMP IN AN IMAGE FORMING DEVICE OR THE LIKE

BACKGROUND OF THE INVENTION

The present invention relates to a system for controlling the lighting of lamps such as an exposing lamp and a fixing heater lamp in an image forming device such as a copier and a facsimile.

In conventional image forming devices such as a copier and a facsimile, there has been used such a lamp control system that compares a feed-back voltage to be applied to a lamp with a reference voltage to obtain a corrected output and controls an energy of the power supply to the lamp according to the obtained corrected output. The control system starts energizing of a lamp for example in a copying machine as soon as it received a copying start command. In some types of the machines, lamps are energized simultaneously with turning-on the power supply of the machines to confirm the normal operations of the machine portions. In this case, the lamps are checked for deterioration or breakage by, e.g., reading exposure light amount by an automatic exposure (AE) sensor. It is also determined whether an optical system can be normally set into a home position. In most cases of practice, an amount of an electric energy to be supplied to a lamp for an initial energizing period is equal to that to be supplied in a period of the stable copying operation. This may, however, produce a large rush current in an initial energizing period, resulting in breakage of switching elements such as transistors and triacs for controlling the lighting of the lamp.

Japanese Laid-open Patent Publication No. 4-10634 proposes phase control of a lamp driving voltage by gradually increasing electric current to the lamp for an initial energizing period. A summary of this prior-art lamp control system for an image forming device will be described.

A waveform of an alternating power-supply voltage (commercial electric power source of AC100 V) is full-wave rectified. A zero cross-point signal represents a zero cross-point detected on the alternating voltage waveform. When a copy operation starting command is given or an electric power circuit is turned on, a signal requesting the lighting of a lamp is input, and, therefore, a stop signal is applied to a switching element. Namely, the stop signal is output at a timing that lagged by a conduction angle $\beta_i$ (i=0, 1 . . . ) from the zero cross-point. A voltage of the conducting-angle portion $\beta_i$ of the full-wave rectified waveform is applied to the lamp and phase control is carried out. A lamp driving voltage $V_i$ (i=0, 1 . . . ) at which a lamp driving current $i_i$ is fed to the lamp.

When regarding a half-wave of the alternating voltage waveform as one cycle, as the conduction angle $\beta_i$ gradually increased every cycle as $\beta_0<\beta_1<\beta_2<\beta_3<\beta_4<\beta_5< \ldots <\beta_n$, the voltage $V_i$ applied to the lamp is gradually increased as $V_0<V_1<V_2<V_3<V_4<V_5< \ldots <V_n$. Accordingly, the lamp driving current $i_i$ is also gradually increased as $i_0<i_1<i_2<i_3<i_4<i_5< \ldots <i_n$. This is so called "soft start" of the lamp for the initial energizing period. In this case, rush currents of a large peak value for initial energizing period can be eliminated, so the switching elements such as transistors for controlling the lighting of the lamp can be reliably protected from being damaged by inrush currents. As soon as the initial conducting period ceased and a normal copying period began, the conduction angle $\beta_c$ becomes constant and the lamp driving voltage and current to be stable at constant levels $V_c$ and $i_c$ respectively, thus a stable state begins.

The above-mentioned prior-art lamp-control system for the image forming device (Japanese Laid-open Patent Publication No. 4-10634) is, however, a relatively large and expensive because of using a full-wave rectifier therein.

Accordingly, a method of driving a lamp without using the full-wave rectifier has been proposed, which will be described.

When a command for starting a copying operation is given or an electric power circuit of a copying machine is turned on, a signal requesting the lighting of a lamp is input and, then, a trigger signal is applied to a bi-directional switching element such as a triac. Namely, the trigger signal is output at a time lag of a firing angle $\alpha_i$ (i=0, 1 . . . ) in respect with the zero cross-point of the alternating voltage waveform. Consequently, a voltage corresponding to the conducting-angle portion $\beta_i$ of the alternating voltage waveform is applied to the lamp and phase control is carried out. With a subsequent zero cross-point signal, the lamp driving current $i_i$ drops to zero. When a lamp driving voltage $V_i$ (i=0, 1 . . . ) is applied to the lamp, a lamp driving current $i_i$ flows the lamp.

The conduction angle $\beta_i$ begins at a timing of rising start of a zero cross-point signal whereas the conduction angle $\beta_i$ begins with a lag from the rising start timing of zero-cross-point signal by a firing angle $\alpha_i$. Since both cases realize substantially equivalent phase control irrespective of the above-mentioned difference, the above-mentioned method is preferably applied in practice.

When counting a half-wave of the alternating voltage waveform as one cycle, as the firing angle $\alpha_i$ is gradually decreased every cycle as $\alpha_0<\alpha_1<\alpha_2<\alpha_3<\alpha_4<\alpha_5< \ldots <\alpha_n$, the conduction angle $\beta_i$ is gradually increased every cycle as $\beta_0<\beta_1<\beta_2<\beta_3<\beta_4<\beta_5< \ldots <\beta_n$ and the voltage $V_i$ applied to the lamp is gradually increased as $V_0<V_1<V_{2<V3}<V_{4<V5}< \ldots <V_n$. Accordingly, the lamp driving current $i_i$ is also gradually increased as $i_0<i_1<i_{2<i3}<i_4<i_5< \ldots <i_n$. Thus, rush currents of a large peak value in initial lamp-energizing period can be eliminated, so the switching elements such as transistors for controlling the lighting of the lamp can be reliably protected from being damaged by the inrush currents. As the initial conducting period ceased and a normal copying period begin, the conduction angle $\beta_c$ becomes constant and the lamp driving voltage and current are stable at constant levels $V_c$ and $i_c$ respectively, thus a stable state begins.

In this case, the system may be compact and inexpensive since it does not need for using a full-wave rectifier.

In the prior art lamp control system, when gradually increasing the lamp driving voltage $V_i$ (i=0,1 . . . ) little by little, since the lamp driving voltage is gradually increased for every cycle, the polarity of the lamp driving voltage $V_i$ is altered from positive to negative or vice versa for every cycle of half-wave of the alternating voltage waveform. Noise components in positive and negative voltage are different from each other in levels, so electromagnetic noises can not cancel out each other and a large noise appears at a plug socket for supply alternating current. This may not satisfy recently established regulations for protecting external appliances against external noise and disturbance. Furthermore, these noises occurring for the initial conducting period may cause an image forming device to erroneously stop in operation or voluntarily start copying operation. To avoid such erroneous operations of the device, there arises the necessity of using a noise reducing circuit that may lose the economical merit attained by eliminating the use of the full-wave rectifier.

SUMMARY OF THE INVENTION

It is an object of the present invention to provide a system for controlling lighting of a lamp in an image forming device, which does not use a full-wave rectifier and any additional noise reducing circuit and is capable of effectively preventing occurrence of noises that may cause the erroneous operation of the image forming device and other peripheral apparatuses.

It is another object of the present invention to provide a lamp lighting control system for use in an image forming device which comprises control means for phase control of a voltage of alternating current power supply to realize soft-starting of lighting a lamp by gradually increasing a conducting angle at which the voltage is applied to the lamp for an initial period of in energizing the lamp, and which is characterized in that the conducting angle is increased gradually by every unit of an even number of cycles of the alternating current power-supply voltage and cycles in a same unit have a same preset conducting angle. In this case, the system may be used for controlling an exposure lamp or a heating lamp or both of them in the image forming device. In the device with the lamp lighting control system, a lamp driving voltage is gradually increased by every unit of an even number of cycles and, thereby, a lamp driving current is gradually increased every unit of an even number of cycles, thus realizing soft starting of the lamp for the initial period of energizing the lamp after inputting a "copying operation start" instruction or turning on a power supply circuit of the device. Furthermore, cycles in the same unit have the same preset value of conducting angle, so the noise components that may occur in positive and negative voltage in the lamp-driving circuit without full-wave rectifier can have the same level and can effectively cancel out each other. Namely, the system can effectively prevent occurrence of electromagnetic noise without using any additional noise reducing circuit, thus eliminating the possibility of erroneous operation of the image forming device by noises for the initial lamp-energizing period and at the same time realizing the compactness of the device.

It is another object of the present invention to provide a lamp lighting control system for use in an image forming device, which is further characterized in that the system is provided with a trigger timing table defining a correlation between variable values of a zero-cross counter and time-intervals from respective zero cross-points to the beginning of respective power supplying periods, which time-intervals are presettable on a timer for gradually increasing a conducting angle by gradually decreasing a firing angle, and will preset a necessary time-interval for each cycle on the timer referring to the table. The use of this table eliminates the necessity of calculating time intervals to be preset on the timer, thus improving the efficiency of processing operation of the system.

It is another object of the present invention to provide a lamp lighting control system for use in an image forming device, which is further characterized in that an even number of cycles in a unit for an initial stage of the initial lamp-energizing period is set to be larger than that in a unit set for another later stage of the initial lamp-energizing period. The increased number of cycles for the initial stage of an initial energizing period allows only such a small driving current that may not produce an inrush current and noise signals in the worst conditions. A total number of cycles is still relatively small, thus assuring relatively fast rising of the lamp.

It is another object of the present invention to provide a lamp lighting control system for use in an image forming device, which is further characterized in that the system has a plurality of trigger-timing tables which are different from one another in the number of cycles and each for correlating variable values of a zero-cross counter with time-intervals set on a timer from respective zero cross-points to the beginning of respective power supply, for gradually increasing a conducting angle by gradually decreasing firing angle, and includes a detecting means for detecting a power supply voltage to be applied and a means for reading the power-supply voltage detected by the power-supply voltage detecting means upon receipt of an instruction for forming an image and for selecting a trigger timing table corresponding to the read voltage, a corresponding time-interval being preset for each cycle with reference to the selected table. The use of trigger timing table selected according to the detected power-supply voltage can reliably suppress inrush current even with a variation of the voltage in operation with the image forming instruction and can rise the driving current of the lamp for a substantially specified duration in the initial energizing period.

It is another object of the present invention to provide a lamp lighting control system for use in an image forming device, which is further characterized in that the system has a plurality of trigger-timing tables which are different in the number of cycles and each for correlating variable values of a zero-cross counter time-intervals from respective zero cross-points to the beginning of respective power supply for gradually increasing a conducting angle by gradually decreasing firing angle, and includes a detecting means for detecting a voltage of power supply to be applied to and a means for reading the power-supply voltage detected by said detecting means and for selecting a trigger timing table for each image-forming operation cycle according to the detected voltage, said a time-interval being preset for each cycle with reference to the selected trigger timing table. The use of trigger timing table selected according to the power-supply voltage detected for each image-forming operation cycle can reliably suppress rush current even with a variation of the voltage due to a change in load of any peripheral electrical appliance in operation and can rise a driving current of a trigger signal for the lamp for a substantially specified duration in the initial lamp-energizing period.

It is another object of the present invention to provide a lamp lighting control system for use in an image forming device, which is further characterized in that the system has a plurality of trigger-timing tables which are different from one another in a total number of cycles corresponding to the frequency of power supply for each corresponding variable values of a zero-cross counter with corresponding time-intervals set on a timer from respective zero cross-points to the beginning of respective power supply for gradually increasing a conducting angle by gradually decreasing firing angle, and includes a detecting means for detecting a frequency of a power supply voltage to be applied and a means for reading the power-supply voltage frequency detected by said detecting means and for selecting one of the trigger timing tables. The use of trigger timing table selected according to the power-supply frequency detected for each image-forming operation cycle can reliably suppress rush current.

It is another object of the present invention to provide a lamp lighting control system for use in an image forming device, which is further characterized in that the system has a plurality of trigger-timing tables which are different from one another in a total number of cycles and a total numbers of copies to be counted and for correlating variable values of a zero-cross counter with time-intervals set on a timer from respective zero cross-points to the beginning of respective power supply for gradually increasing a conducting angle by gradually decreasing firing angle, and includes a means for selecting suitable one of the trigger timing tables according to a current total number of counted copies. The use of trigger timing table selected according to a degree of deterioration of a filament of the lamp can normally control lighting of the lamp, reliably suppressing inrush current.

It is another object of the present invention to provide a lamp lighting control system for use in an image forming device, which is further characterized in that the system has a plurality of trigger-timing tables which are different from one another in a total the number of cycles corresponding to the difference in the detected temperatures of a lamp and each for correlating variable values of a zero-cross counter with corresponding time-intervals set on a timer from respective zero cross-points to the beginning of respective power supply for gradually increasing a conducting angle by gradually decreasing firing angle, and a means for selecting suitable one of the trigger timing tables of the cycle number corresponding to the detected lamp temperature. The use of a trigger timing table suited to a detected temperature of a lamp can normally control lighting of the lamp, reliably suppressing inrush current. This feature is effective to rapidly bring a lamp into working state with no rush current in a high-speed image-forming device if the lamp is detected at a normally high temperature.

It is another object of the present invention to provide a lamp lighting control system for use in an image forming device, which is further characterized in that the system has a trigger-timing table for correlating variable values of a zero-cross counter with time-intervals set on a timer from respective zero cross-points to the beginning of respective power supply for gradually increasing a conducting angle by gradually decreasing a firing angle and is commonly usable for an exposure lamp and a fixing heater-lamp. In this case, the system can control each of the exposure lamp and the fixing heater-lamps in the image forming device in such a way that the noise components that may occur in positive and negative voltage in the lamp-driving circuit without full-wave rectifier have the same level and can effectively cancel out each other. Thus, the system can effectively prevent occurrence of electromagnetic noises without using any additional noise reducing circuit. Furthermore, the common use of a trigger timing table containing time-intervals presettable on a timer for both lamps realizes saving in program storage capacity.

It is another object of the present invention to provide a lamp lighting control system for use in an image forming device, which is further characterized in that the system has a trigger-timing table for correlating variable values of a zero-cross counter with time-intervals set on a timer from respective zero cross-points to the beginning of respective power supply for gradually increasing a conducting angle by gradually decreasing a firing angle and for commonly usable for an exposure lamp and a fixing heater-lamp on the condition of independently driving of the exposure lamp and the fixing lamp, and has another commonly usable trigger timing table which contains time-intervals larger than those in the table for independently driving said lamps on the condition of simultaneously driving both exposure lamp and fixing heater-lamp. The exposure lamp and the fixing heater-lamp are normally driven in independent state without synchronism. However, two lamps may sometime be driven at the same time. In this case, there may arise an inrush current for an initial energizing period due to an increased power consumption. This problem is solved by using a different trigger timing table for simultaneously driving two lamps with larger time-intervals to the beginning of energizing them as compared with the table for individual driving the exposure lamp or the fixing heater-lamp, thus effectively suppressing inrush current and preventing the occurrence of noises.

BRIEF DESCRIPTION OF THE DRAWINGS

FIG. 5 shows a trigger timing table defining a correlation between a variable value counted by a zero-cross-point counter and a preset time-interval corresponding to a firing angle and a table for defining correlation between a conducting angle and a firing angle corresponding to a preset time-interval.

FIG. 10 shows a trigger timing table for defining the correlation between a value of a zero-cross counter variable and time-interval set on a timer corresponding to a firing angle and a table for defining a correlation between a conducting angle and a firing angle corresponding to the time-interval set on a timer, in a lamp lighting control system according to an embodiment 2 of the present invention.

FIGS. 12A to 12C show 7 trigger timing tables used in a lamp lighting control system according to the embodiment 3 of the present invention.

FIG. 13 is a table showing a correlation between ranges of detected voltage voltages and trigger-timing table numbers, according to the embodiment 3 of the present invention.

FIGS. 16A and 16B show a trigger timing table for 50 Hz and a trigger timing table for 60 Hz, which tables are used in a lamp lighting control system according to an embodiment 5 of the present invention.

FIGS. 18A and 18B show 5 trigger timing tables used in a lamp lighting control system according to an embodiment 6 of the present invention.

FIG. 19 is a table defining a correlation between members of counted copies and table numbers, which table is used in the embodiment 6 of the present invention.

FIG. 21 shows 4 trigger timing tables used in a lamp lighting control system according to an embodiment 7 of the present invention.

FIG. 22 is a table defining a correlation between ranges of detected lamp temperatures and table numbers, which table is used in the embodiment 6 of the present invention.

FIGS. 27A and 27B show a trigger timing table for independent lighting control and a trigger timing table for simultaneous lighting control, which tables are used in a lamp lighting control system according to an embodiment 9 of the present invention.

PREFERRED EMBODIMENT OF THE INVENTION

Figure 1:
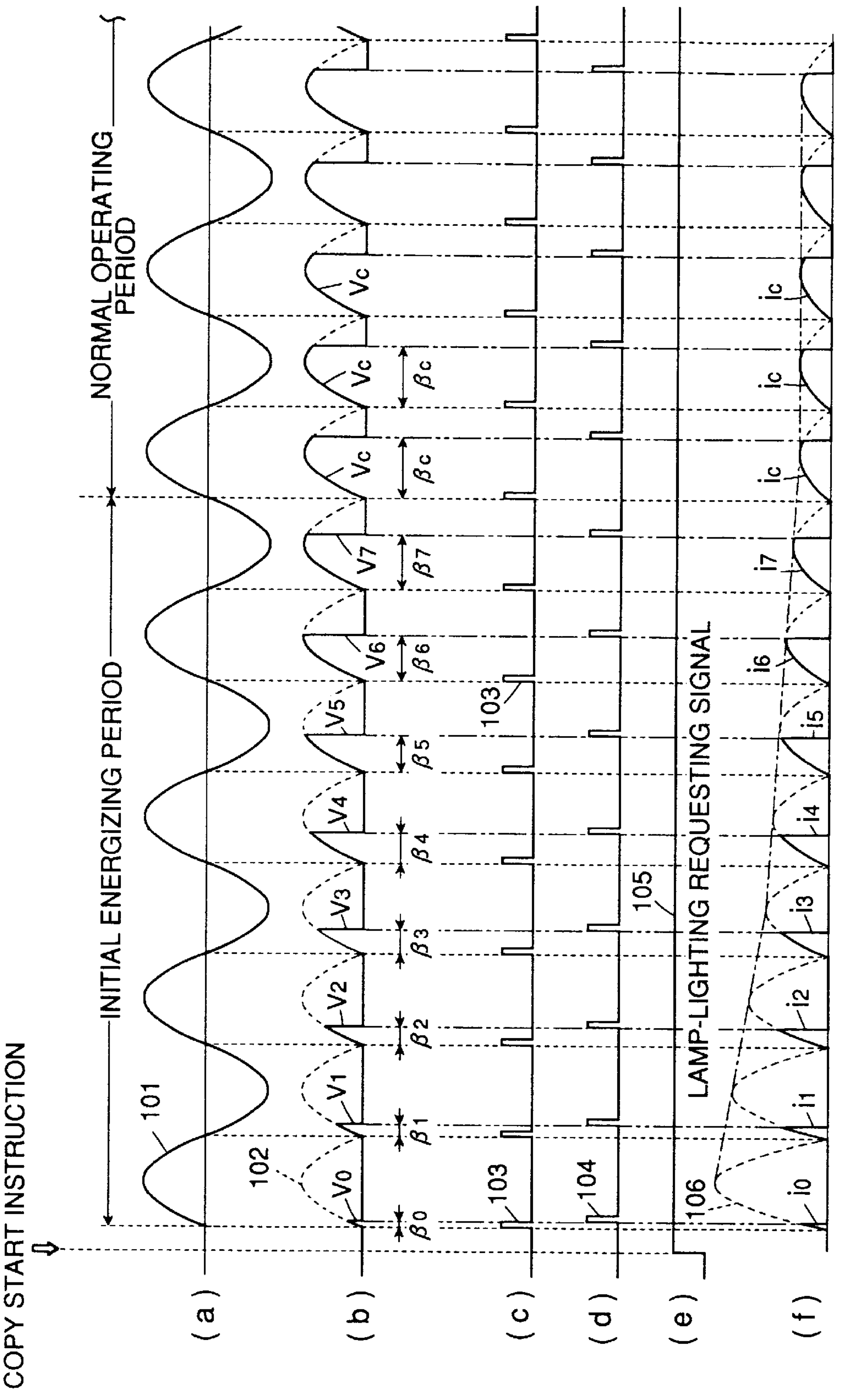
FIG.1 (PRIOR ART)
FIG. 1 shows working waveform of a conventional lamp lighting control system for use in an image forming device.

Referring now to FIG. 1, a summary of the prior-art lamp control system for an image forming device phase control of a lamp driving voltage by gradually increasing electric current to the lamp for an initial energizing period is executed proposed by Japanese Laid-open Patent Publication No. 4-10634, in which will be described.

FIG. 1(*a*) is illustrative of a waveform 101 of an alternating power-supply voltage (commercial electric power source of AC100 V). The alternating voltage of the waveform 101 is full-wave rectified to have a waveform 102 shown in FIG. 1(*b*). A zero cross-point signal 103 representing a zero cross-point detected on the alternating voltage waveform 101 is shown in FIG. 1(*c*). When a copy operation starting command is given or an electric power circuit is turned on, a signal 105 requesting the lighting of a lamp is input as shown in FIG. 1(*e*) and, therefore, a stop signal 104 shown in FIG. 1(*d*) is applied to a switching element. Namely, the stop signal 104 is output at a timing that lagged by a conduction angle $\beta_i$ (i=0, 1 . . . ) from the zero cross-point. A voltage of the conducting-angle portion $\beta_i$ of the full-wave rectified waveform 102 is applied to the lamp and phase control is carried out. FIG. 1(*d*) shows a lamp driving voltage $V_i$ (i=0, 1 . . . ) at which a lamp driving current $i_i$ shown in FIG. 1(*f*) is fed to the lamp.

When regarding a half-wave of the alternating voltage waveform 102 as one cycle, as the conduction angle $\beta_i$ is gradually increased every cycle as $\beta_0<\beta_1<\beta_2<\beta_3<\beta_4<\beta_5< \ldots <\beta_n$, the voltage $V_i$ applied to the lamp is gradually increased as $V_0<V_1<V_2<V_3<V_4<V_5< \ldots <V_n$. Accordingly, the lamp driving current $i_i$ is also gradually increased as $i_0<i_1<i_{2<i3<i4<i5}< \ldots <i_n$. This is so called “soft start” of the lamp for the initial energizing period. In this case, rush currents 106 of a large peak value shown by a broken line in FIG. 1(*f*) for initial energizing period can be eliminated, so the switching elements such as transistors for controlling the lighting of the lamp can be reliably protected from being damaged by inrush currents. As soon as the initial conducting period ceased and a normal copying period began, the conduction angle $\beta_c$ becomes constant and the lamp driving voltage and current to be stable at constant levels $v_c$ and $i_c$ respectively, thus a stable state begins.

The above-mentioned prior-art lamp-control system for the image forming device is, however, a relatively large and expensive because of using a full-wave rectifier therein.

Accordingly, a method of driving a lamp without using the full-wave rectifier has been proposed, which will be described bellow with reference to FIG. 2.

Figure 2:
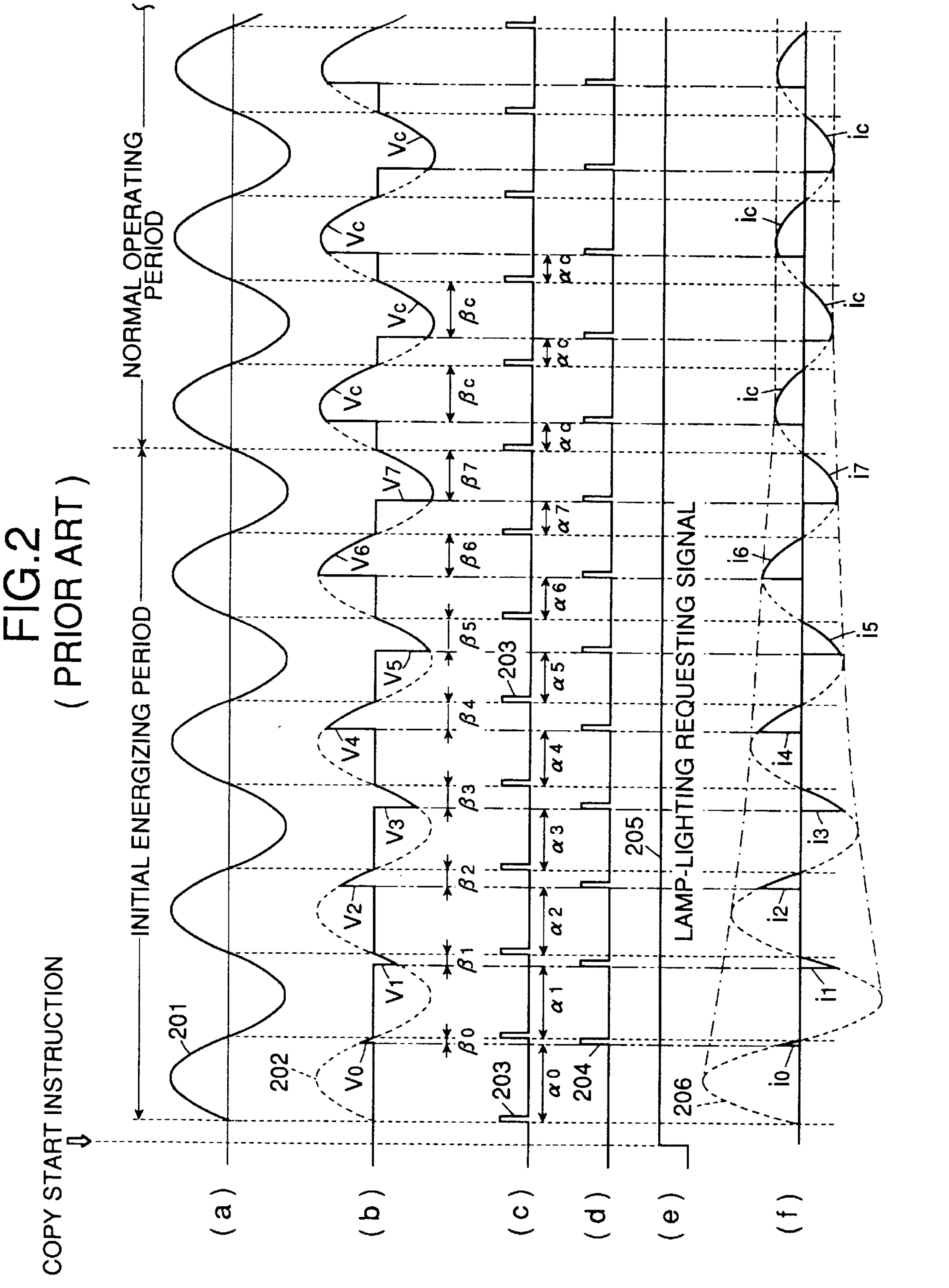
FIG.2 ( PRIOR ART )
FIG. 2 shows working waveform of a conventional lamp lighting control system which is not provided with a full-wave rectifier in an alternating current power-supply circuit and which is used in an image forming device.

FIG. 2(*a*) is illustrative of a series of voltage waveforms 201 of an alternating current power source (commercial AC100 V power supply). A series of zero cross-point signals 203 representing detected zero cross-points of respective voltage waveforms 201 is shown in FIG. 2(*c*). When a command for starting a copying operation is given or an electric power circuit of a copying machine is turned on, a signal 205 requesting the lighting of a lamp is input as shown in FIG. 2(*e*) and, then, a trigger signal 204 shown in FIG. 2(*d*) is applied to a bi-directional switching element such as a triac. Namely, the trigger signal 204 is output at a time lag of a firing angle $\alpha_i$ (i=0, 1 . . . ) in respect with the zero cross-point of the alternating voltage waveform. Consequently, a voltage corresponding to the conducting-angle portion $V_i$ of the alternating voltage waveform 201 is applied to the lamp and phase control is carried out. With a subsequent zero cross-point signal 203, the lamp driving current $i_i$ drops to zero. When a lamp driving voltage $V_i$ (i=0, 1 . . . ) is applied to the lamp, a lamp driving current $i_i$ flows the lamp as shown in FIG. 2(*f*).

The conduction angle 3i in the case of FIG. 1 begins at a timing of rising start of a zero cross-point signal whereas the conduction angle $\beta_i$ in the case of FIG. 2 begins with a lag from the rising start timing of zero-cross-point signal by a firing angle $\alpha_i$. Since both cases realize substantially equivalent phase control irrespective of the above-mentioned difference, the method of FIG. 2 is preferably applied in practice.

When regarding a half-wave of the alternating voltage waveform 102 as one cycle, as the firing angle $\alpha_i$ is gradually decreased every cycle as $\alpha_0>\alpha_1>\alpha_2>\alpha_3>\alpha_4>\alpha_5> \ldots >\alpha_n$, the conduction angle $\beta_i$ is gradually increased every cycle as $\beta_0<\beta_1<\beta_2<\beta_3<\beta_4<\beta_5< \ldots <\beta_n$ and the voltage $V_i$ applied to the lamp is gradually increased as $V_0<V_1<V_2<V_3<V_4<V_5< \ldots <V_n$. Accordingly, the lamp driving current $i_i$ is also gradually increased as $i_0<i_1<i_{2<i3<i4<i5}< \ldots <i_n$. Thus, rush currents 206 of a large peak value shown by a broken line in FIG. 2(*f*) in initial lamp-energizing period can be eliminated, so the switching elements such as transistors for controlling the lighting of the lamp can be reliably protected from being damaged by the inrush currents. As the initial conducting period ceased and a normal copying period begin, the conduction angle $\beta_c$ becomes constant and the lamp driving voltage and current are stable at constant levels $v_c$ and $i_c$ respectively, thus a stable state begins.

In this case, the system may be compact and inexpensive since it does not need for using a full-wave rectifier.

In the lamp control system shown in FIG. 2, when gradually increasing the lamp driving voltage $V_i$ (i=0, 1 . . . ) little by little, since the lamp driving voltage is gradually increased for every cycle the polarity of the lamp driving voltage $V_i$ is altered from positive to negative or vice versa by every cycle of a half-wave of the alternating voltage waveform 201. Noise components in positive and negative voltage are different from each other in levels, so electromagnetic noises can not cancel out each other and a large noise appears at a plug socket for supply alternating current. This may not satisfy recently established regulations for protecting external appliances against external noise and disturbance. Furthermore, these noises occurring for the initial conducting period may cause an image forming device to erroneously stop in operation or voluntarily start copying operation. To avoid such erroneous operations of the device, there arises the necessity of using a noise reducing circuit that may lose the economical merit attained by eliminating the use of the full-wave rectifier.

In view of the foregoing, the present invention is to provide a system for controlling lighting of a lamp in an image forming device, which does not use a full-wave rectifier and any additional noise reducing circuit and is capable of effectively preventing occurrence of noises that may cause the erroneous operation of the image forming device and other peripheral apparatuses.

Referring now to the accompanying drawings, preferred embodiments of the present invention will be described in detail.

Embodiment 1

Figure 3:
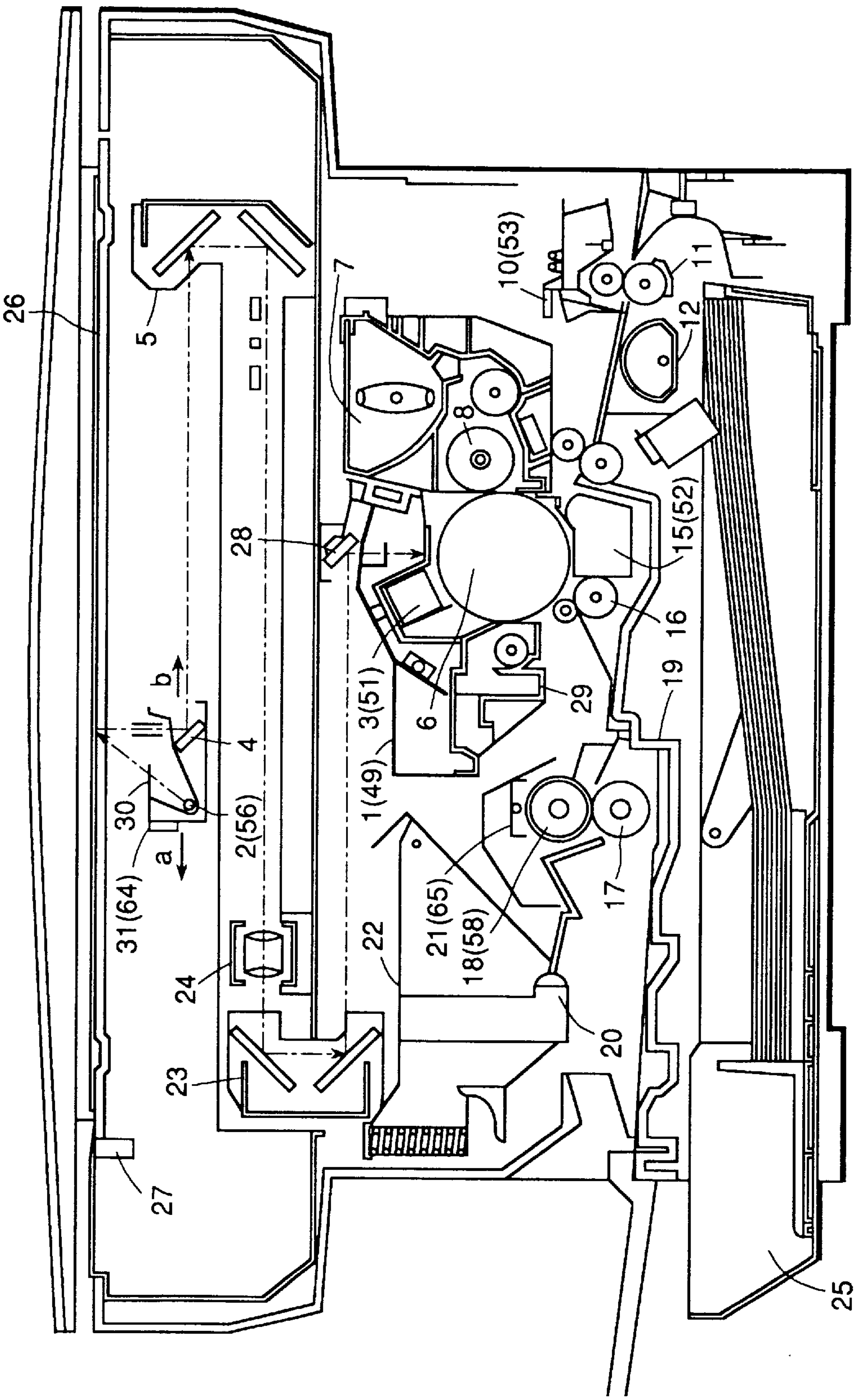
FIG. 3 is a sectional view of an essential portion of a copying machine of one kind of an image forming device.

FIG. 3 is a sectional view of an essential portion of a Carson-process type copying machine which is an example of an image forming device to which a lamp lighting control system according to the present invention can be applied.

An original is placed on a table glass 26 of the copying machine. With recording paper sheets piled in a cassette 25, an operator depresses a key <Copying> on a front panel of the copying machine to start a copying operation therein. A lamp unit 30 composed of an exposure lamp 2 with a first mirror 4 for illuminating the original moves to in a direction shown by the arrow “a” until a lamp-unit home sensor 27 detects the lamp unit 30. At the same time, a sheet of recording paper is fed by paper feeding rollers 12 and 11 and transferred to a paper-start (PS) roller whereon the sheet stops. The PS roller is so called resist roller. The exposure lamp 2 lights and a main charger 3 electrically charges a surface of a organic photo-sensitive (OPC) drum 6. The lamp unit 30 moves in the direction shown by the arrow “b” and it starts illuminating the original. Light from the exposure lamp 2 passes through the table glass 26 to illuminate the original. Light reflected from the original passes again through the table glass 26 travels a path formed by the first mirror 4, a second and third mirror unit 5, a fixed focus lens 24, a fourth and fifth mirror unit 23 and a sixth mirror 28 and falls onto the electrically charged surface of the photo-sensitive drum 6 where an electrostatic latent image is formed. The latent image formed on the photo-sensitive drum 6 is developed with toner fed from a magnet (MG) roller 8 of a developing container 7 to form a toner image which is then transferred by transferring charger 15 to a sheet of paper fed in time thereto from the paper start roller 15. Toner remaining on the photo-sensitive drum 6 is cleared off by a cleaning unit 29. The sheet with a developed toner-image passes through a path formed between an upper heating roller and a lower heating roller 17. The image is fixed by heat on the sheet. The printed paper sheet is then delivered out of the copying machine.

The lamp unit 30 is provided at its external surface with a temperature detecting element (e.g., a thermistor) 31 for sensing a temperature of the exposure lamp 2. In FIG. 3, the copying machine still contains a paper feeding sensor 10 disposed at the outlet side of the paper start roller 13 to detect a rear edge of the paper sheet passing thereon, indicating that the sheet temporarily held on the roller was transferred therefrom to the photo-sensitive drum 6; a stripping roller 16 for separating a paper sheet from the photo-sensitive drum 6, a fixing heater-lamp 18 mounted inside the upper heating roller 19; a temperature sensing element (e.g., a thermistor) 21 for indirectly sensing a temperature of the fixing heater-lamp 18; a printed paper delivery sensor 20 for detecting whether a paper sheet with a toner-image fixed thereon was delivered out of the copying machine; and a cooling fan 22.

Figure 4:
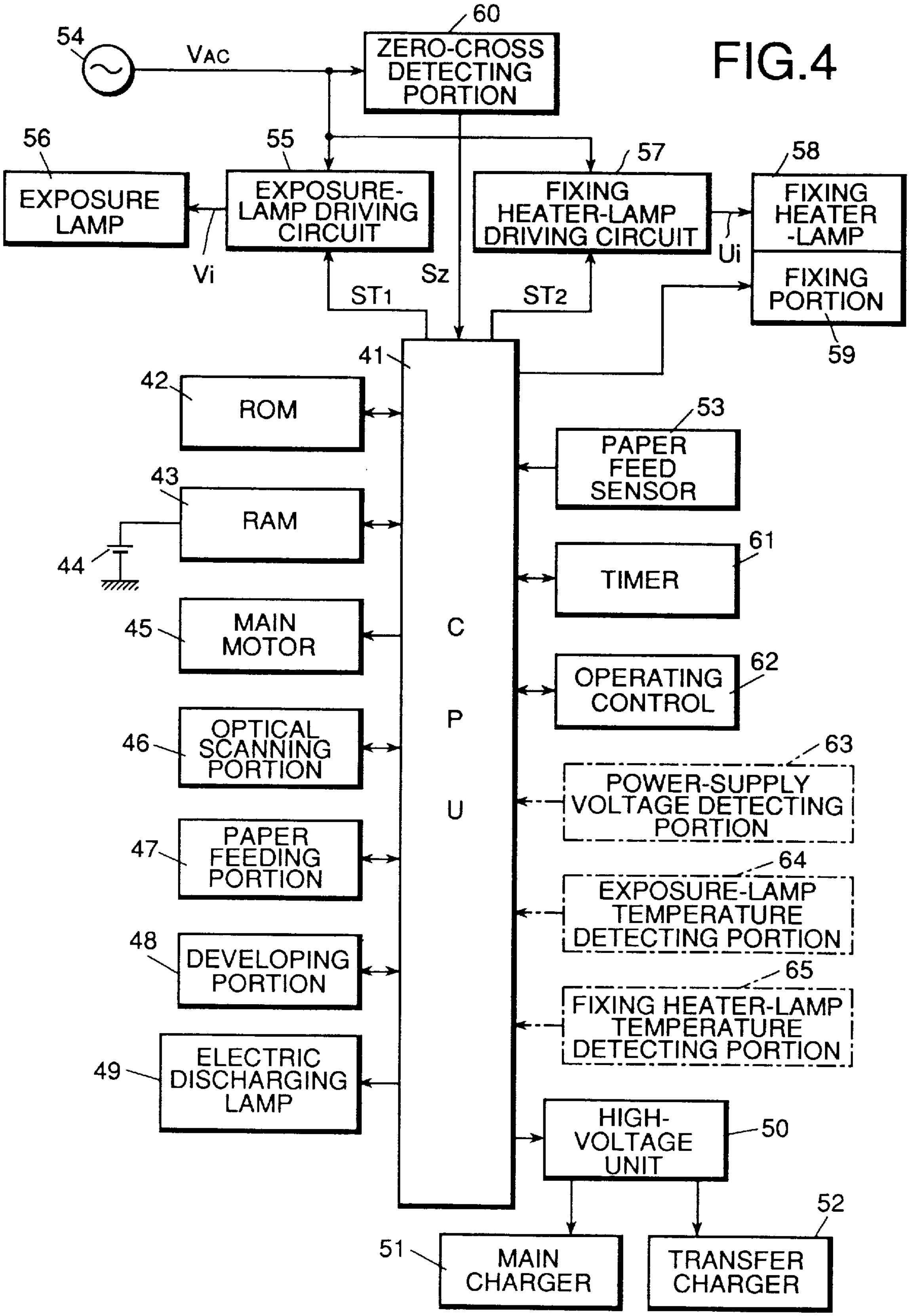
FIG. 4 is a block diagram showing a structure of an essential portion and a peripheral portion of a lamp lighting control system for an image forming device according to an embodiment 1 of the present invention.

FIG. 4 is a block-diagram showing an essential portion and peripherals of a lamp-lighting control system in an image forming device, which is an embodiment 1 of the present invention. In FIG. 4, there is shown a central processing unit (CPU) 41 for controlling a whole system of a copying machine, a read-only memory (ROM) 42 for storing programs used for control of the copying machine, a random-access memory 43 for storing control data 43, a back-up battery 44 for RAM 43, a main motor 45, an optical scanning system 46, a paper feeding portion 47, a developing portion 48, a discharging lamp 49, high-voltage unit 50, a main charger 51 for receiving electric energy from the high-voltage unit 50, toner-image transfer charger 52 for receiving electric energy from the high-voltage unit 50, a paper feeding sensor 53, an alternating current power supply 54 of AC 100 V, an exposure lamp driving circuit 55, an exposure lamp 56, fixing heater-lamp driving circuit 57, a fixing heater-lamp 58, a fixing portion 59, a zero-cross detecting portion 60, a timer 61 and an operation portion 62. A power supply voltage detecting portion 64 enclosed by a two-dot chain line is used for an embodiment 3 of the present invention and an exposure-lamp-temperature detecting portion 64 enclosed by two-dot chain line is used for an embodiment 7 of the present invention. Numeral 65 designates an exposure-lamp-temperature detecting fixing heater-lamp temperature detecting portion 65 enclosed by a two-dot chain line. The RAM 4 with the back-up battery 3 may be exchanged by a flash memory or an electronically erasable programmable read-only memory (EEPROM) that can hold data while power source being turned off.

The exposure lamp driving circuit 55 and the fixing heater-lamp driving circuit 57 are connected at their input sides to the alternating current (AC) power source 54. The CPU 41 controls phase of an alternating voltage $V_{AC}$ input from the AC power source 54 by trigger signals $ST_1$ and $ST_2$ to produce phase-controlled lamp-driving voltages $V_i$ and $U_i$ which are then applied to the exposure lamp 56 and the fixing heater-lamp 58 respectively. Both driving circuits 55 and 57 have no full-wave rectifier and each of them is provided with a bi-directional switching element such as a triac to control the lamp to light. Each lamp driving circuit has no full-wave rectifier, so a lamp driving current is gradually increased every cycle and therefore alternates in positive and negative voltage in each full-wave cycle, producing noise components in both voltage. The positive and negative noise-components can, however, be cancelled by each other according to the present invention as described later.

The zero-cross detecting portion 60 detects a zero cross-point of the alternating voltage $V_{AC}$ inputted from the AC power source 54 and at the same time inputs a zero-cross signal Sz into the CPU 41. The main motor 45 is used for driving the paper feeding portion 47, other paper-feeding mechanisms and photo-sensitive drum 6 shown in FIG. 3. Other motors (e.g., a lens motor, a toner motor and a fun motor) are all omitted from the scope of description because they do not directly relate to a lamp-lighting control system according to the embodiment 1 of the present invention.

For the sake of description, the same components are designated by different numerals in FIGS. 3 and 4. Namely, the dischanging lamp is shown at 1 and 49 in FIGS. 3 and 4 respectively. Similarly, the exposure lamp is shown at 2 and 56, the fixing heater-lamp is shown at 18 and 58, the main charger is shown at 3 and 51, the paper feed sensor is shown at 10 and 53, the exposure lamp-temperature detecting portion is shown at 31 and 64 and the fixing heater-lamp-temperature detecting portion is shown at 21 and 65 respectively. The optical scanning portion 46 is composed of the lamp unit 30, the first mirror 4, the second and third mirror unit 5, the fourth and fifth mirror unit 23, the fixed focus lens 24. The paper feeding portion 47 is composed of the paper feeding rollers 12 and 11 and the paper start roller 13. The developing portion 48 is composed of the photo-sensitive drum 6, toner container 7, the magnet roller 8, the cleaner 29 and the stripping roller 16. The fixing portion 59 is composed of the upper heating roller 19, the lower heating roller 17 and the cooling fan 22. The operating portion 62 has operating keys and indicating means for indicating the operating states of the copying machine.

FIG. 5(*a*) shows a trigger timing table 42*a* which defines the correlation between a count value (variable Nz) of a zero-cross counter to be treated by the CPU 41 as described later and a time interval ti (i=0, 1 . . . ) corresponding to a firing angle ai (i=0, 1 . . . ) from a zero cross-point to a trigger timing point. This trigger timing table 42*a* is stored in the ROM 42. Values shown in this table 42*a* are applicable at a frequency of 50 Hz of an AC power supply voltage $V_{AC}$. Any value of a variable Nz of the zero-cross counter corresponds to a cycle that is specified as a half-wave of the alternating voltage $V_{AC}$. As is apparent from the trigger timing table 42*a*, one unit is composed of two continuous cycles (two counts in the variable Nz of the zero-cross counter) that have the same time interval. In the table, a series of unit cycles (two cycles) has decreasing time intervals. In practice, two cycles corresponding to 0 and 2, respectively, of the zero-cross counter variable Nz have the same time interval $t_0$=9 msec and $t_1$=9 msec and two cycles of Nz=2 and Nz=3 have the same time-interval $t_z$=8 msec and $t_3$=8 msec that is smaller than preceding two cycles by 1 msec. Similarly, subsequent two cycles of Nz=4 and Nz=5 have the same time-interval $t_4$=7 msec and $t_5$=7 msec that is smaller than preceding two cycles by 1 msec. The following pairs of two successive cycles have the same time-intervals as $t_6=t_7$=6 msec, $t_8=t_9$=5 msec, $t_{10}=t_{11}$=4 msec, $t_{12}=t_{13}$=3 msec, $t_{14}=t_{15}$=2 msec and $t_{16}=t_{17}$=1 msec. Namely, the time-intervals are decreased by 1 msec every two cycles.

FIG. 5(*b*) shows how the firing angle $\alpha_i$ and conducting angle $\beta_i$ change with time-intervals $t_i$ (i=0, 1 . . . ) preset on a timer. It is apparent that two successive cycles have the same firing angle $\alpha_i$ and the same conducting angle $\beta_i$.

Figure 6A:
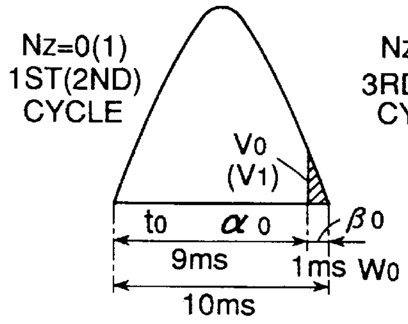
FIGS. 6A to 6I depict the operation of the embodiment 1 of the present invention, indicating the transition of a firing angle and a conducting angle according to a preset time set on a timer.
Figure 6B:
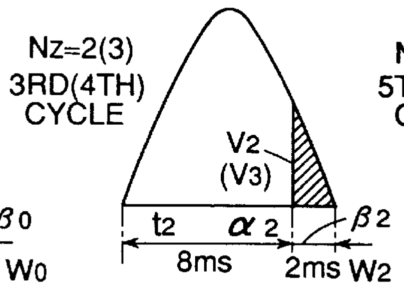
Figure 6C:
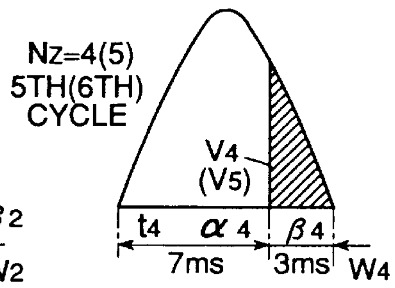
Figure 6D:
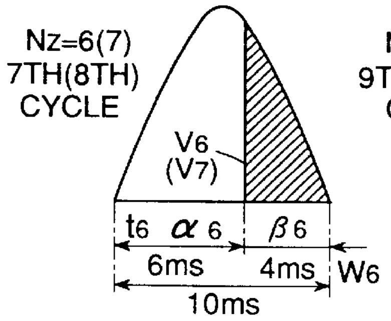
Figure 6E:
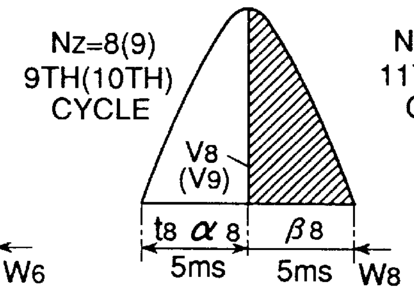
Figure 6F:
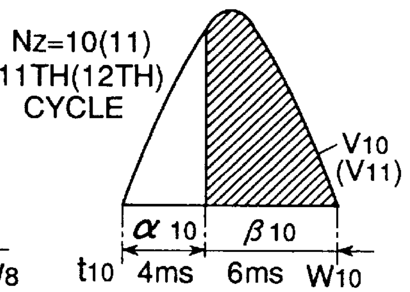
Figure 6G:
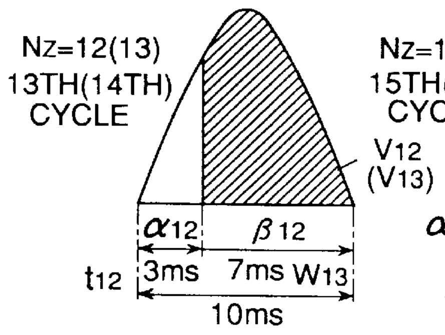
Figure 6H:
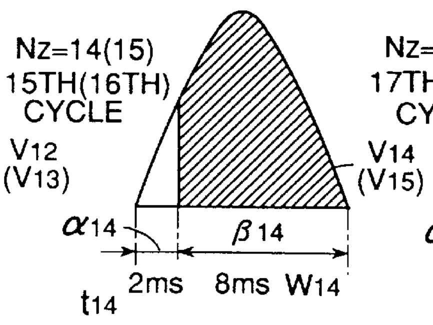
Figure 6I:
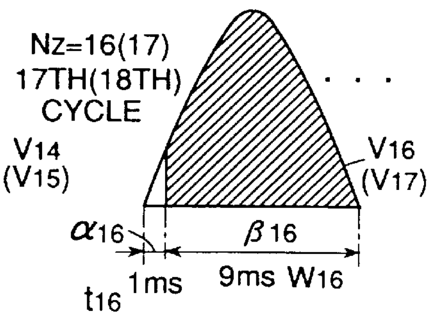

FIGS. 6A through 6I show a correlation between the time-interval $t_i$, firing angle $\alpha_i$, time-duration $W_i$ corresponding to conducting angle $\beta_i$. Since the AC power-supply voltage Avc has a frequency of 50 Hz, its full-wave cycle is of 1/50=0.02 sec=20 msec and hence its cycle is of 10 msec. In FIGS. 6A through 6I, there are shown positive cycles only. FIG. 6A shows a cycle that is positive at Nz=0 (zero-cross counter variable) and has a time-interval $t_0$=9 msec, a time-duration $W_0$=1 msec and a conducting angle $\beta_0$=18° and a cycle that is negative at Nz=1 and has a conducting angle $\beta_1$=18° (not shown) which is the same as that at Nz=0. Consequently, the lamp driving voltages $V_0$ and $V_1$ in the first and second cycles in an initial energizing period are equal to each other and very small. FIG. 6B illustrates a cycle that is positive at Nz=2 and has a time interval $t_2$=8 msec, time-duration $W_2$=2 msec and a conducting angle $\beta_z$=36° and a cycle that is negative at Nz=3 and has a conducting angle $\beta_3$=36° (not shown) which is the same as that at Nz=2. Consequently, the lamp driving voltages $V_2$ and $V_3$ in the third and fourth cycles in an initial energizing period are equal to each other and increased by a little than that in the first and second cycles. The cycles of FIGS. 6C to 6I may be explained similarly to the cycles of FIGS. 6A to 6B. In the case of FIG. 6H, a cycle of Nz=14 is positive and has a time-interval $t_{14}$=2 msec, a time-duration $W_{14}$=8 msec and a conducting angle $\beta_{14}$=144° and a cycle of Nz=15 is negative and has a conducting angle $\beta_{15}$=144° (not shown) that is equal to that of the cycle of Nz=14. Consequently, the lamp-driving voltages $V_{14}$ and $V_{15}$ corresponding to the 14th cycle and 16th cycle respectively for an initial energizing period are equal to each other and increased by a little than that in the 12th and 13th cycles of FIG. 6G. Finally, in the case of FIG. 6I, a cycle of Nz=16 has a time-interval $t_{16}$=1 msec, a time-duration $W_{16}$=9 msec and a conducting angle $\beta_{16}$=162° and a cycle of Nz=17 is negative and has a conducting angle $\beta_{17}$=162° (not shown) that is equal to that of the cycle of Nz=16. The lamp driving voltages $V_{16}$ and $V_{17}$ corresponding to the 16th cycle and 17th cycle respectively for an initial energizing period are equal to each other and increased by a little than that in the 14th and 15th cycles of FIG. 6G.

Figure 7:
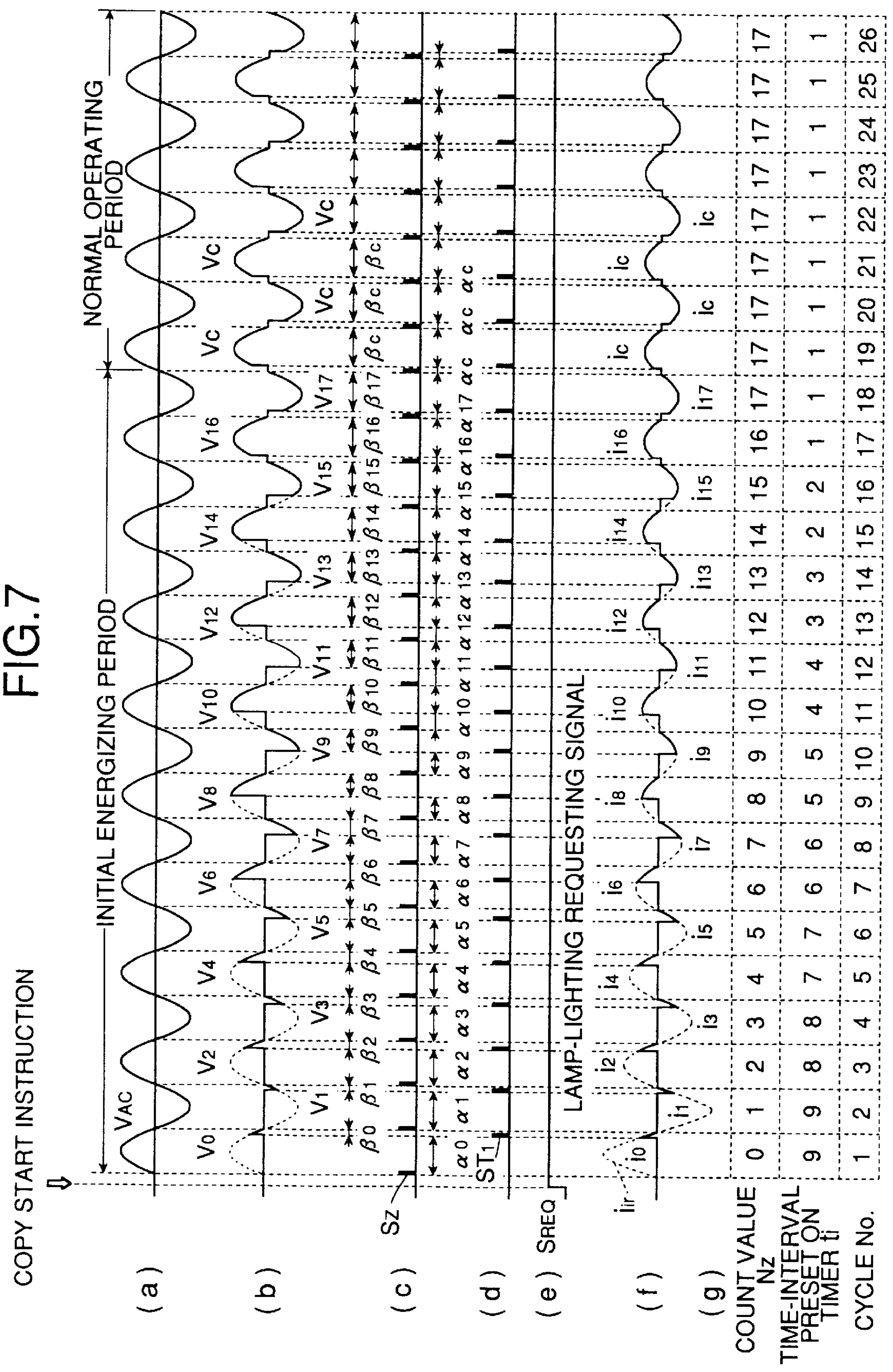
FIG. 7 shows a series of waveforms for explaining the operation of the embodiment 1 of the present invention.

Referring to FIG. 7, the operation of a lamp-lighting control system which is a first embodiment of the present invention will be described below, taking by way of an example of the case of phase control for the exposure lamp 56. (The phase control for the fixing heater-lamp 58 will be described later with respect to an embodiment 8 of the present invention.)

An alternating voltage $V_{AC}$, as shown in FIG. 7(*a*), from the AC power supply 54 is supplied to the exposure lamp driving circuit 55. When a print-start command was inputted to the copying machine through a key board of the operating portion 62, a lamp-lighting requesting signal $S_{REQ}$, as shown in FIG. 7(*e*), is generated in a specified stage of the operating process of the copying machine and input to the CPU 41. The zero-cross counter detecting portion 60 detects zero-cross point of the alternating voltage $V_{AC}$ and sends a zero-cross signal Sz, as shown in FIG. 7(*c*). Upon receipt of the lamp-lighting requesting signal a $S_{REQ}$, the CPU 41 starts reading a zero-cross signal Sz. The CPU 41 reads a specified time-interval $t_i$ (i=0, 1 . . . ) (in the trigger timing table) according to a count value (variable Nz) of the zero-cross counter and sets the time-interval on the timer 61. With an end-of-time signal from the timer 61, the CPU 41 sends a trigger signal $ST_1$ for phase control to the exposure-lamp driving circuit 55 which triac in turn conducts by the action of the trigger signal $ST_1$, generates an phase-controlled lamp-driving voltage $V_i$ (i=0, 1 . . . ) shown in FIG. 7(*d*) *by taking a portion of the alternated voltage* $V_{AC}$ defined between trigger timing and a subsequent cross-point thereof and applies said voltage to the exposure lamp 56. Consequently, phase-controlled lamp-driving current $i_i$ shown in FIG. 7(*f*) flows in the exposure lamp 56. Namely, the lamp-driving voltage $V_i$ and the lamp-driving current $i_i$ are produced when a specified time of a firing angle $\alpha_i$ elapsed from the beginning of the zero-cross signal Sz rising. The CPU 41 provides the exposure-lamp driving circuit 55 with trigger signals $ST_1$ in such timings at which the exposure-lamp driving circuit 55 may gradually increase the conducting angle $\beta_i$ by decreasing the firing angle a, every two cycles in order to drive the exposure lamp 58 by applying thereto the driving voltage $V_i$, whose level is the same for two successive cycles and gradually increases every two cycles. Thus, the lamp-driving current $i_i$ flowing the exposure lamp 56 for an initial energizing period can be effectively modeled as shown in FIG. 7(*f*), preventing the occurrence of inrush current $i_{ir}$ shown by broken line in FIG. 7(*f*). Thus, the soft starting of the exposure lamp 56 is realized.

More practically, the first and second cycles are controlled to have the same firing angles $\alpha_0=\alpha_1$ and the same conducting angles $\beta_0=\beta_1$, thus attaining the same lamp-driving voltages $V_0=V_1$ and the same lamp-driving currents $i_0=i_1$. The third and fourth cycles are controlled to have the same firing angles $\alpha_{2=\alpha 1}$ and the same conducting angles $\beta_0=\beta_1$, thus attaining the same lamp-driving voltages $V_2=V_3$ and the same lamp-driving currents $i_2=i_3$. In this case, $\alpha_0=\alpha_1>\alpha_2=\alpha_3$, $\beta_0=\beta_1<\beta_2=\beta_3$, $V_0=V_1<V_2=V_3$ and $i_0=i_1<i_2=i_3$ while $\alpha_0+\beta_0=\alpha_1+\beta_1=\alpha_2+\beta_2=\alpha_3+\beta_3=\pi=180°$. The fifth and cycles are controlled to have the same firing angles $\alpha_4=\alpha_5$ and the same conducting angles $\beta_4=\beta_5$, thus attaining the same lamp-driving voltages $V_4=V_5$ and the same lamp-driving currents $i_4=i_5$. Similarly, the seventh and eighth cycles are controlled to have the same values of parameters, the ninth and tenth cycles are controlled to have the same values of parameters, the eleventh and twelfth cycles are controlled to have the same values of parameters, the thirteenth and fourteenth cycles are controlled to have the same values of parameters, the fifteenth and sixteenth cycles are controlled to have the same values of parameters, the seventeenth and eighteenth cycles are controlled to have the same values of parameters.

Namely, the conducting angle $\beta_i$ is gradually increased by every two cycles as $\beta_0=\beta_1<\beta_2=\beta_3<\beta_4=\beta_5<\beta_6=\beta_7<\ldots<\beta_{16}=\beta_{17}$ by gradually decreasing the firing angle $\alpha_i$ as $\alpha_0=\alpha_1>\alpha_2=\alpha_3>\alpha_4=\alpha_5>\alpha_6=\alpha_7>\ldots>\alpha_{16}=\alpha_{17}$. This increases the lamp driving voltage $V_i$ gradually every two cycles as $V_0=V_1<V_2=V_3<V_4=V_5<V_6=V_7<\ldots<V_{16}=V_{17}$, resulting in gradually increasing the lamp-driving current $i_i$ every two cycles as $i_0=i_1<i_2=i_3<i_4=i_5<i_6=i_7<\ldots<i_{16}=i_{17}$.

Referring now to flow charts of FIGS. 8 and 9, the operation of CPU 41 will be described.

The copying machine is now turned on. The CPU 41 starts performing control operation from step S1 (FIG. 8) according to the program stored in the ROM 42. Values of control flags and registers are initialized (Step S1) for preparation for a new cycle of copying operation. In particular, it is essential to reset a flag $O_{ss}$ "End of soft-start" and a variable Nz of the zero-cross counter. At Step S2, a command to start copying is entered into the copying machine through the operating portion 62 and, then, the procedure proceeds to Step S3. Namely, the main motor 45 is driven, the high-voltage unit 50 is turned on and the discharging lamp 49 is switched on. The high-voltage unit 50 drives the main charger 51 and the toner-image transfer charger 52. At Step S4, a zero-cross interruption is allowed. At Step S5, the paper feeding portion 47 is driven, the exposure lamp 56 is energized, the optical scanning system 46 is driven, the developing portion 48 is turn on and the fixing portion is driven. The exposure lamp 56 is driven through the exposure lamp driving circuit 55. When the fixing portion 59 is driven, the fixing heater-lamp 58 is also energized by the fixing heater-lamp driving circuit 57. Interruption with the zero-cross signal occurs when the exposure lamp 58 is driven at Step 5. At Step S6, the CPU 41 determines whether the paper feeding sensor 53 detected the absence of the paper. If so, the process proceeds to Step S7, at which the exposure lamp 56 is turned off and the optical scanning portion 46 is returned into its home position. At Step S8, the end-of-soft-start flag $F_{ss}$ is reset. At Step S9, it is determined whether a copy counter counted the preset number of necessary copies. If not, the process returns to Step S5 for making a copy of the original image on a subsequent paper sheet. When the preset number of copies was made, the process proceeds to Step S10. The high-voltage portion 50 is switched off, the discharging lamp 48 is turned off and the main motor 45 stops. The process returns to Step S2 until a main power source is switched off at Step S11. The above-mentioned operations of the copying machine are similar to those performed by standard copying machines and do not directly concern with the objects of the present invention. So, the process will not be further described.

Referring now to a flowchart of FIG. 9, the control operation of the CPU 41 according to a subroutine of interruption with zero-cross counter actions will be described.

In the process of the copying machine, the zero-cross detecting portion 60 detects a zero-cross-point of an alternating voltage $V_{AC}$ from an alternating current power source 54 and outputs a zero-cross signal Sz to the CPU 41. The CPU 41 receives the signal Sz and changes-over the processing from a main routine of FIG. 8 to the subroutine for "zero-cross interruption" of FIG. 9. At Step S21, when a zero-cross signal Sz (FIG. 7(*c*)) is inputted in the process of the copying operation, CPU 41 determines whether a light requesting signal $S_{REQ}$ (FIG. 7(*c*)). If not, the CPU 41 returns to the main routine ignoring the zero-cross signal Sz. With the light requesting signal $S_{REQ}$, the CPU 41 inhibits "interrupt" at Step S22, and retrieves a last counted value $N_{END}$ in a variable Nz of the zero-cross counter in the trigger timing table 42*a* (FIG. 5(*a*)) stored in the ROM 42 and stores the last counted value $N_{END}$ in a register at Step S23. The last counted value $N_{END}$ in the case of FIG. 5(*a*) is 17 ($N_{END}$=17). At Step S24, the CPU tuns off the energizing current to the exposure lamp 56 for the reason to be described later. At Step S25, the CPU determines whether the flag $F_{ss}$ indicating the end of soft-start is set or not ($F_{ss}$ =17?). If not, the process advances to Step S26 at which the CPU 41 determines whether the zero-cross counter variable Nz reaches the last counted value $N_{END}$ (Nz=$N_{END}$?). Namely, it is judged whether an initial energizing period shown in FIG. 7 ceases or not. If not, the process proceeds to Step S27. The CPU reads a time-interval $t_1$ corresponding to a current counted value in the variable Nz of the zero-cross counter in the trigger timing table 42*a* and loads the read-out time-interval on the timer 61. At Step 28, the CPU 41 starts the timer 61 to count the preset time. In the first cycle shown in FIG. 5, the zero-cross counter variable Nz is "0" and time-interval to is 9 msec. At Step S29, the CPU waits for the timer 61 to count up the preset value. After this, the process proceeds to Step S30. The CPU 41 outputs a trigger signal $ST_1$ (FIG. 7(*d*)) to a bi-directional switching element (e.g., triac) of the exposure lamp driving circuit 55 which in turn starts energizing the exposure lamp 56. At Step S31, the CPU 41 determines whether the flag Fss indicating the end of soft-start is set or not ($F_{ss}$=1?). Since the flag $F_{ss}$ is unset in the initial energizing period, the process advances to Step S32. The CPU 41 increases by 1 the value (Nz–Nz+1) in the variable Nz of the zero-cross counter for preparation for the subsequent value wave cycle. AT Step S33, the CPU 41 cancels the inhibition for interruption and returns to the main routine. With a next interruption with a zero-cross signal, Steps S21 to S23 are performed and the current to the exposure lamp 56 is turned off at Step S24. In case when a triac is used as a bi-directional switching element in the exposure lamp driving circuit 55, the current to the exposure lamp 56 is automatically turned off at a zero-cross point detected. Thus, as shown in FIG. 7 and FIG. 6, the exposure lamp 56 is turned on with an elapse of time-interval ti (firing angle ai) after rising a zero-cross signal Sz, energized for a duration corresponding to a conducting period $W_i$ (conducting angle $\beta_i$) and turned off at the moment of rising a subsequent zero-cross signal Sz. Namely, the phase control of the exposure lamp 56 is executed according to the counted values of the zero-cross counter variable Nz. The first cycle ceases at Step S24 at which the current to the exposure lamp is turned off and the second cycle begins therefrom. With an elapse of a time-interval $t_i$ (firing angle $\alpha_i$) (i.e., through Steps S25 to S33) after the zero-cross point, the CPU starts the supply of current to the lamp 56 and continues the current supply for a specified period $W_1$ (conducting angle $\beta_i$) corresponding to a conducting angle $\beta_i$ till a subsequent zero-cross point, then the CPU 41 returns to the main routine. With a new interruption with a zero-cross signal, the CPU repeats the control operations and turns off the supply of current to the exposure lamp at Step S24. The phase control is thus conducted.

Referring mainly to FIG. 7, the first and second cycles (FIG. 6A) are examined in detail. The first cycle is specified by a zero-cross counter variable Nz=0, a time-interval $t_0$=9 msec, a firing angle $\alpha_0$, a period $W_1$=1 msec corresponding to a conducting angle $\beta_0$. In this cycle, a substantially small lamp-driving voltage $V_0$ (FIG. 7(*b*)) is applied to the exposure lamp 56 in which a lamp-driving current $i_1$ reduced as shown in FIG. 7(*f*) flows preventing the occurrence of inrush current $i_{1r}$ shown by a broken line. The second cycle is specified by a zero-cross counter variable Nz=1 (increment), a time-interval $t_1$=9 msec (=$t_0$ of the first cycle), a firing angle $\alpha_1$, a period $W_1$=1 msec (=$W_0$) corresponding to a conducting angle $\beta_1=\beta_0$. In this cycle, a substantially small lamp-driving voltage $V_1=V_0$ (FIG. 7(*b*)) is applied to the exposure lamp 56 in which a lamp-driving current $i_i$=io reduced as shown in FIG. 7(*f*) flows preventing the occurrence of inrush current $i_{ir}$ shown by a broken line. Thus, the soft-start operation for driving the exposure lamp 56 is started.

The first cycle produces positive lamp-driving voltage Vo and current $i_0$ while the second cycle produces negative lamp-driving voltage $V_1$ and current $i_1$. Both driving voltages $V_0$ and $V_1$ have the same absolute value $V_0=V_i$ and both currents $i_0$ and $i_1$ have the same absolute value $i_0=i_1$. Consequently, noise components in positive and negative voltages have the same level and magnetic noises in both voltages cancel each other out.

On the basis of a decision to be made by the CPU at Step S26, the above-mentioned operations (cycles) will be repeated until the zero-cross counter variable Nz reaches to a last count value $N_{END}$. With each interruption for zero-cross processing, the CPU 41 loads a time-interval $t_1$ corresponding to a current value of the zero-cross counter variable Nz onto the timer 61. When the time-interval $t_i$ elapsed, the CPU 41 starts energizing the exposure lamp for a period $W_i$ corresponding to a conducting angle $\beta_i$ by phase control.

Referring mainly to FIG. 7, the third and fourth cycles (FIG. 6B) are studied in detail. The third cycle is specified by a zero-cross counter variable Nz=2, a time-interval $t_3$=8 msec, a firing angle $\alpha_2$, a period $W_2$=2 msec corresponding to a conducting angle $\beta_2$. In this cycle, a substantially small lamp-driving voltage $V_2$ is applied to the exposure lamp 56 in which a reduced lamp-driving current $i_1$ flows preventing the occurrence of inrush current $i_{ir}$. The fourth cycle is specified by a zero-cross counter variable Nz=3 (increment by 1), a time-interval $t_3$=8 msec (=$t_2$ of the third cycle), a firing angle $\alpha_3(=\alpha_2)$, a period $W_3$=2 msec (=$W_2$) corresponding to a conducting angle $\beta_3(=\beta_2)$. In this cycle, a substantially small lamp-driving voltage $V_3=V_2$ is applied to the exposure lamp 56 in which a reduced lamp-driving current $i_3=i_2$ flows preventing the occurrence of inrush current its. The third cycle produces positive lamp-driving voltage $V_2$ and current $i_2$ while the fourth cycle produces negative lamp-driving voltage $V_3$ and current $i_3$. Both driving voltages $V_2$ and $V_3$ have the same absolute value $V_2=V_3$ and both currents $i_2$ and $i_3$ have the same absolute value $i_2=i_3$. Consequently, noise components in positive and negative voltages have the same level and magnetic noises in both voltages cancel each other out. The lamp-driving voltages $V_2$, $V_3$ and currents $i_2$, $i_3$ have slightly increased values as compared with those of the first and second cycles.

The fifth and sixth cycles (FIG. 6C) are specified respectively by zero-cross counter variables Nz=4, 5, time-intervals $t_4=t_5$=7 msec, firing angles $\alpha_4=\alpha_5$, periods $W_4=W_5$=3 msec corresponding to conducting angles $\beta_4=\beta_5$. In this cycle, a substantially small lamp-driving voltage $V_4=V_5$ is applied to the exposure lamp 56 in which a reduced lamp-driving current $i_4=i_5$ flows preventing the occurrence of inrush current $i_{ir}$. Noise components in positive and negative voltages have the same level and magnetic noises in both voltages cancel each other out. The lamp-driving voltages $V_4$, $V_5$ and currents $i_4$, $i_5$ have slightly increased values as compared with those of the third and fourth cycles.

The above-mentioned operations (cycles) will be repeated until the zero-cross counter variable Nz reaches to a last count value $N_{END}$ (i.e., the seventeenth and eighteenth cycles are completed). Namely, the firing angle $\alpha_i$ is gradually decreased by every two cycles as $\alpha_0=\alpha_1>\alpha_2=\alpha_3>\alpha_4=\alpha_5>\alpha_6=a\alpha_7> \ldots >\alpha_{16}=\alpha_{17}$, thereby the conduction angle $\beta_i$ is gradually increased every two cycles as $\beta_0=\beta_1<\beta_2=\beta_3<\beta_4=\beta_5<\beta_6=\beta_7< \ldots <\beta_{16}=\beta_{17}$. Consequently, the lamp driving voltage $V_i$ is gradually increased as $V_0=V_1<V_2=V_3<V_4=V_5<V_6=V_7< \ldots <V_{16}=V_{17}$ and, accordingly, the lamp driving current $i_i$ is gradually increased as $i_0=i_1<i_2=i_3<i_4=i_5<i_6=i_7< \ldots <i_{16}=i_{17}$.

The "soft-start-ending" flag $F_{ss}$ is reset at Step S8 (FIG. 8) upon completion of a sequence of the processing operation.

In consequence of the above-mentioned soft-start control operation, inrush currents $i_{ir}$ for initial lamp-energizing period can be effectively prevented, and, furthermore, noise components that may occur in positive and negative voltages in the lamp-driving circuit without full-wave rectifier can be of the same level and can effectively cancel each other out without using any noise reducing circuit. Thus, such noises produced at an AC plug socket are sufficiently suppressed to comply with the recently set forth regulations for protecting peripheral appliances against external noises and disturbance. Namely, the system can effectively prevent the occurrence of electromagnetic noise for an initial lamp-energizing period, thus eliminating the possibility of erroneous operation of the image forming device by lamp-noises.

Referring again to FIG. 9, the seventeenth cycle is specified by an incremented count value of the zero-cross counter variable $NZ=N_{END}$ (=17) at Step S32. At Step S26, the zero-cross-counter variable Nz is judged to be the last count value $N_{END}$ and the process advances to Step S34 maintaining the count value $Nz=N_{END}$. The soft-start ending flag $F_{ss}$ is set ($F_{ss}$←1). At Step S33, the interrupt inhibiting signal is removed and main routine is restored. The eighteenth cycle starts from Step S24 at which the electricity is went off for the seventeenth cycle. At Step S25, the soft-start ending flag $F_{ss}$ is judged to be set ($F_{ss}$=1), so the process advances skips to Step S27 over Step S26. The operation from Step S27 to Step S30 is performed in same manner as mentioned above, then the soft-start ending flag $F_{ss}$ is judged whether set or not ($F_{ss}$=1?), then judged to be positive in this turn set ($F_{ss}$=1 at Step S31). The process skips over Step S32 (i.e., without making an increment of the zero-cross counter variable Nz) and proceeds to Step S33 at which the interrupt inhibiting signal is removed and the main routine is restored, storing the zero-cross counter variable $Nz=N_{END}$. At the next eighteenth cycle control ceases by turning off the electricity to the exposure lamp 56 at Step S24 at which the nineteenth cycle begins, i.e., the initial lamp-energizing period ceases and a normal copying operation period begins.

Since the zero-cross counter variable Nz is still set at the last count value $N_{END}$ ($Nz=N_{END}$) even in the normal copying operation period, the same phase control on every two cycles as those of the seventeenth and eighteenth cycles will be repeated in the following cycle. In this sense, it may be said that the normal copying operation have already begun from the seventeenth and eighteenth cycles. The eighteenth cycle and the cycles following thereafter will be controlled maintaining the zero-cross-counter variable Nz at 17, time-interval $t_i$ (i=16, 17 . . . ) at 1 msec, conducting angle $\beta_i$ at βc (constant), conducting duration $W_1$ at 9 msec, lamp-driving voltage $V_i$ at a constant Vc and lamp driving current $i_i$ to be at a constant ic. Consequently, the phase control enters into stable state.

Although the above-mentioned embodiment 1 of the present invention, gradually decreasing a firing angle $\alpha_i$ is and a conducting angle β every two cycles, thus gradually increasing a lamp-driving voltage $V_i$ and lamp-driving current $i_i$ every two wave cycles, the it may not be limited to control on said "every two cycles" and may execute the phase control on every four cycles or six cycles other than odd-number of cycles to gradually increase the conducting angle $\beta_i$ every even-numbered cycles such as. In this instance, the system can realize soft-starting of exposure lamp by a lamp driving circuit 55 without using a full-wave rectifier and any additional noise reducing circuit, effectively preventing inrush current from occurring in an initial lamp-energizing period and, at the same time, making noise components in positive and negative voltages be of the same level allowing positive and negative magnetic noises to cancel out each other. In particular, noises producible at an AC plug socket can effectively be suppressed. These features enable the lamp system to be compact and comply with the recently set-forth regulation on noise disturbance to peripheral devices. The described embodiment can effectively prevent the occurrence of noises in the initial lamp-energizing period, thus eliminating the possibility of the erroneous operation, e.g., voluntarily stopping or starting of the copying machine by the effect of lamp noises.

Figure 9:
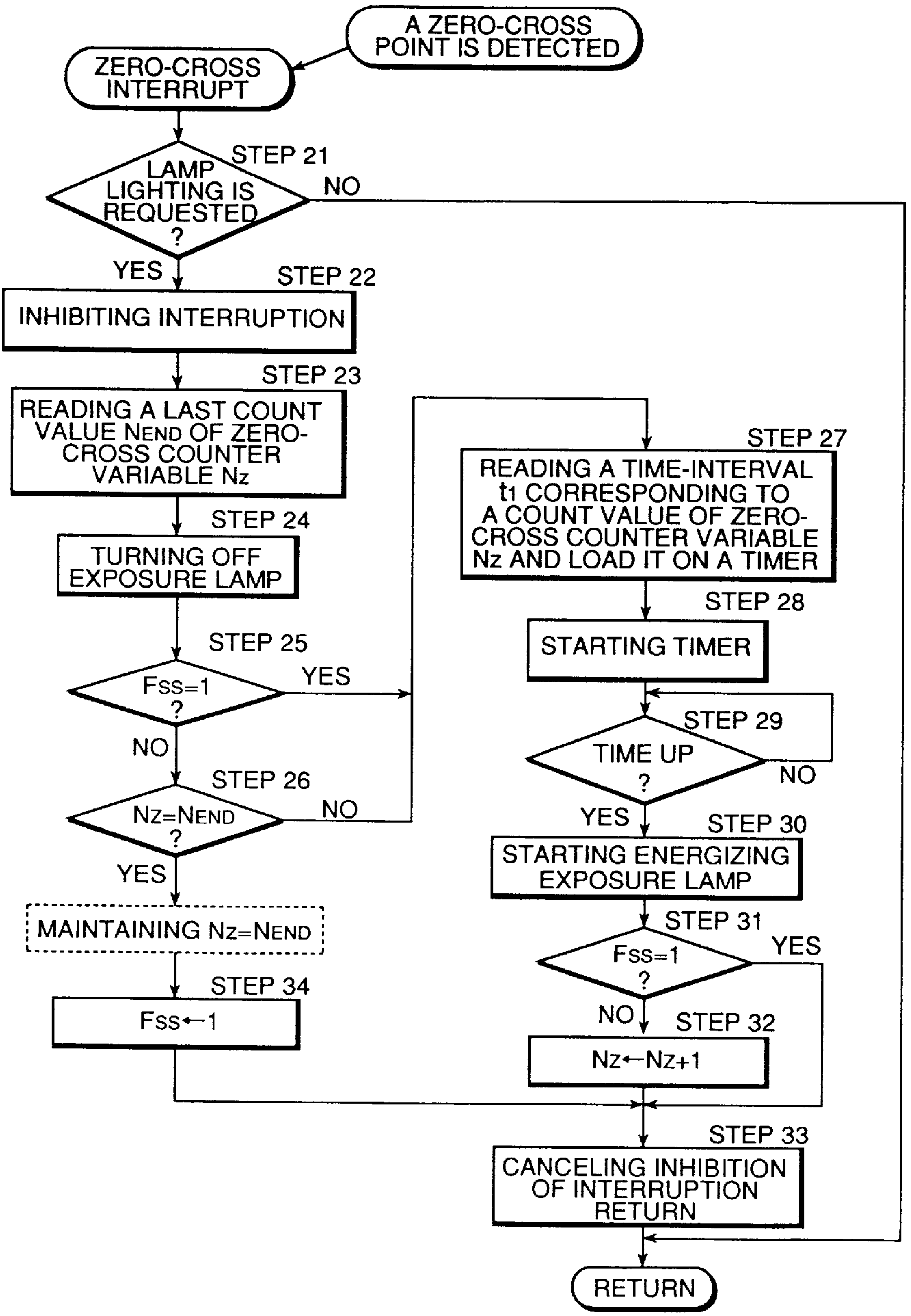
FIG. 9 is a flow chart for explaining the operation of the embodiment 1 according to a subroutine for zero-cross interruption.

The phase control similar to that described for the exposure lamp 56 according to the flowchart of FIG. 9 may be applied to the heater-lamp 58 of the fixing portion 59.

Embodiment 2

In the above-described embodiment 1, the conducting angle $\beta_i$ is gradually and regularly increased every two cycles throughout the initial lamp-energizing period. The lamp driving current may rise at a relatively high speed and sometimes inrush current $i_{ir}$ may not sufficiently be suppressed, resulting in producing noises. The embodiment 1 uses a trigger timing table 42*a* wherein the zero-cross counter variable Nz has a last count value $N_{END}$=17 in compliance with 18 cycles. An increment of lamp-driving current $i_i$ can be reduced by increasing the number of cycles. For example, an increment is reduced to ½ by doubling the number of cycles (18×2=32). This may effectively suppress inrush current $i_{ir}$ but be accompanied by a problem of elongated rising time of the exposure lamp 56, i.e., time required to enter into the normal operation state. This problem is solved by the embodiment 2 which will be described below.

FIG. 10(*a*) shows a trigger timing table 42*b* stored in a read-only memory (ROM) 42, which is used in the embodiment 2 of the present invention. This trigger timing table 42*b* defines the correlation between values of zero-cross counter variable Nz to be treated by a CPU 41 and values of time-interval $t_i$ (i=0, 1 . . . ) corresponding to a firing angle $\alpha_i$ (i=0, 1 . . . ) specified by a distance from a zero-cross point to a triggering time-point. Values in the trigger timing table 42*b* are applicable at the frequency 50 Hz of an alternating voltage $V_{AC}$. Any value of the zero-cross counter variable Nz corresponds to a cycle.

In this trigger timing table 42*b*, six cycles have a time-interval $t_i$ to be set at 8 msec on a timer. Namely, a time-interval $t_2$ is 8 msec at a zero-cross counter variable Nz=2, a time-interval $t_3$=8 msec at Nz=3, a time-interval $t_4$ is 8 msec at Nz=4, a time-interval $t_5$ is 8 msec at Nz=5, a time-interval $t_6$ is 8 msec at Nz=6 and a time-interval $t_7$ is 8 msec at Nz=7. Namely, the number of cycles of 8 msec is 3 times than any other paired cycles of the same respective time-intervals. The total number of cycles is 22 that is sufficiently smaller than 36 cycles described above. The table is similar to that of the embodiment 1 except the above-mentioned feature.

FIG. 10(*b*) shows the relationship between a conducting angle $\beta_i$ and a time-interval $\alpha_i$ corresponding to a time-interval $t_i$ (i=0, 1 . . . ). In principle, cycles have the same firing angle values $\alpha_i$ and the same conducting angle values $\beta_i$ by every two cycle, excepting the six cycles of zero-cross counter variable values Nz=0 to 7 having the same firing angle $\alpha_i$ and the same conducting angle $\beta_i$.

In this case, the exposure lamp 56 is energized with a substantially low-level driving current $i_2$ to $i_7$ of the same value in an early stage of an initial lamp-energizing period. This increases the reliability of suppressing the inrush current $i_{ir}$ as compared with the embodiment 1. In addition, the number of cycles for the lamp-energizing period is relatively small (i.e., 22), not so much elongating the time for bringing the exposure lamp 56 into the normal working state. Namely, the embodiment 2 can realize rising of the exposure lamp 56 within a relatively short period without the occurrence of noises by reliably suppressing inrush current $i_{ir}$.

The results of experiments made on the embodiments are shown in Table 1.

TABLE 1

| Soft Start Control | Measurements of Noise |
|---|---|
| None | x |
| Embodiment 1 with the same intervals | ○ |
| Embodiment 2 with 8 msec for 6 cycles | ☆ |

In Table 1, the system without soft start control has poor results "×" (noises are measured), the embodiment 1 has relatively good results "○" (noises were relatively well suppressed but occurred in the worst working conditions) and the embodiment 2 has satisfactory results "☆" (noise scarcely occurred).

The phase control method according to the embodiment 2 may be also applied to the fixing heater-lamp 58.

Embodiment 3

An alternating voltage $V_{AC}$ of the AC power supply 54 may vary depending upon time zones of a day. Inrush current to a lamp in an initial energizing period may vary with dairy time-zone variation of the alternating voltage $V_{AC}$. Accordingly, there may arise such a problem that inrush current may not sufficiently be suppressed if the conducting angle $\beta_i$ is increased gradually at a fixed rate.

A lamp-lighting control system according to the embodiment 3 of the present invention is intended to sufficiently suppress at any time inrush current that may occur due to daily time-zone variation of an alternating voltage $V_{AC}$.

To realize the above-mentioned object, the lamp-lighting control system is provided with a power-supply voltage detecting portion 63 shown in particular by two-dot chain line in FIG. 4.

Figure 11:
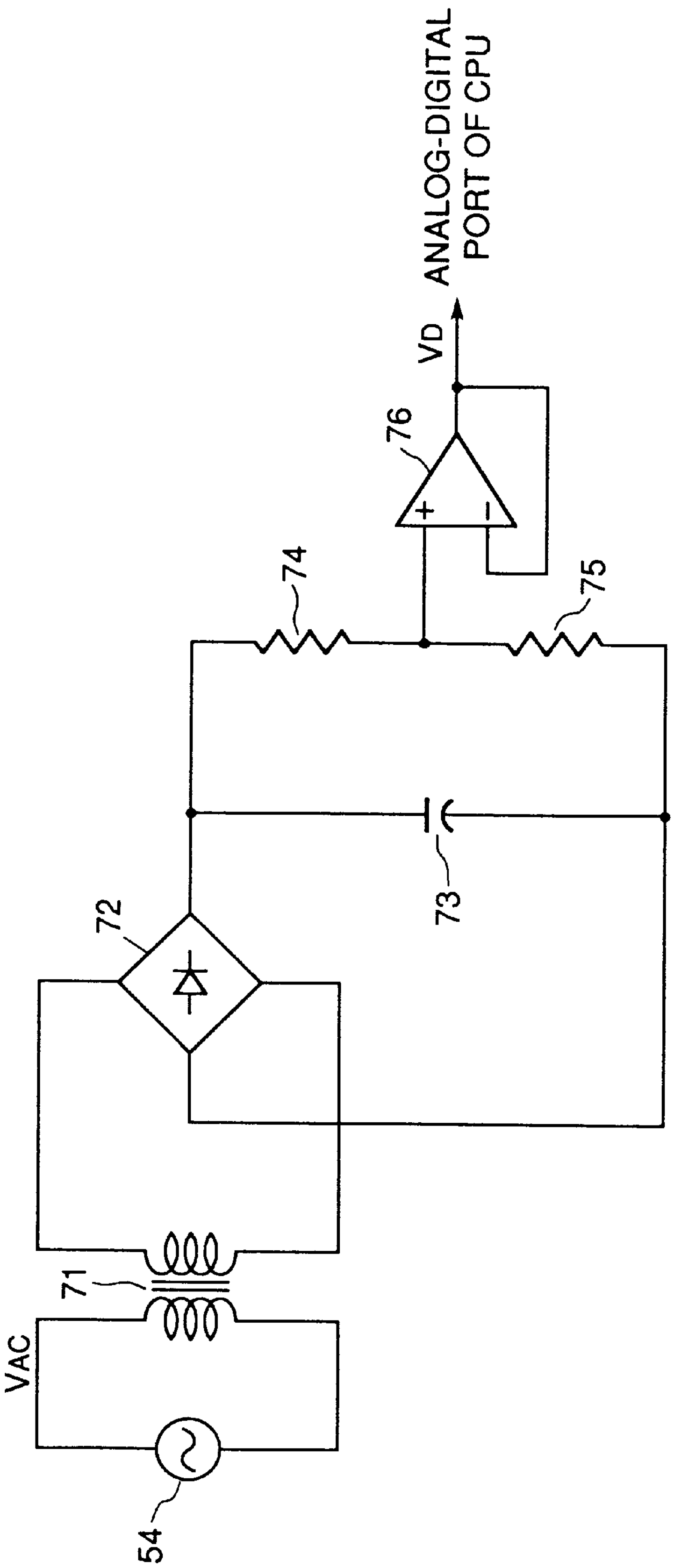
FIG. 11 is a circuit diagram of a power-supply voltage detecting portion used in a lamp lighting control system according to an embodiment 3 of the present invention.

FIG. 11 is a circuit diagram showing a practical configuration of the power-supply voltage detecting portion 63. In FIG. 11, there is shown an alternating current power supply 54, a transformer 71, a diode bridge 72 for full-wave rectification, a smoothing capacitor 73, resistance type potential dividers 74, 75, and a voltage follower 76 using an operational amplifier.

An alternating voltage $V_{AC}$ from the AC power supply 54 is inputted to the transformer 71 whereby it is dropped and converted into a secondary supply voltage. The secondary voltage of the transformer 71 is subjected to full-wave rectification by the diode bridge 72 and then to smoothing by the smoothing capacitor 73. The smoothed voltage is divided by the resistance type potential dividers 74 and 75. The divided potentials through the voltage follower 76 are inputted as a detected power-supply voltage $V_D$ to analog-digital port of the CPU 41. Since this power-supply voltage detecting portion 63 has no stabilizing circuit, a variation of the AC power-supply voltage $V_{AC}$ is converted in level and inputted as an analog voltage data to the CPU 41 wherein the input is converted by an incorporated therein analog-to-digital converter into digital data. Thus, the voltage is converted by the power-supply voltage detecting portion 63 to a detected power-supply voltage $V_D$ of not grater than 5 V that is allowable for CPU 41.

Table 2 shows a correlation between a range of level variations of an alternating voltage $V_{AC}$ to be supplied from an AC power supply 54 and a range of level variations of a detected power-supply voltage outputted from the voltage follower 76.

TABLE 2

| No. | AC Power-Supply Voltage $V_{AC}$ | Detected Power-Supply Voltage $V_D$ | Digital Value |
|---|---|---|---|
| #1 | 85 V $\leqq V_{AC}$ < 90 V | 1.0 V $\leqq V_D$ < 1.5 V | $0_H$ |
| #2 | 90 V $\leqq V_{AC}$ < 95 V | 1.5 V $\leqq V_D$ < 2.0 V | $1_H$ |
| #3 | 95 V $\leqq V_{AC}$ < 100 V | 2.0 V $\leqq V_D$ < 2.5 V | $2_H$ |
| #4 | 100 V $\leqq V_{AC}$ < 105 V | 2.5 V $\leqq V_D$ < 3.0 V | $3_H$ |
| #5 | 105 V $\leqq V_{AC}$ < 110 V | 3.0 V $\leqq V_D$ < 3.5 V | $4_H$ |
| #6 | 110 V $\leqq V_{AC}$ < 115 V | 3.5 V $\leqq V_D$ < 4.0 V | $5_H$ |
| #7 | 115 V $\leqq V_{AC}$ | 4.0 V $\leqq V_D$ | $6_H$ |

The detected power-supply voltage $V_D$ outputted from the voltage follower 76 and inputted to the A/D port of the CPU 41 is converted by the incorporated analog-to-digital converter into hexadecimal digital value that is also shown in Table 2. In Table 2, an AC power-supply voltage $V_{AC}$ being equal to and higher than 85 V is classified into 7 level-ranges. The 7th range contains all voltages higher than 115 V.

The ROM 42 stores 7 trigger timing tables 42*c* to 42*i* (see FIG. 12A to 12C) in accordance with the above-mentioned 7 ranges of an AC power-supply voltage $V_{AC}$. The trigger timing tables 42*c*, 42*d*, 42e, 42*f*, 42*g*, 42*h* and 42*i* correspond to level-ranges #1, #2, #3, #4, #5, #6 and #7, respectively, of Table 2. The alternating voltage $V_{AC}$ in the range 85 to 90 V is reflected in the trigger timing table 42*c* that contains only 6 cycles to be phasely controlled. The alternating voltage $V_{AC}$ being equal to and higher than 115 V is controlled by using the trigger timing table 42*i* (see FIG. 12C(*g*)) that contains 18 cycles for phase control. Thus, the trigger timing table for higher alternating voltage $V_{AC}$ contains morecycles.

The ROM 42 also stores a table-number selecting table 42*j* (see FIG. 13) that designates table numbers #1 to #7 (trigger timing tables 42*c* to 42*i*) according to digital values obtained by analog-to-digital conversion of detected power-supply voltage $V_D$.

Figure 14:
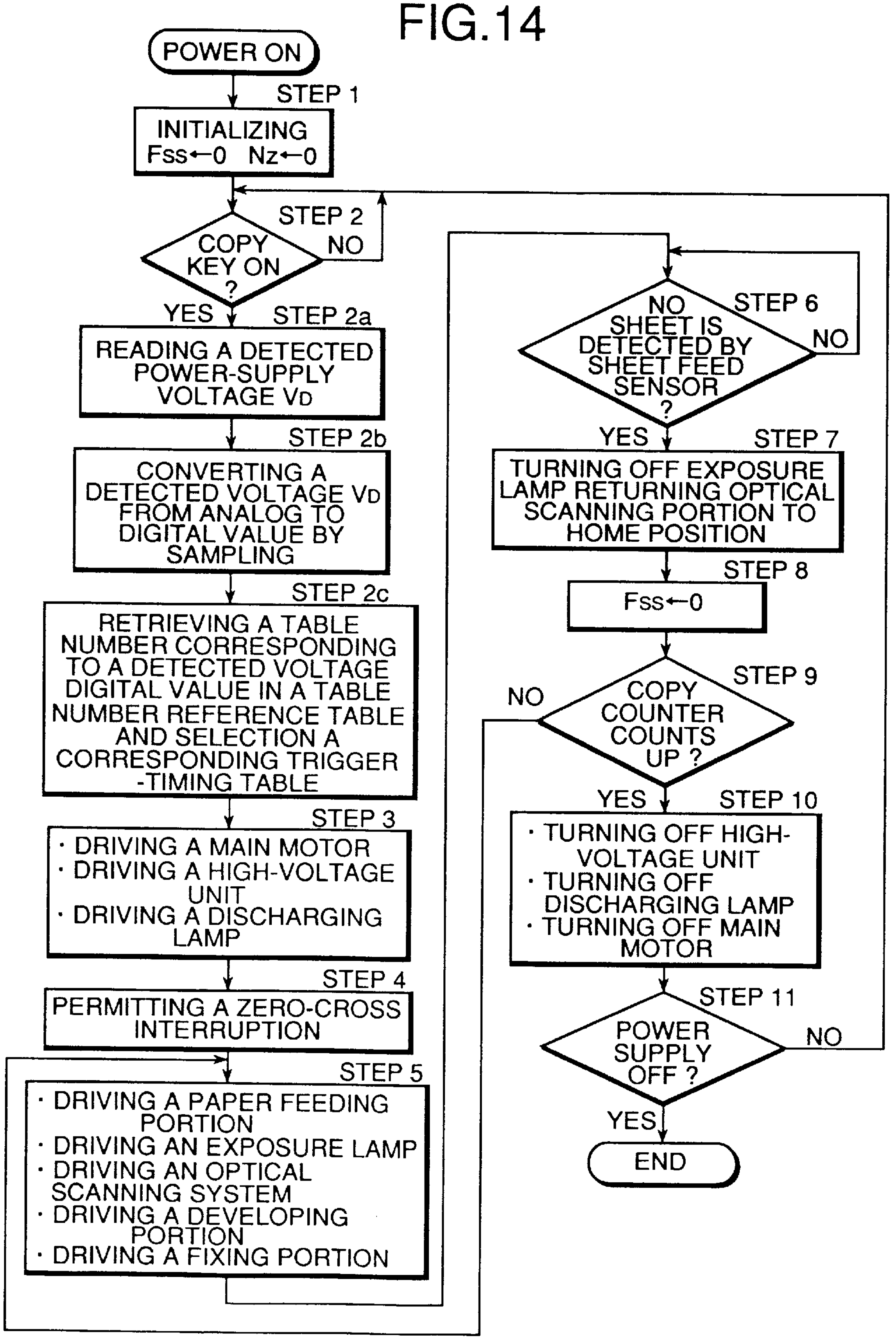
FIG. 14 is a flow chart for explaining the operation of the embodiment 3 according to a main routine.

Referring to a flowchart of FIG. 14, the operation of the embodiment will be described.

Figure 8:
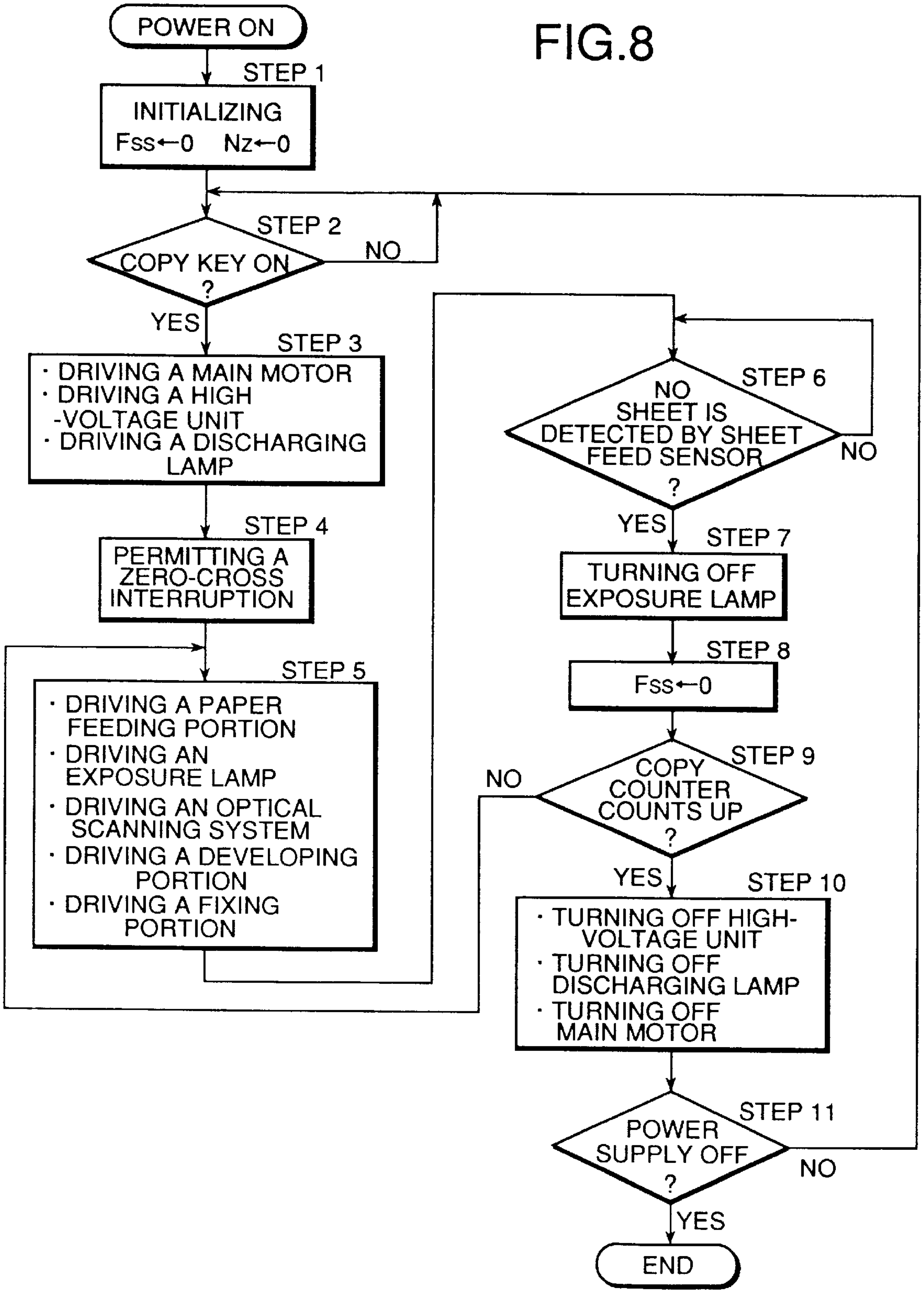
FIG. 8 is a flow chart for explaining the operation of the embodiment 1 according to a main routine.

The operation of the embodiment is basically similar to that of the embodiment 1 (FIG. 8). Steps S2*a*, S2*b* and S2*c* are interposed between Steps S2 and S3. At Step S2, it is recognized that an input signal is inputted from a copy-operation key of the copying machine. At Step S2*a*, a detected power-supply voltage $V_D$ from the voltage follower 76 (of the power-supply voltage detecting portion 63) is read into an A/D port of the CPU 41. At Step S2*b*, the inputted power-supply detected voltage $V_D$ is converted by sampling from analog value to digital value. At Step S2*c*, a table number corresponding to the digital value of the detected power-supply voltage $V_D$ is selected from the table-number selecting table 42*j* and is set in a register. The process proceeds to Step S3.

The trigger timing table corresponding to the level-range of the power-supply detected voltage $V_D$ (detected as soon as the copy operation signal was inputted) selected and registered at Step S2*a* and S2*b*is selected from 7 trigger timing tables 42*c* to 42*i*. At Step S27, to perform the "zero-cross interrupt" subroutine shown in FIG. 9, a time-interval t1 corresponding to a current count value of the zero-cross counter variable Nz in the selected trigger timing table is selected and loaded on the timer 61.

When the AC power-supply voltage $V_{AC}$ (applied with input signal from the copy operation) is, for example, within the range of 85 to 90 V, a detected power-supply voltage $V_D$ of 1.0 to 1.5 V is outputted from the power-supply voltage detecting portion 63 and subjected to analog-to-digital conversion to derive a digital value $O_H$ as shown in Table 2. Accordingly, a table number 1 corresponding to the digital value $O_H$ is found in the table-number selecting table 42*j* (FIG. 13) and the trigger timing table 42*c* (FIG. 12A(*a*)) is therefore selected. The selected table 42*c* contains 6 cycles for phase control. The time-interval t0 from the zero-cross counter variable Nz=0 is very short (3 msec) and, therefore, a conducting duration $W_0$ corresponding to a conducting angle of the lamp-driving voltage $V_D$ is relatively large (7 msec with a relatively large conducting angle b0 from the beginning of the phase control). Thus, the exposure lamp 56 can be driven at a high rising speed at a low alternating voltage $V_{AC}$ in the range of 85 to 90 V, reliably suppressing inrush current.

When the AC power-supply voltage $V_{AC}$ is equal to or higher than 115 V, a power-supply voltage $V_D$ of no less than 4.0 is outputted as a detected voltage from the power-supply voltage detecting portion 63. This voltage is then subjected to analog-to-digital conversion to derive a digital value $\mathbf{6}_H$ as shown in Table 2. Accordingly, a table number #7 corresponding to the digital value $\mathbf{6}_H$ is found in the table-number selecting table 42*j* (FIG. 13). Thus, the trigger timing table number #7 (=42*i* in FIG. 12C(*g*)) is selected. The selected table 42*i* contains 18 cycles for phase control. Since the time-interval to at the zero-cross counter variable Nz=0 is very short (9 msec), a conducting duration $W_0$ corresponding to a conducting angle of the lamp-driving voltage $V_D$ is 1 msec (with sufficiently small conducting angle $\beta_0$. The conducting angle $\beta_i$ is then gradually increased at very small steps. Thus, the exposure lamp 56 can be driven with a high alternating voltage $V_{AC}$ of 115 V or more, reliably suppressing inrush current. In this case, the rising time of the lamp is not so delayed since the AC power-supply voltageis high.

The phase control method according to the embodiment 3 may be also applied to the fixing heater-lamp 58.

Embodiment 4

In case that a plug socket of the alternating current power supply 54 of the copying machine is used commonly by another electrical apparatus or is connected to a power distributing breaker to which another plug socket of another electrical apparatus is also connected, an alternating voltage $V_{AC}$ applied to the copying machine may always vary under load of another electrical apparatus. Namely, there is the possibility of variation of the alternating voltage $V_{AC}$ for every copying duration. In this case, inrush current to a lamp in an initial energizing period may vary for every copying operation. Accordingly, there may arise such a problem that inrush current may not sufficiently be suppressed if the way in which the conducting angle h is increased gradually is fixed for every copying cycle.

A lamp-lighting control system according to the embodiment 4 of the present invention is intended to sufficiently suppress at any time inrush current that may occur due to variation of an alternating voltage $V_{AC}$ for every copying cycle.

To realize the above-mentioned object, the lamp-lighting control system is provided with a power-supply voltage detecting portion 63 shown in particular by two-dot chain line in FIG. 4. This power-supply voltage portion 63 is constructed as shown in FIG. 11. The ROM 42 stores 7 trigger timing tables 42*c* to 42*i* (see FIG. 12A(*a*) to 12C(*g*)). The ROM 42 also stores a table-number selecting table 42*j* (see FIG. 13) for designating table numbers #1 to #7 of the trigger timing tables 42*c* to 42*i* according to digital values obtained by analog-to-digital conversion of detected power-supply voltage $V_D$.

Referring to a flowchart of FIG. 14, the operation of the embodiment will be described.

Figure 15:
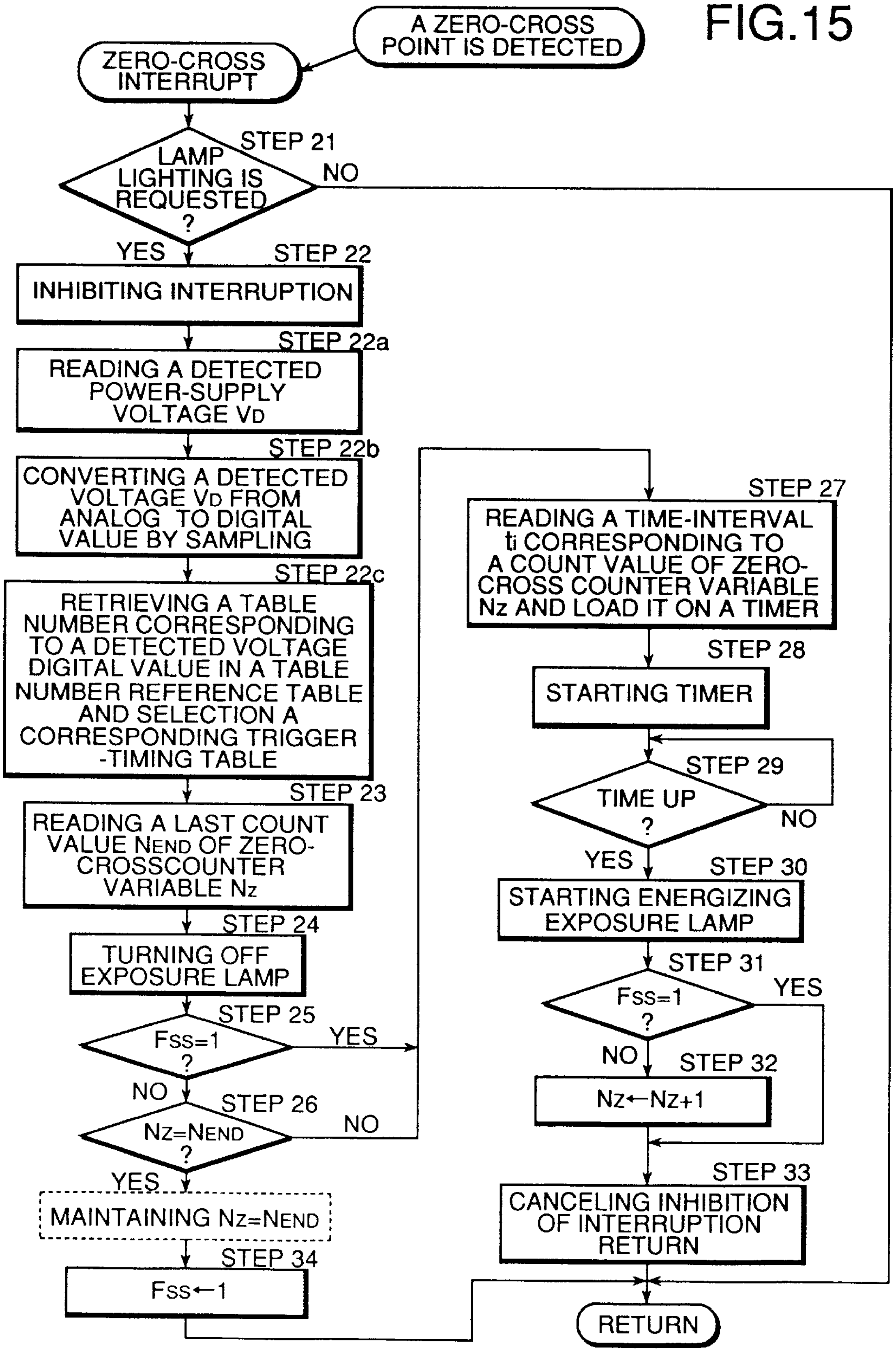
FIG. 15 is a flow chart for explaining the operation of the embodiment 4 according to a subroutine for zero-cross interruption.

The operation of the embodiment is basically similar to that of the embodiment 1 (FIG. 8). The subroutine for zero-cross interrupt (FIG. 9) is changed as shown in FIG. 15. Steps S22*a*, S22*b* and S22*c* are inserted between Steps S22 and S23. At Step S22, the interrupt is inhibited. At Step S22*a*, a detected power-supply voltage $V_D$ from (the voltage follower 76 of) the power-supply voltage detecting portion 63 is led into an A/D port of the CPU 41. At Step S22*b*, the inputted power-supply detected voltage $V_D$ is converted by sampling from analog value to digital value. At Step S22*c*, a table number corresponding to the digital value of the detected power-supply voltage $V_D$ is selected from the table-number selecting table 42*j* and is stored in a register. The process proceeds to Step S23.

The trigger timing table corresponding to the level-range of the power-supply detected voltage $V_D$ selected and registered at Steps S22*a* to S22*c* is selected from 7 trigger timing tables 42*c* to 42*i*. At Step S27, a time-interval t1 corresponding to a current count value of the zero-cross counter variable Nz in the selected trigger timing table is selected and loaded on the timer 61.

When the AC power-supply voltage $V_{AC}$ at a certain copy operation cycle is, for example, within the range of 90 to 95 V, a detected power-supply voltage $V_D$ of 1.5 to 2.0 V is outputted from the power-supply voltage detecting portion 63 and subjected to analog-to-digital conversion to derive a digital value $\mathbf{2}_H$ as shown in Table 2. Accordingly, a table number #2 corresponding to the digital value $\mathbf{1}_H$ is found in the table-number selecting table 42*j* (FIG. 13) and the trigger timing table number #2 (42*d* in FIG. 12A(*b*)) is selected. The selected table 42*d* contains 8 cycles for phase control. Since the time-interval to from the zero-cross counter variable Nz=0 is very short (4 msec), a conducting duration $W_0$ corresponding to a conducting angle of the lamp-driving voltage $V_D$ is 4 msec (with relatively large conducting angle $\beta_0$ from the beginning of the phase control). Thus, the exposure lamp 56 can be driven at a high rising speed at a low alternating voltage $V_{AC}$ in the range of 90 to 95 V, reliably suppressing inrush current.

When the AC power-supply voltage $V_{AC}$ for another copying operation cycle is in the range of 100 to 115 V, a detected power-supply voltage $V_D$ of 3.5 to 4.0 is outputted from the power-supply voltage detecting portion 63 and subjected to analog-to-digital conversion to derive a digital value $5_H$ as shown in Table 2. Accordingly, a table number 6 corresponding to the digital value $5_H$ is found in the table-number selecting table 42*j* (FIG. 13) and the trigger timing table number #6 (42*h* in FIG. 12B(*f*)) is therefore selected. The selected table 42*h* contains 16 cycles for phase control. Since the time-interval to from the zero-cross counter variable Nz=0 is very short (8 msec), a conducting duration $W_0$ corresponding to a conducting angle of the lamp-driving voltage $V_D$ is 2 msec (with sufficiently small conducting angle $b_0$). The conducting angle $\beta_i$ is then gradually increased at very small steps. Thus, the exposure lamp 56 can be driven with a high alternating voltage $V_{AC}$ of 110 to 115 V, reliably suppressing inrush current. In this case, the rising time of the lamp is not so delayed since the AC power-supply voltage is high.

The phase control method according to the embodiment may be also applied to the fixing heater-lamp 58.

Embodiment 5

Different regions have different power frequencies of an alternating voltage $V_{AC}$ of an AC power supply 54. Inrush currents to a lamp in an initial energizing period may vary depending upon the frequency of alternating voltage $V_{AC}$. Accordingly, there may arise such a problem that inrush current may not sufficiently be suppressed if the way in which the conducting angle $\beta_i$ is increased gradually is fixed independent of a change of the power frequency.

A lamp-lighting control system according to the embodiment 5 of the present invention is intended to sufficiently suppress at any time inrush current according to a change of the frequency of an alternating voltage $V_{AC}$.

To realize the above-mentioned object, the CPU 41 (FIG. 4) has a facility for determining the power frequency (50 Hz or 60 Hz) according to the frequency of inputted zero-cross signal Sz. The ROM 42 stores trigger timing tables 42*m* for 50 Hz and 42 for 60 Hz (see FIGS. 16A and 16B).

Figure 17:
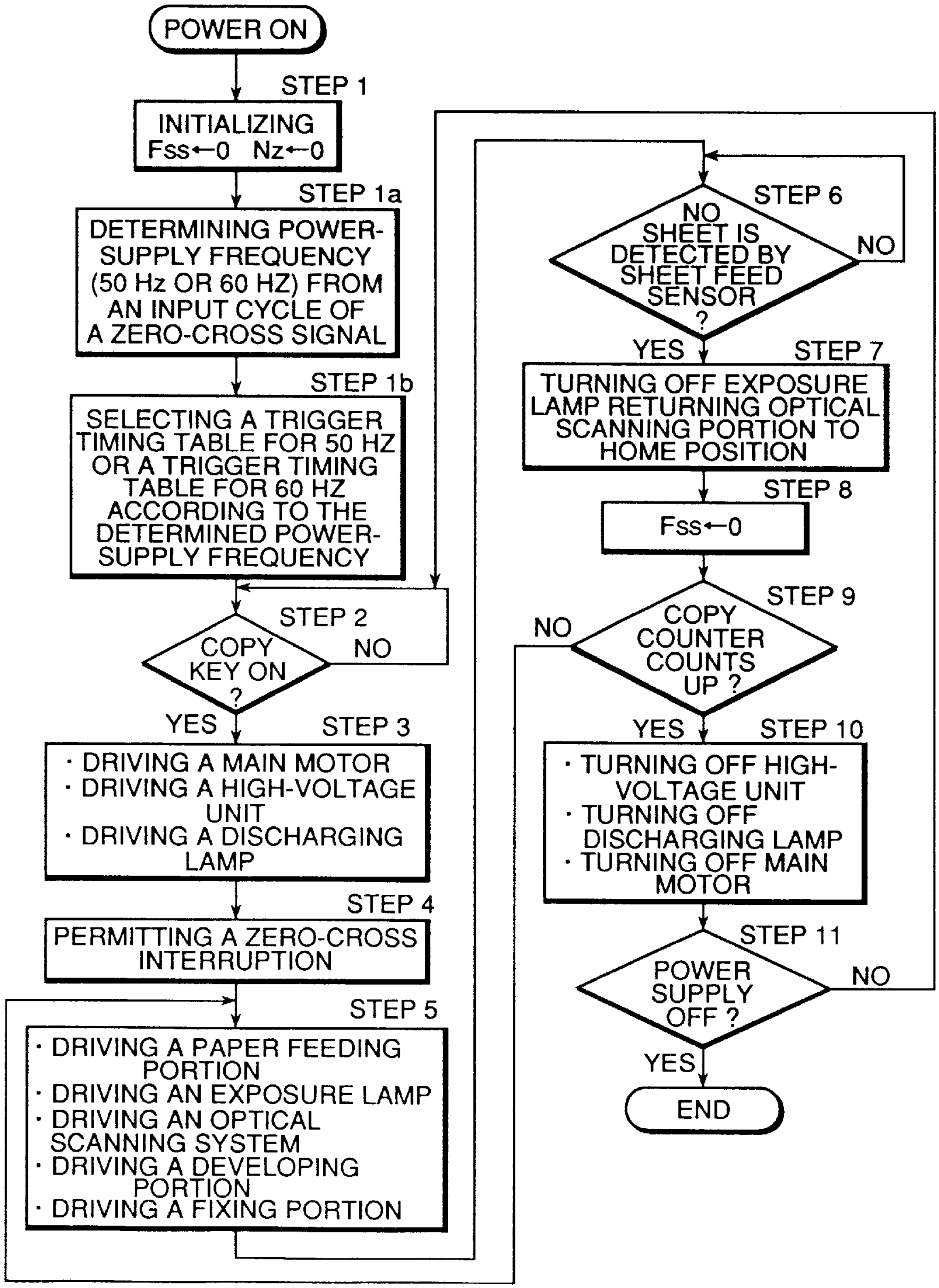
FIG. 17 is a flow chart for explaining the operation of the embodiment 5 according to a main routine.

Referring to a flow chart of FIG. 17, the operation of the embodiment 5 will be described.

The operation of the embodiment is basically similar to that of the embodiment 1 (FIG. 8). Steps Sla and Slb are inserted between Steps $\beta_i$ and S2. At Step S1, the lamp-lighting control system is initialized. At Step S1*a*, the CPU 41 reads a zero-cross signal Sz from zero-cross detecting portion 60 and determines the frequency (50 Hz and 60 Hz) of the alternating voltage $V_{AC}$; according to the timing of the inputted zero-cross signal Sz. At Step S1*b*, the CPU 41 selects one of two trigger-timing tables according to the determined power frequency. Namely, the trigger-timing table 42*m* for 50 Hz (FIG. 16A) or 42*n* for 60 Hz (FIG. 16B) is selected when the power frequency was judged to be 50 Hz or 60 Hz at Step S1*b*. The process then advances to Step S2.

At Step S27, referring to the trigger timing table 42*m* (50 Hz) or 42 (60 Hz) selected at Steps S1*a* and S1*b* according to the power frequency 50 Hz or 60 Hz, a subroutine for zero-cross interrupt is performed by selecting a time-interval $t_i$ corresponding to a current count value of the zero-cross counter variable Nz in the selected trigger timing table and loading it on the timer 61.

When the AC power-supply voltage $V_{AC}$ at a certain copying operation cycle is, for example, within the range of 90 to 95 V, a detected power-supply voltage $V_D$ of 1.5 to 2.0 V is outputted from the power-supply voltage detecting portion 63 and subjected to analog-to-digital conversion to derive a digital value $2_H$ as shown in Table 2. Accordingly, a table number #2 corresponding to the digital value $1_H$ is found in the table-number selecting table 42*j* (FIG. 13) and the trigger timing table number #2 (42*d* in FIG. 12A(*b*)) is therefore selected. The trigger timing table 42*m* for 50 Hz contains 18 cycles for phase control while the trigger timing table 42*n* for 60 Hz contains 12 cycles for phase control. The half-wave of 50 Hz is 10 msec and the half-wave of 60 Hz is about 8.3 msec but assumed as 8 msec in this case. It is assumed that each cycle is divided into 10 equal parts. At the power frequency of 50 Hz, the conducting angle $\beta_i$ is gradually increased by 1 msec each. At 60 Hz, the conducting angle $\beta_i$ is increased gradually by 0.8 msec each. Since the voltage of 50 Hz is increased larger (with an increment of 1 msec) than the voltage of 60 Hz (with an increment of 0.8 msec), it may easier arise inrush current. Accordingly, the trigger timing table 42*m* (for 50 Hz) contains an increased number of cycles to moderately increase the conducting angle $\beta_i$.

The use of separate trigger timing tables 42*m* and 42*n* assures effective suppression of inrush currents at both different frequencies 50 Hz and 60 Hz.

The phase control method according to the embodiment 5 may be also applied to the fixing heater-lamp 58.

Embodiment 6

As a lamp ages with deterioration of its filament, inrush current may vary and produce noises. In this case, the soft starting of the lamp can not be realized.

A lamp-lighting control system accord ing to the embodiment 6 of the present invention is intended to sufficiently suppress inrush currents according to a degree of deterioration of the lamp filament.

To realize the above-mentioned object, the CPU 41 (FIG. 4) has a facility for determining a total of copies according to acurrent value of a total copy counter variable Np. The counted value of the copy counter variable Np is stores in a RAM 43 that is backed up by a battery 44 while the power supply is OFF.

The ROM 42 contains 5 trigger timing tables 42*p* to 42*t* shown in FIGS. 18A(*a*) to 18B(*e*) respectively. The trigger timing tables 42*p* to 42*t* are corresponded to the table number #1 to #5 respectively. The ROM 42 also stores a table-number reference table 42*u* that defines the selection of table numbers #1 to #5 according to ranges of count values of the copy counter variable Np.

The trigger timing table number #1 (42*p*) containing 16 cycles is used when the copy counter variable Np has a current count value in range of 0 to 3000 copies, the trigger timing table number #2 (42*q*) containing 14 cycles is used when the copy counter variable Np has a current count value in a range of 3001 to 6000 copies, the trigger timing table number #3 (42*r*) containing 12 cycles is used when the copy counter variable Np has a current count value is in a range of 6001 to 9000 copies at the copy counter, the trigger timing table number #4 (42*s*) containing 10 cycles is used when the copy counter variable Np has a current count value in range of 9001 to 12000 copies, and the trigger timing table number #5 (42*t*) containing 8 cycles is used when the copy counter variable Np has a current count value of more than 12001 copies. Namely, the more the lamp aged, the faster the lamp is driven.

Figure 20:
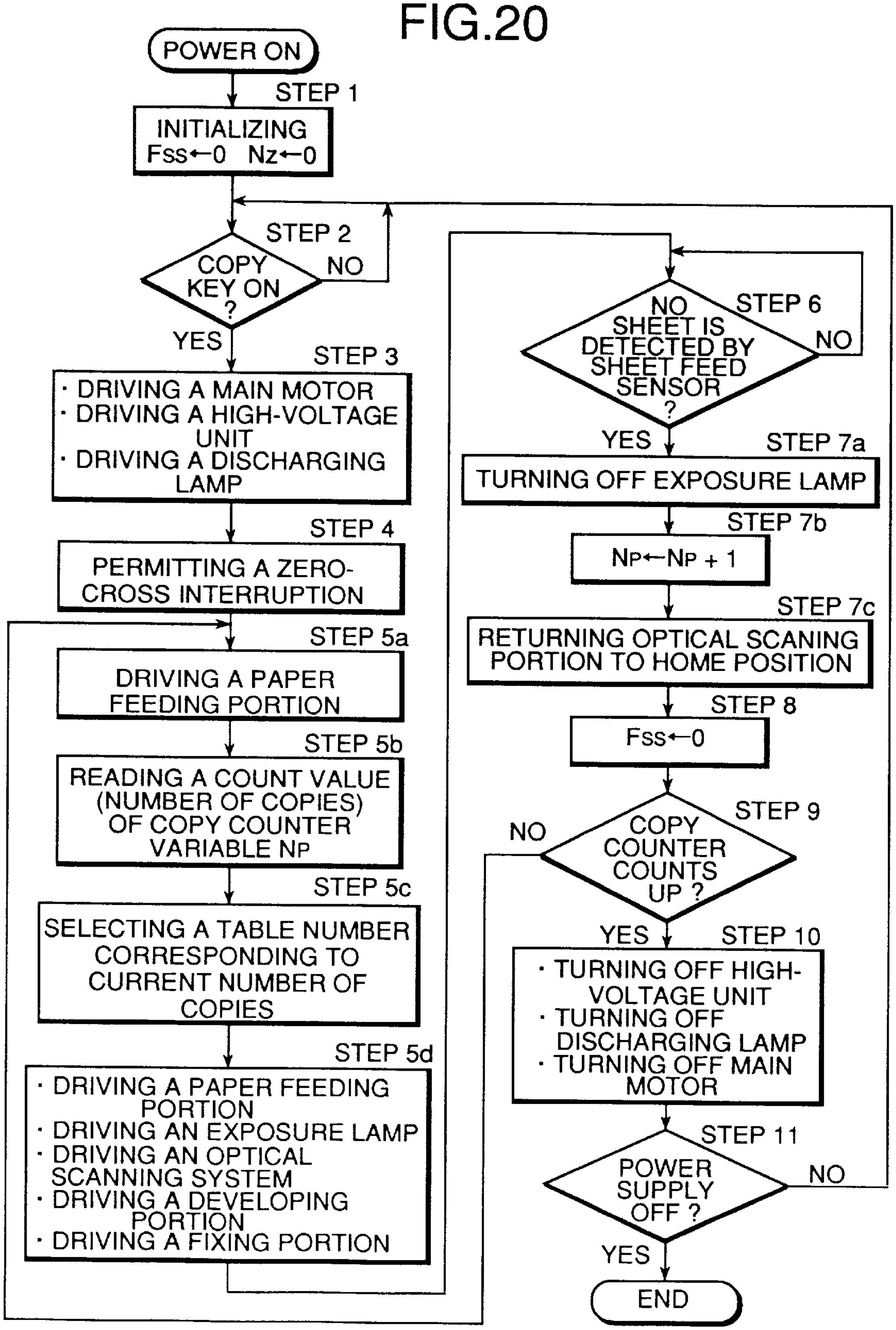
FIG. 20 is a flow chart for explaining the operation of the embodiment 6 according to a main routine.
Figure 23:
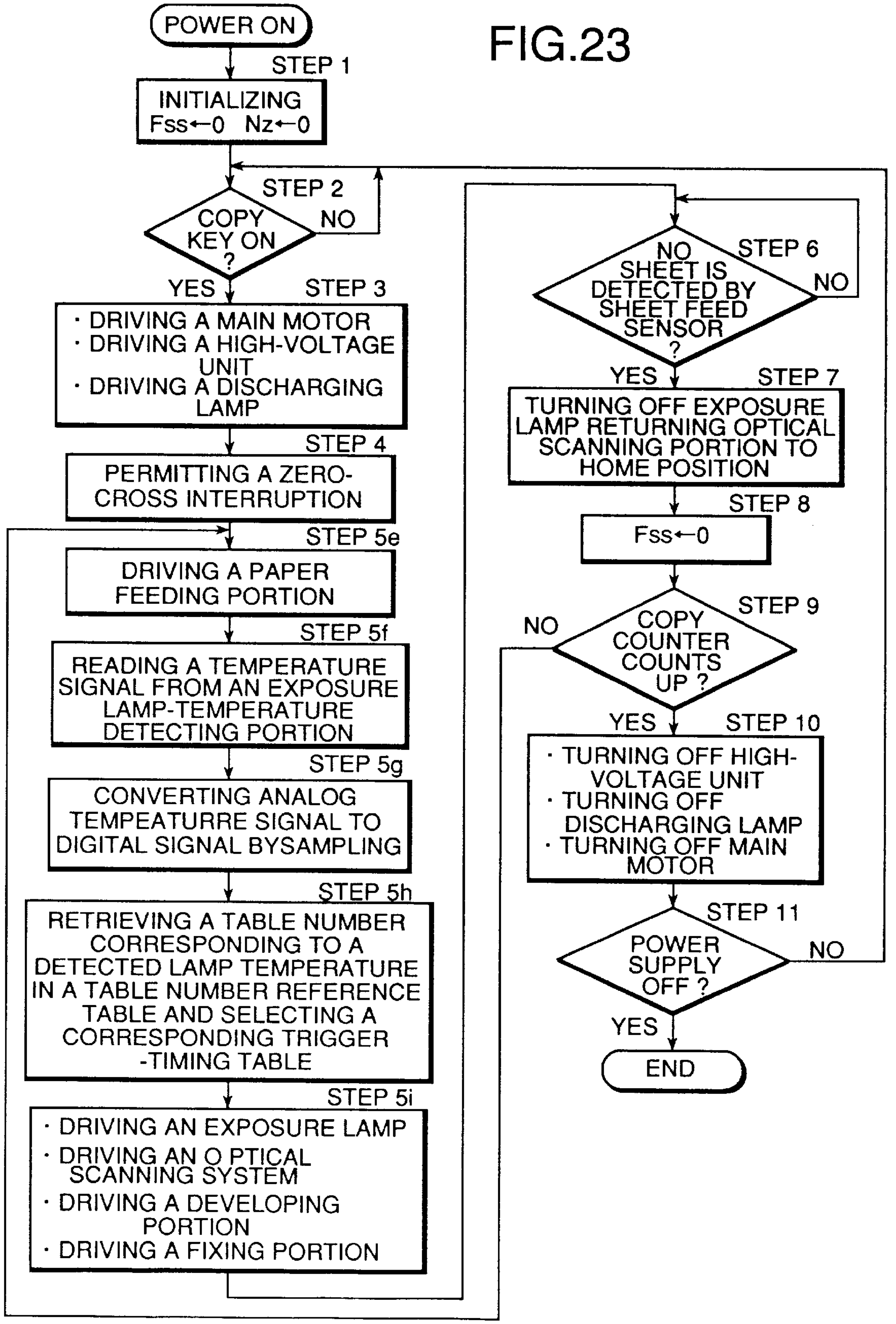
FIG. 23 is a flow chart for explaining the operation of an embodiment 7 according to a main routine.

Referring to a flow chart of FIG. 20, the operation of the embodiment 6 will be described below.

The operation of the embodiment is basically similar to that of the embodiment 1 (FIG. 8). Step S5 is divided into Steps S5*a* and Step S5*d* between which steps S5*b* and S5*c* are inserted. After driving the paper feeding portion 47 at Step S5*a*, the CPU reads a current count value of the copy counter variable Np stored in the RAM 43 at Step c5*b*, retrieves a table number corresponding to the count value of the copy counter variable Np in a reference table 42*u* and sets the found table number in a register at Step g5*c*. Then the process proceeds to Step n5*d*.

When executing the zero-cross interopting subroutine shown in FIG. 9 and when reading the time set on a timer $t_i$ corresponding to the count value of the current count value of the zero-cross counter by referring to the trigger timing table and loading to the timer 61, the trigger timing table is referred which is corresponding to the detected voltage $V_D$ of the power source selected and set in said steps S5*b* to S5*c* from 5 trigger timing tables 42*p* to 42*t*.

Step S7 is divided into Step S7*a* and S7*c* between which Step S7*b* is interposed. After turning off the exposure lamp 56 at Step S7*a*, the copy counter variable Np by 1 (Np←NP+1) is increased. The content of the increased variable Np is updated in the RAM 43. The process then proceeds to Step S7*c*.

In case when a total of counted prints is not more than 3000 copies, the corresponding trigger timing table number #1 corresponds thereto in the reference table 42*u* and the trigger timing table 42*p* (FIG. 18A(*a*)) is selected. The selected trigger timing table 42*p* contains 16 cycles that rises a driving voltage of the lamp at relatively slow rate allowing a soft-start of the lamp. Since the lamp has a filament of a low deterioration degree, it may not suffer inrush current by being driven with a slowly rising driving voltage. In case when a total of counted prints is within the range of 3001 to 6000, the corresponding trigger timing table number #2 is found in the reference table 42*u* and the trigger timing table 42*q* (FIG. 18A(*b*)) is selected. The selected trigger timing table 42*q* contains 14 cycles that rises a driving voltage of the lamp at slightly increased rate to compensate a possible delay of rising of the lamp due to the deterioration of its filament. Thus, inrush current can be effectively suppressed by increasing a rate of rising the driving voltage of the lamp according to a degree of aging of the lamp filament.

The phase control method according to the embodiment may be also applied to the fixing heater-lamp 58.

Embodiment 7

The exposure lamp may vary its filament temperature during its continuous operation. A change of an ambient temperature (in seasons or by air conditioning) may have an influence on the filament temperature of the lamp. As the filament temperature of the lamp decreases, the lamp driving current has a larger peak value. As the filament temperature of the lamp increases, the lamp driving current has a smaller peak value. The soft starting of the lamp can not be realized if it is driven with a current having an increased peak value allowing inrush currents forming noises. Accordingly, there may arise such a problem that inrush current may not sufficiently be suppressed if the conducting angle $\beta_i$ is increased gradually but at a fixed rate independent of a change of filament temperature of the lamp. Particularly, a high-speed copying machine that must rise a driving current of the lamp but may fail in doing it because of a change in the filament temperature of the lamp.

A lamp-lighting control system according to the embodiment of the present invention is intended to sufficiently suppress inrush current at any time in spite of a change of the lamp filament temperature and at the same time to realize fast rising of rising the lamp in an initial conducting period.

To realize the above-mentioned object, the system includes an exposure-lamp-temperature detecting portion 64 enclosed by two-dot chain line in FIG. 4. This portion 64 corresponds to an exposure-lamp-temperature detecting portion 31 shown in FIG. 3, which is a thermistor disposed on an external surface of a lamp unit 30 to determine a temperature of the exposure lamp 2 (56).

The ROM 42 contains 4 trigger timing tables 42*v* to 42*y* shown in FIG. 21(*a*) to 21(*d*) respectively. The trigger timing tables 42*v* to 42*y* are given numbers #1 to #5 respectively. The ROM 42 also stores a table number reference table 42*z* (FIG. 22) that defines the combination of tables numbers #1 to #4 with ranges of temperatures values $T_L$ detected by the exposure-lamp-temperature detecting portion 64.

The trigger table number #1 (42*v*) containing 12 cycles is used when the detected lamp temperature $T_L$ is in a range of not higher than 50° C., the trigger timing table number #2 (42*w*) containing 10 cycles is used when the detected lamp temperature $T_L$ is in a range of 51 to 100° C., the trigger timing table number #3 (42*x*) containing 8 cycles is used when the detected lamp temperature $T_L$ is in a range of 101 to 150° C., and the trigger timing table number #4 (42*y*) containing 6 cycles is used when the detected lamp temperature $T_L$ is in a range of 151° C. and higher. Since inrush current may arise more frequently at a lower filament temperature, the exposure lamp 56 is driven at a lower rising rate with an increased number of cycles of phase control. In contrast, since inrush current may hardly arise at a higher filament temperature, the exposure lamp 56 is driven at an increased rising rate.

Referring now to a flow chart of FIG. 4, the operation of the embodiment will be described.

The operation of the embodiment is basically similar to that of the embodiment 1 (FIG. 8). Steps S5 is divided into Steps S5*e* and S5*i* with interposed therebetween Steps S5*f* to S5*h*. After driving the paper feeding portion 47 at Step S5*e*, the CPU 41 reads a temperature signal from the exposure-lamp-temperature detecting portion 64 at Step S5*f*, converts the temperature signal from analog to digital by sampling at Step S5*g*, searches one of the trigger timing table numbers #1 to #4 according to the current detected lamp temperature value $T_L$ in the table number reference table 42*z* and sets the selected table number in a register at Step S5*h*. The process then proceeds to Step S5*i*.

When executing the zero-cross interrupting subroutine shown in FIG. 9 and when reading the time $t_i$ corresponding to the count value of current zero-counter valuable Nz and loading it to the timer 61 at Step S27 the trigger timing table is referenced, which is corresponding to the level of the detected lamp temperature $T_L$, selected and set at the said Steps S5*f* to S5*h* from the 4 trigger timing table 42*v* to 42*y*.

As the filament temperature of the lamp decreases, the filament resistance decreases and, therefore, a large lamp-driving current may flow, causing inrush current. Accordingly, for the exposure lamp having a detected temperature $T_L$ of not higher than 50° C., a trigger timing table 42*v* (FIG. 21(*a*)) designated by table number #1 in temperature table 42*z* is selected. This table 42*v* contains 12 cycles to allow soft-starting of the exposure lamp 56 by rising the driving current at relatively slow rate, reliably preventing inrush current. On the contrary, for the exposure lamp 56 having a detected temperature $T_L$ of 150° C. or higher, a trigger timing table 42*y* (FIG. 21(*d*) having the table number #4 in the table 42*z* is selected. This table 42*y* contains 6 cycles allowing fast rising of the driving current of the exposure lamp 56 and, at the same time, suppressing inrush current. This is effective in particular for a high-speed copying machine.

The phase control method according to the embodiment may be also applied to the fixing heater-lamp 58. In this case, the fixing heater-lamp temperature detecting portion 65 shown in dotted line in FIG. 4 is used.

Embodiment 8

As for the inrush current, although the embodiments have been described hereinbefore with respect to the phase control for driving the exposure lamp 56, the fixing heater-lamp 58 composed of, e.g., a halogen lamp may also suffer inrush current causing a noise. Accordingly, the embodiment 8 is made to phasely control the exposure lamp 56 and the fixing heater-lamp 58 using a common-use trigger timing table. As the exposure lamp 56 and the fixing heater-lamp 58 are turned ON and OFF separately (asynchronously) from each other, they can use in common a trigger timing table.

Figure 24:
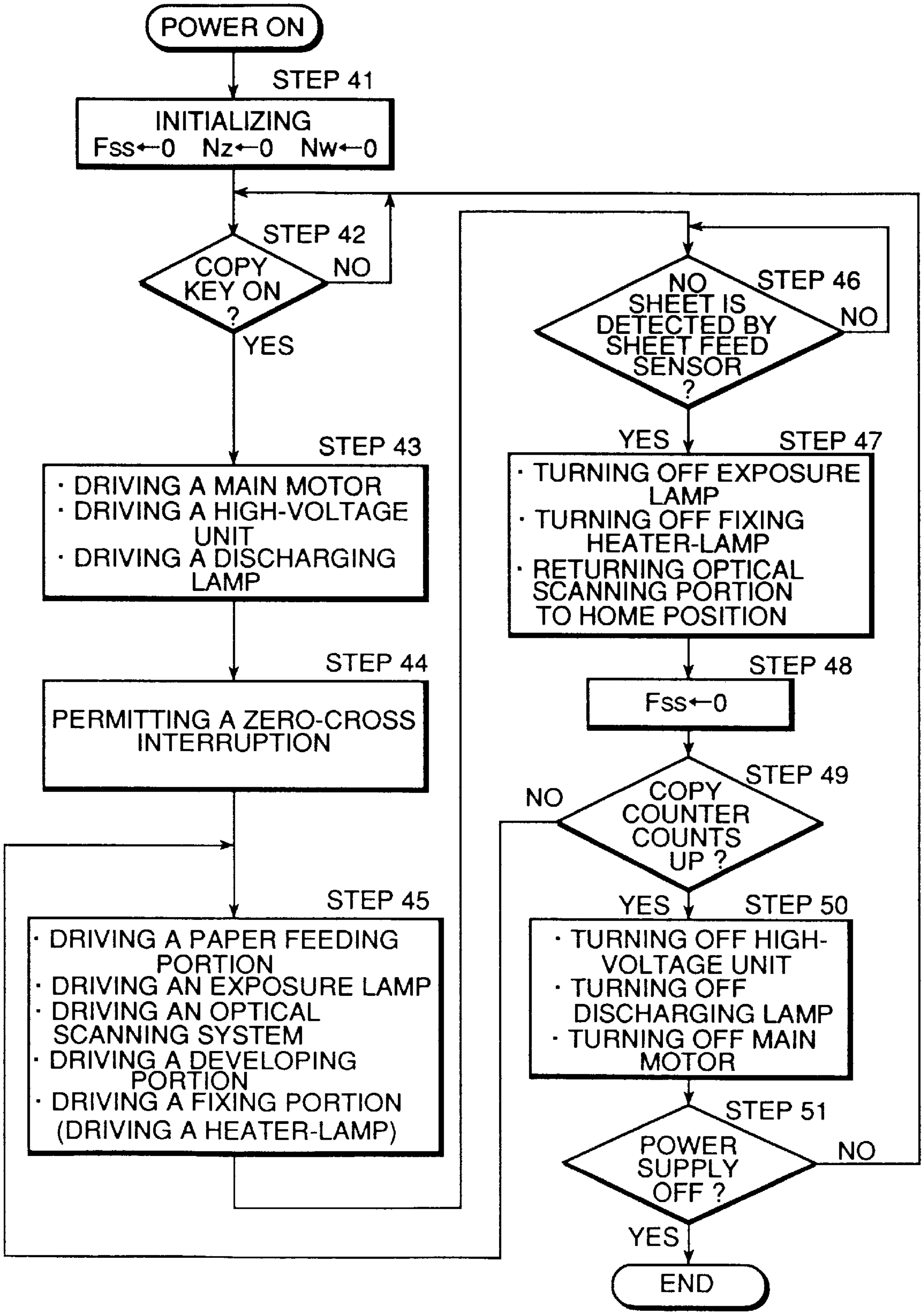
FIG. 24 is a flow chart for explaining the operation of an embodiment 8 according to a main routine.

Referring to flow charts of FIGS. 24, 25 and 26, the control operation of CPU 41 will be described.

When the copying machine is turned on, the CPU 41 starts to execute the control operation from step S1 (FIG. 24) according to a program stored in the ROM 42. This flowchart differs from the flowchart of FIG. 8 for the embodiment 1 in initializing a zero-cross counter variable Nw for the fixing heater-lamp 58 at Step 41 and in turning-off of the fixing heater-lamp 58 at Step S47. In this connection, Step S45 includes performance of driving the fixing heater-lamp 58 when driving the fixing portion 59. All other steps are the same as those described for the embodiment 1 (FIG. 8) and, therefore, will not be further described.

Figure 25:
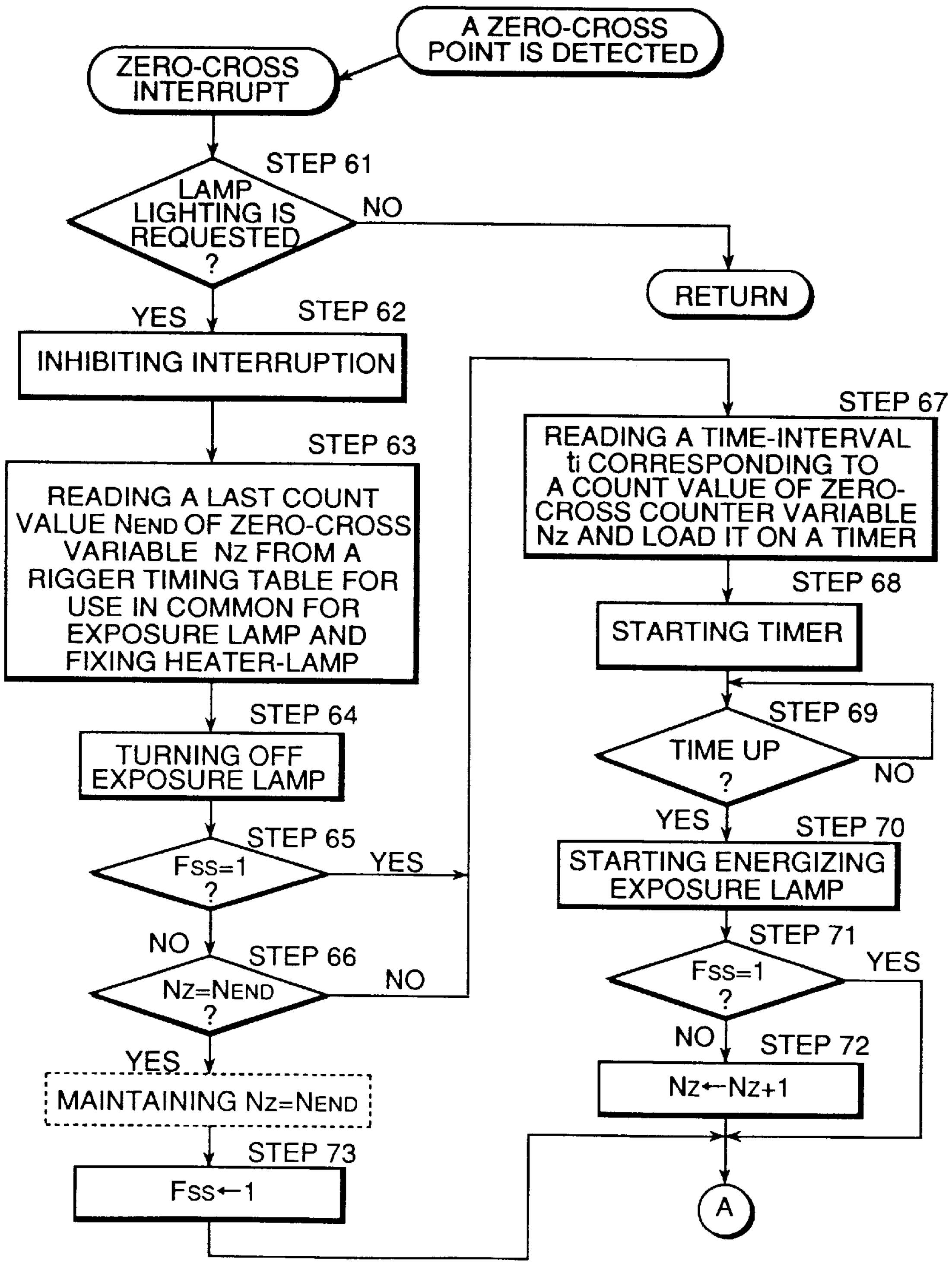
FIG. 25 is a flow chart for explaining the operation of the embodiment 8 according to a subroutine for zero-cross interruption.
Figure 26:
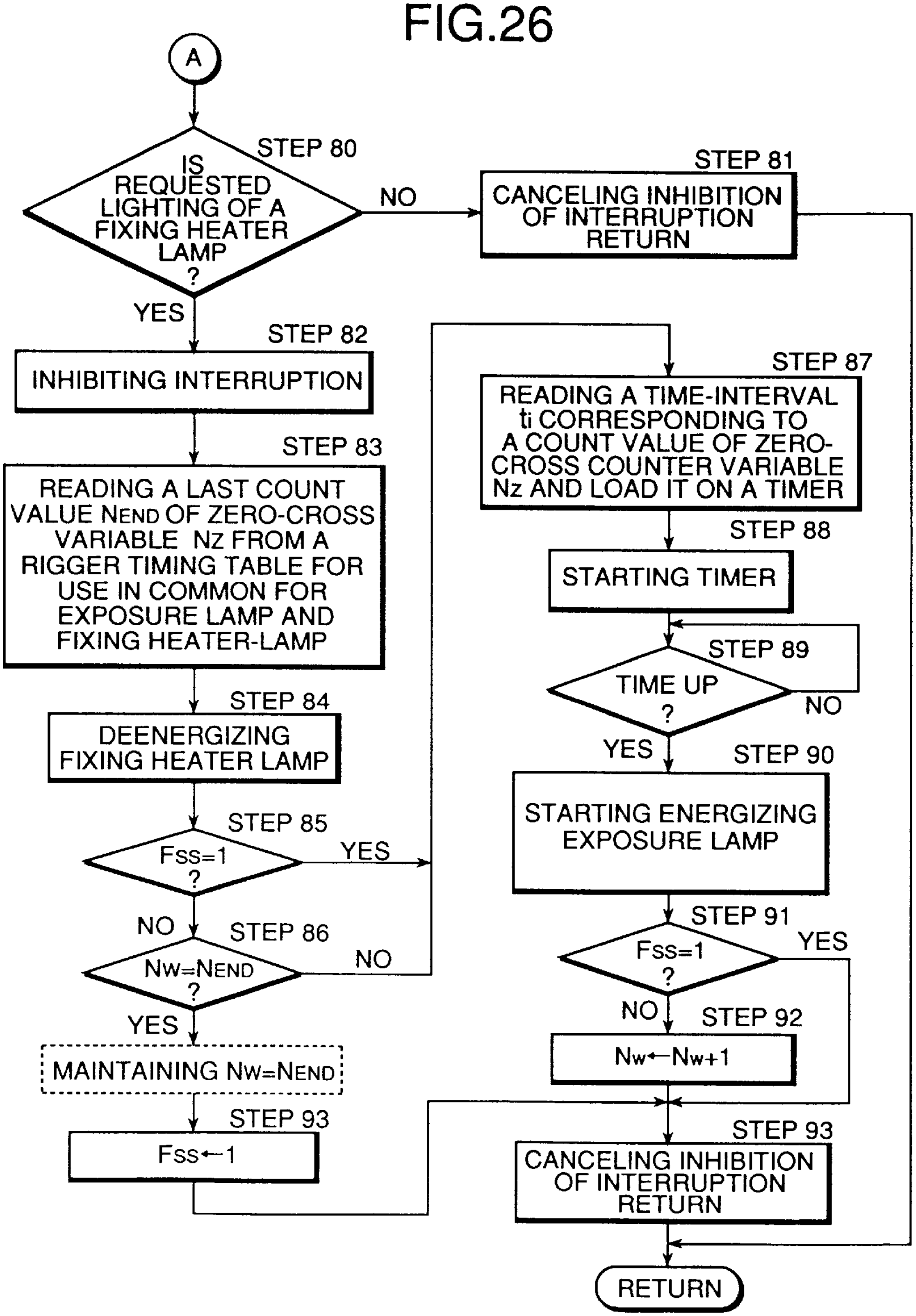
FIG. 26 is a flow chart (continuation of FIG. 26) for explaining the operation of the embodiment 8 according to a subroutine for zero-cross interruption.

A subroutine for zero-cross interruption for phase-control of the exposure lamp 56 is represented in the form of a flowchart shown in FIG. 25 and a subroutine for zero-cross interruption for phase-control of the fixing heater-lamp 58 is represented in the form of a flowchart shown in FIG. 26. The phase control for the fixing heater-lamp 58 is basically identical to the phase control for the exposure lamp 56 (FIG. 25), which is described for embodiment 1 referring to the flowchart of FIG. 9. Namely, FIG. 26 is identical to FIG. 25 if the "exposure lamp" in FIG. 25 is replaced with the "fixing heater-lamp". In FIG. 26, there is also shown a zero-cross counter variable Nw specially used for the fixing heater-lamp 58. As compared with FIG. 9, the flowcharts of FIGS. 25 and 26 include following different expressions: "Is there a Request for lighting of an exposure lamp?" at Step S61 in FIG. 25 and "Is there a Request for lighting of a fixing heater-lamp?" at Step S80 in FIG. 26, and "Reading a last counted value $N_{END}$ from the trigger timing table 42*a* commonly used for both exposure lamp 56 and fixing heater-lamp 58" at Steps S63 in FIG. 25 and S3 in FIG. 26 respectively. Steps S84 and Step 90 are performed specially for the fixing heater-lamp 58 only. Removing an inhibition of interrupt at Step S33 in FIG. 9 is omitted in FIG. 25 and provided at Step S81 in FIG. 26.

In soft-starting of the exposure lamp 56 or the fixing heater-lamp 58, a lamp-driving voltage, a lamp-driving current of an even-numbered cycle is positive and a lamp-driving voltage, a lamp-driving current of odd-numbered cycle is negative but both voltages, both currents are the same in their absolute values. Accordingly, a positive noise-component and a negative noise-component have the same level and magnetic noises in both voltages can cancel out each other. This prevents inrush current $i_{ir}$ for an initial lamp-energizing period and makes it possible to simplify the exposure lamp driving circuit 55 and the fixing heater-lamp driving circuit 57 by eliminating full-wave rectifiers without using any additional noise reducing circuit.

Importantly this embodiment is making the use of the same trigger timing table 42*a* stored in the ROM 42, from which a time-interval $t_i$ corresponding to a current count value $N_{END}$ of the zero-cross counter variable Nz is read out and set on the timer 61 for phase control of the exposure lamp 56 and a time-interval $t_i$ corresponding to a current count value $N_{END}$ of the zero-cross counter variable Nw is read out and set on the timer 61 for phase control of the fixing heater-lamp 58. Namely, one trigger timing table 42*a* is used in common for phase control of both lamps 56 and 58. This may realize saving in capacity of the ROM 42 for storing the trigger timing table 42*a*.

Embodiment 9

A copying machine is usually contains an exposure lamp for illuminating a surface of an original and a fixing heater-lamp for fixing a toner-developed image onto a recording paper sheet. These lamps are turned on and off separately (asynchronously) from each other. Therefore, both lamps may turn on and work at the same time. In this case, a large electric energy is consumed by both lamps particularly in a large copying machine. At such an increased power consumption, the above-described embodiment that performs the phase control of both lamps separately and simultaneously by using the same common-use trigger timing table can not always suppress inrush current that may produce a noise signal causing the erroneous operation of the machine. In particular, the large copying machine may involve such a problem that there is a considerable difference between the power consumption of the fixing heater-lamp (1 to 2 kilowatts) and the power consumption of the exposure lamp (150 to 200 watts). However, the embodiment is enough to protect a small copying machine.

Simultaneous operation of the exposure lamp and the fixing heater-lamp may occur in the copying machine when the exposure lamp is turned on for preparation for illuminating a sheet of recording paper while the fixing heater-lamp is working for fixing by heat a toner image on a preceding sheet.

FIGS. 27A and 27B show two trigger-timing tables 42A and 42B stored in ROM 42 of a lamp-lighting control system according to the embodiment 9. The trigger timing table 42A is used when individually lighting the exposure lamp or the fixing heater-lamp and the trigger timing table 42B is used when lighting both lamps at the same time. The independent light trigger-timing table 42A is designated by a table number #1 and the simultaneous-light trigger-timing table 42B is designated by a table number #2. The independent light trigger-timing table 42A shown in FIG. 27A contains a time-interval variable $t_i$ for a zero-cross counter variable Nz, which value starts from 9 msec and is decreasing by 1 msec per two cycles. The simultaneous-light trigger-timing table 42B shown in FIG. 27B contains a time-interval variable $t_i$ for a zero-cross counter variable Nw, which value starts from 9.5 msec (larger than that in Table 42A by 0.5 msec) and is decreasing by 1 msec per two cycles.

The exposure lamp 56 and the fixing heater-lamp 58 are driven asynchronously with each other. Accordingly, a program stored in the ROM 42 is programmed to normally use the trigger-timing table 42A (table number #1) for independent lighting of the exposure lamp 56 or the fixing heater-lamp 58 on the premise that the above-mentioned lamps are normally driven separately with a certain interval of time and to use the trigger-timing table 42B (table number #2) only when driving the exposure lamp 56 and the fixing heater-lamp 58 at the same time. The trigger-timing table 42A is commonly used by the exposure lamp 56 and the fixing heater-lamp 58 when each of the lamps is independently driven. The trigger-timing table 42B is commonly used by the exposure lamp 56 and the fixing heater-lamp 58 when both lamps are driven at the same time.

When the exposure lamp 56 and the fixing heater-lamp 58 are driven at the same time, the power consumption is sharply increased and inrush current is produced in a power supply cable with a plug connected to an AC plug socket of the AC power source 54, which is not permitted by the external-disturbance and noise regulations for protecting external appliances. There is a fear that the copying machine may voluntarily stop the process operation or perform erroneous operation by the effect of a noise signal produced in an initial conducting period.

Accordingly, the embodiment 9 provides that initial values to and $t_i$ of the time interval $t_j$ to be preset on the timer when driving two lamps at the same time is elongated by 0.5 msec as compared with those presettable when independently driving one of the lamps. By doing this, the conducting angles $\beta_0$ and $\beta_1$ are reduced enough to suppress the initial inrush current, thus preventing the occurrence of noises.

Figure 28:
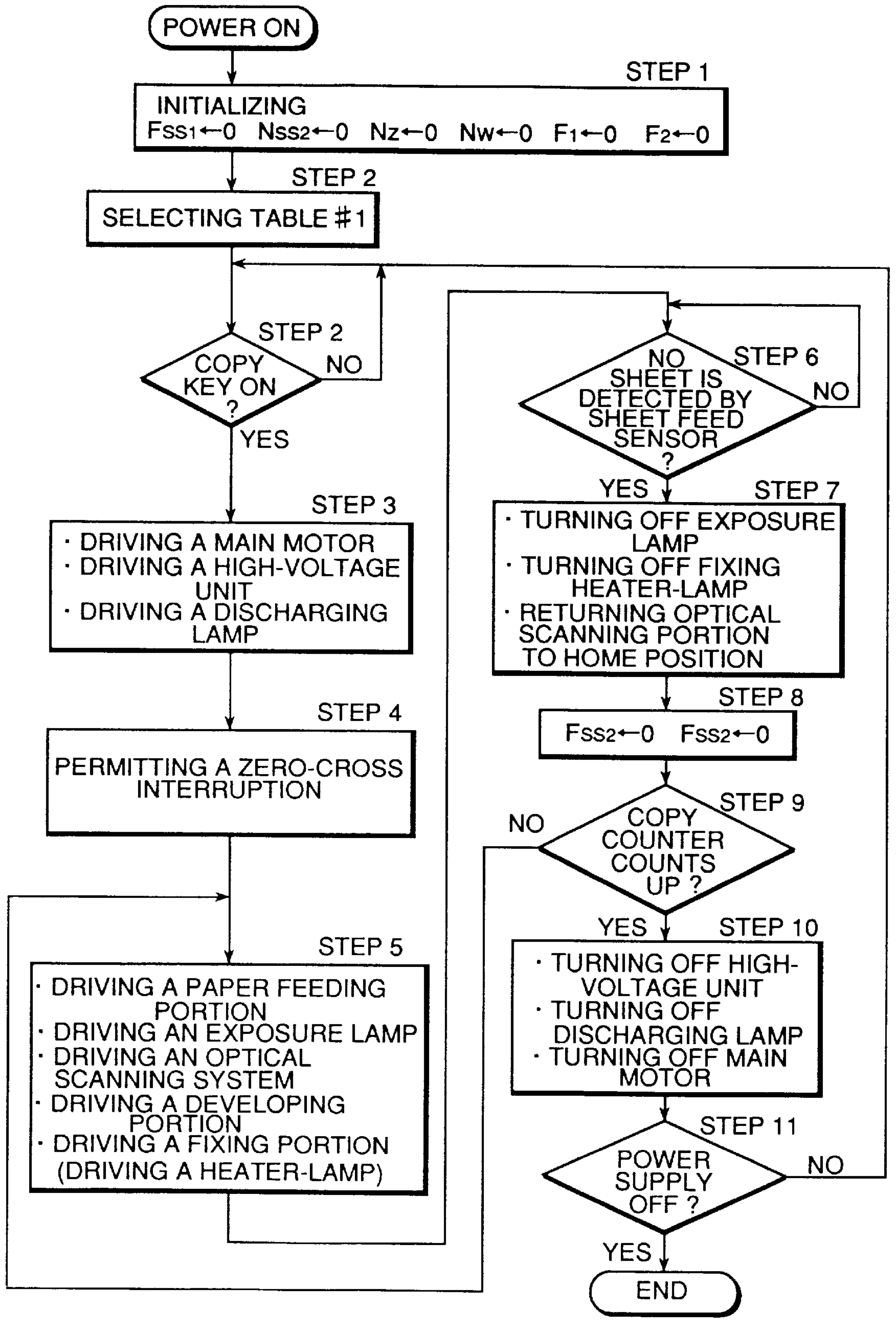
FIG. 28 is a flow chart for explaining the operation of the embodiment 9 according to a main routine.
Figure 29:
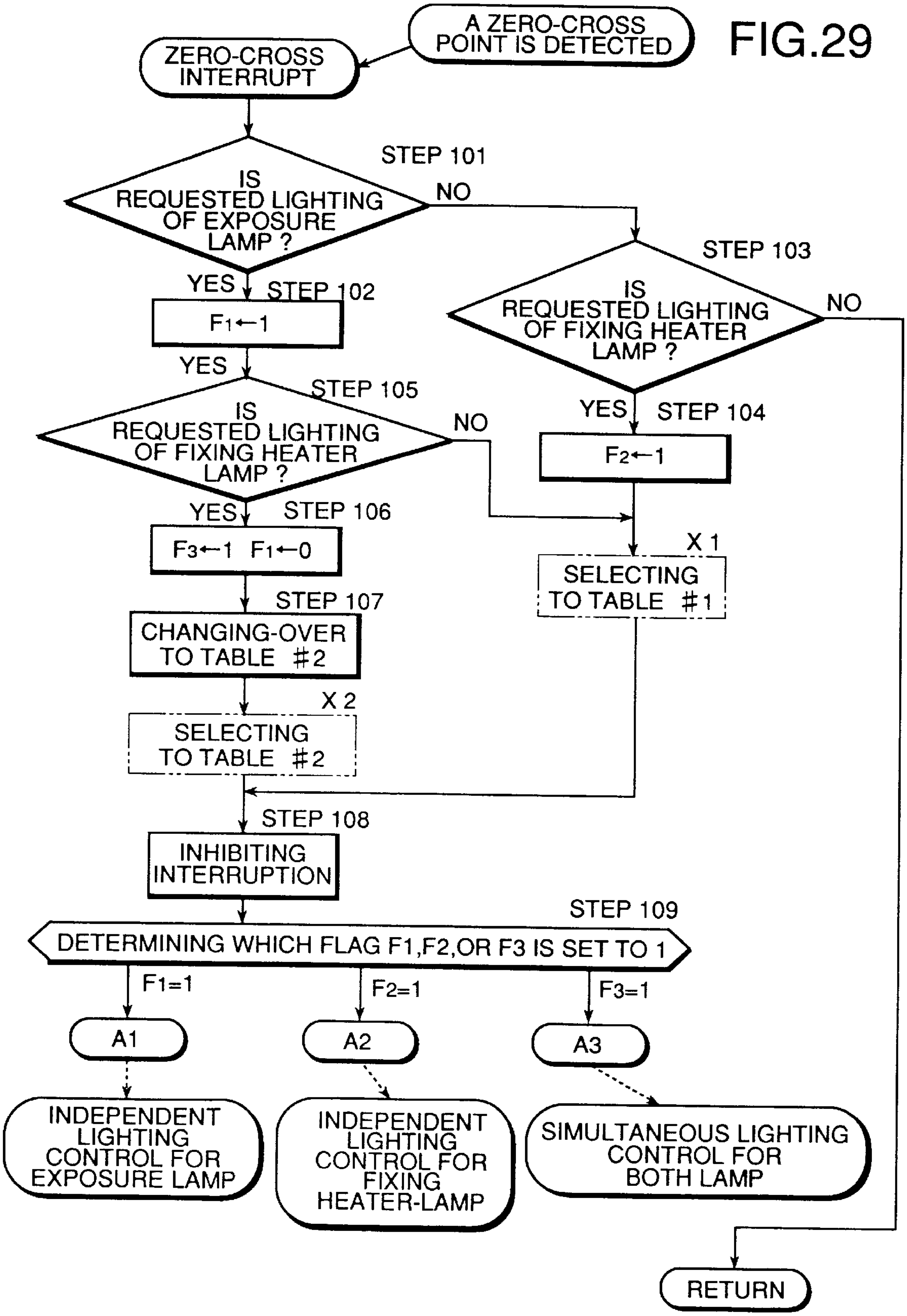
FIG. 29 is a flow chart for explaining the operation of the embodiment 9 according to a subroutine for zero-cross interruption.
Figure 30:
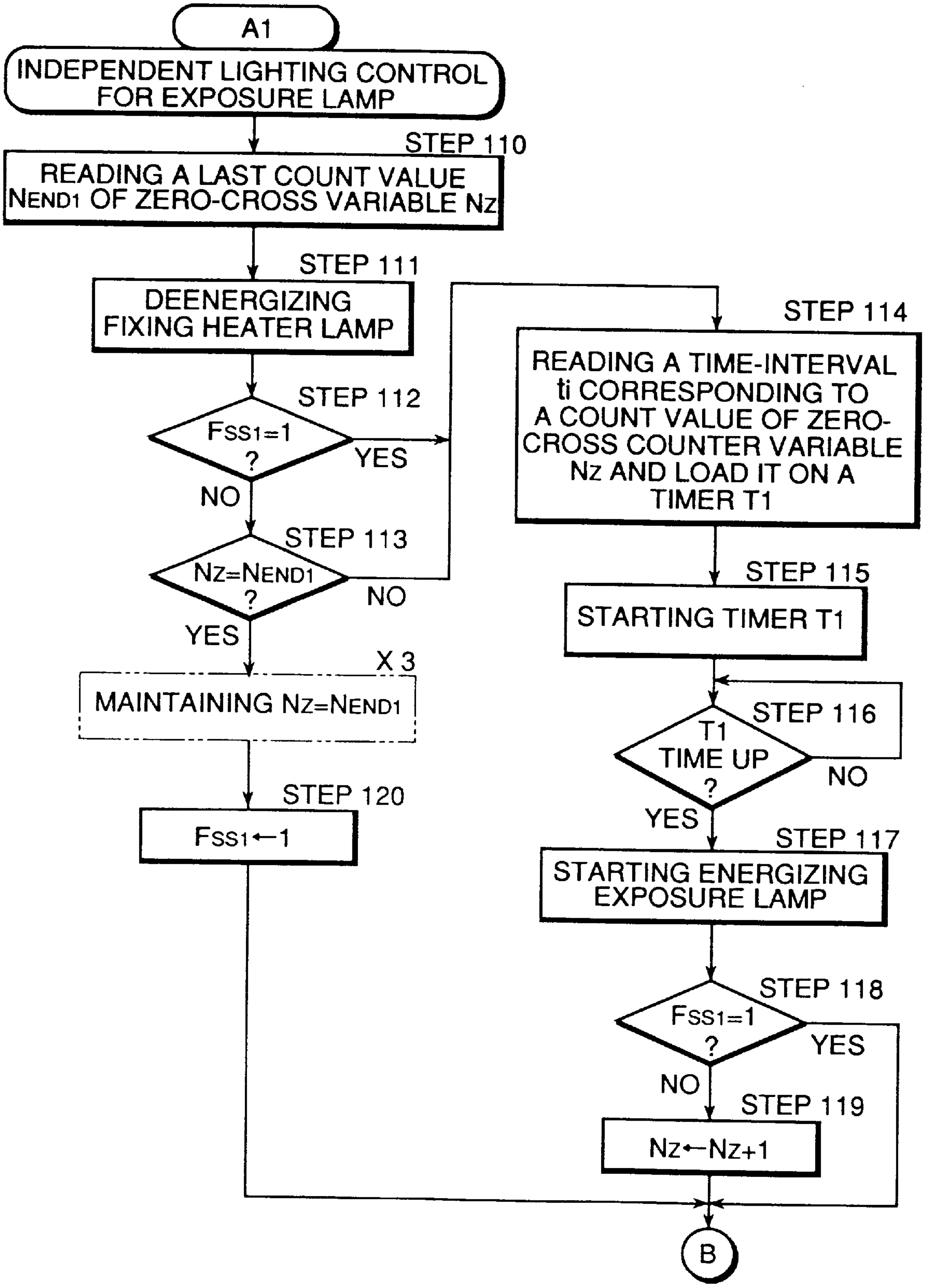
FIG. 30 is a flow chart (continuation of FIG. 29) operation of the embodiment 9 according to a subroutine for zero-cross interruption for independent lighting of an exposure lamp.
Figure 31:
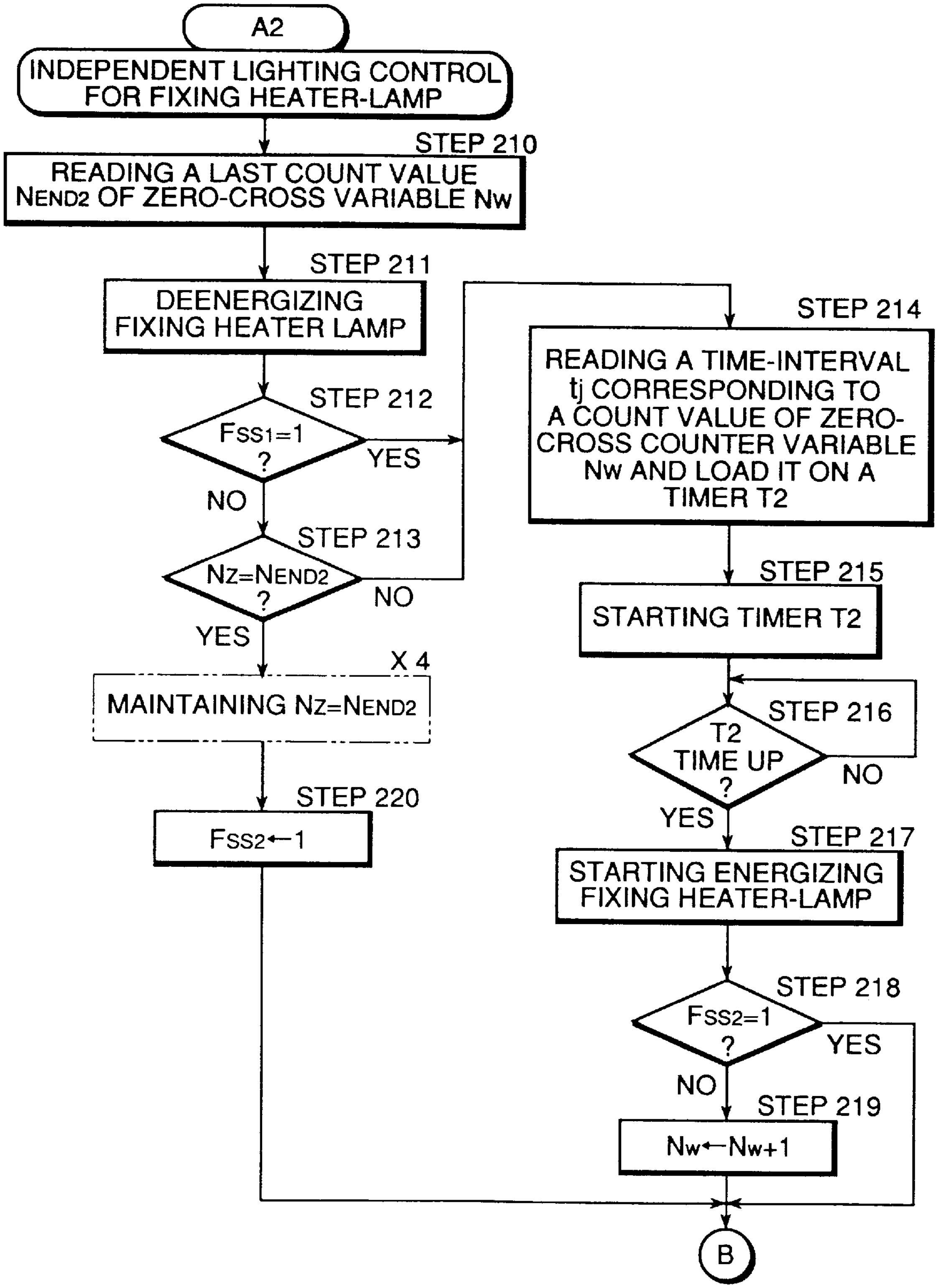
FIG. 31 is a flow chart (continuation of FIG. 29) for explaining the operation of the embodiment 9 according to a subroutine for zero-cross interruption for independent lighting of a fixing-heater lamp.

Referring now to a flowchart of FIG. 28, the operation according to a main routine will be described below. The operation is basically similar to that of the embodiment 1 (FIG. 8). At Step S1, a soft-start ending flag $F_{ss1}$ for the exposure lamp 56 is initialized, a soft-start ending flag $F_{ss2}$ for the fixing heater-lamp 58 is initialized, a zero-cross counter variable Nz for the exposure lamp 56 is initialized, a zero-cross counter variable Nw for the fixing heater-lamp 58 is initialized, a exposure light requesting flag $F_1$ for the exposure lamp 56 is initialized and a fixing light requesting flag $F_2$ for the fixing heater-lamp 58 is initialized. Step S1*c* is interposed between Steps S1 and S2. At Step S1*c*, the independent-light trigger-timing table 42A (table number #1) is selected for normal phase-control for initial energizing period. At Step S7, the fixing heater-lamp is turned off because the fixing portion 59 was driven and the lamp 58 therein was turned on at Step S5. At Step S8, the soft-start ending flags $F_{ss1}$ and $F_{ss2}$ are reset. Other steps are the same as those described for the embodiment according to FIG. 8 and therefore will not be further explained.

Referring to FIGS. 29 to 33, the operation of the embodiment according to a subroutine for zero-cross interruption with a zero-cross signal Sz from the zero-cross detecting portion 60 when the later has detected a zero cross-point.

At Step S101, it is determined whether a request for lighting the exposure lamp 56 is input. When the request is recognized, the process advances to Step S102 for setting a flag Ft of requesting lighting the exposure lamp 56. If no request is found, the process proceeds to Step S103 for determining whether a request for lighting the fixing heater-lamp 58 is input. When the request is recognized, the process advances to Step S104 for setting a flag $F_2$ of requiring lighting the fixing heater-lamp 58. At this time, the independent-light trigger-timing table 42A (table number #1) is selected as shown at X1. At Step S105 (after Step S102), it is determined whether a request for lighting the fixing heater-lamp 58 is input. When the request is recognized, the process proceeds to Step S106 to set a light requesting flag $F_3$ and reset (unset) the flag n $F_1$. At Step S107, the trigger-timing table for phase control for an initial energizing period is switched to the table number #2 (42B) for simultaneous lighting of the exposure lamp 57 and the fixing heater lamp 58. Consequently, the simultaneous-light trigger-timing table 42B (table number #2) is selected by setting the flag $F_3$. Namely, both decisions made at Steps S101 and S105 are positive (Yes), indicating that the exposure lamp 56 and the fixing heater-lamp 58 are required to be driven at the same time. When no request is found at Step S105, the flag $F_1$ remains in the set state and the independent-light trigger-timing table 42A (table number #1) remains as selected (at Step S1*c* of the flowchart of FIG. 28).

At Step S108, another interruption is inhibited. At Step S109, it is determined which one of light-requesting flags $F_1$, $F_2$ and $F_3$ is set. When the flag $F_1$ is set, the process proceeds to a subroutine designated by a connector A1 and shown in FIG. 30 to perform the control of lighting the exposure lamp 56 only. With the flag $F_2$ set, the process proceeds to a subroutine indicated by a connector A2 and shown in FIG. 31 to perform the control of lighting the fixing heater-lamp 58 only. With the flag $F_3$ set, the process proceeds to a subroutine designated by a connector A3 and shown in FIG. 32 to perform the control of lighting both lamps 56 and 58 at the same time.

The operation of the subroutine for control of the exposure lamp 56 only is basically similar to that described-for embodiment 1 and shown in FIG. 9. A last count value is expressed by $N_{END}$i and a soft-start ending flag is expressed by $F_{ss1}$. The timer portion 61 in FIG. 4 has two timers T1 and T2. In this case, the timer T1 is used. The subroutine uses the independent-light trigger-timing table 42A (table number #1) shown in FIG. 27A.

The operation of the subroutine for control of the fixing heater-lamp 58 only is basically similar to that described for embodiment 1 and shown in FIG. 9. A last count value is expressed by $N_{END2}$ and a soft-start ending flag is expressed by $F_{ss2}$. The zero-cross counter variable is denoted by Nw. The timer T2 is applied. The subroutine uses the independent-light trigger-timing table 42A (table number #1) shown in FIG. 27A.

Figure 33:
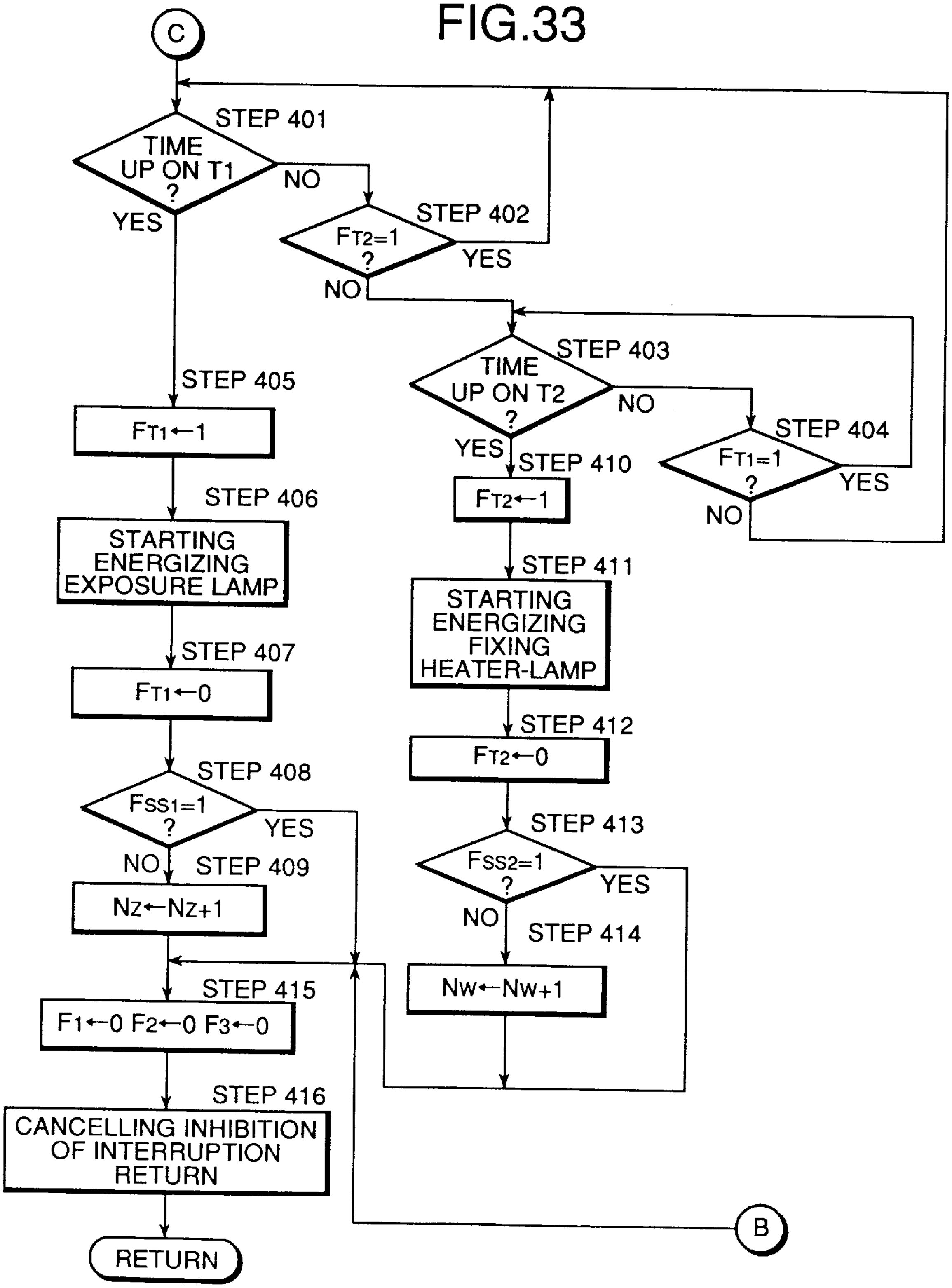
FIG. 33 is a flow chart (continuation of FIG. 32) for explaining the operation of the embodiment 9 according to a subroutine for zero-cross interruption for simultaneous lighting of two lamps.

The current value of the zero-cross counter variable Nz is increased by 1 at Step S119 (FIG. 30) and the current value of zero-crossing counter variable Nw is increased by 1 at Step S219 (FIG. 31), then the process proceeds to Step 415 designated by a connector B and shown in FIG. 33. The flag $F_1$ or $F_2$ or $F_3$ is reset (Step S415), the interrupt inhibition is removed (Step S416) and then the process returns to the main routine. The soft-start ending flags $F_{ss1}$ and $F_{ss2}$ are reset at Step S8 (FIG. 28) after completion of the 99 process.

Figure 32:
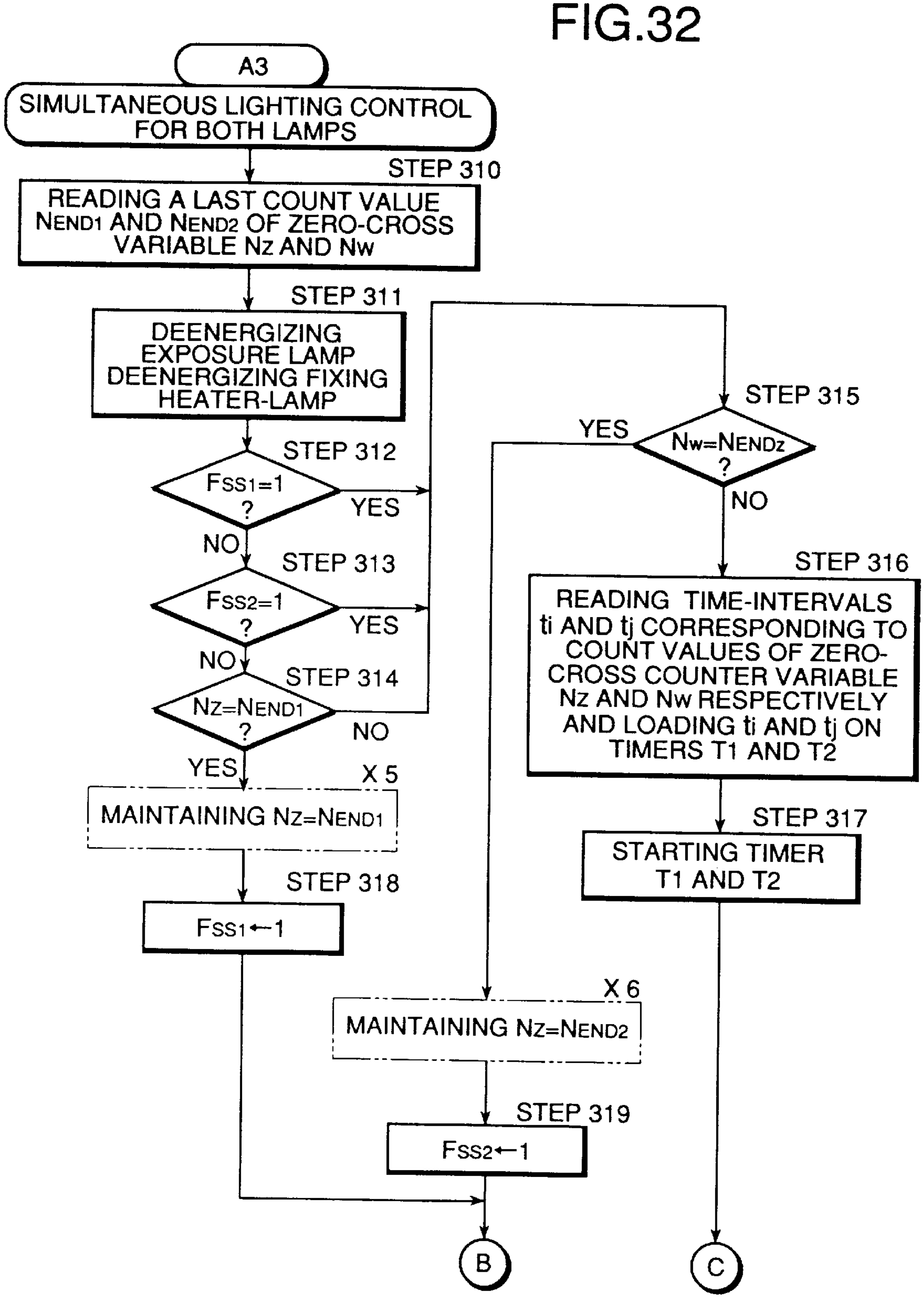
FIG. 32 is a flow chart (continuation of FIG. 29) for explaining the operation of the embodiment 9 according to a subroutine for zero-cross interruption for simultaneous lighting of two lamps.

Referring now to FIG. 32, the operation of a subroutine for controlling lighting of the exposure lamp 56 and the fixing heater-lamp 58 at the same time will be described below. The process according to the subroutine begins: The trigger-timing table for phase control for an initial lamp energizing period has been switched to the simultaneous-light trigger-timing table (table number #2) shown in trigger-timing table 42B. At Step S310, the last count value $N_{END1}$ is read in the zero-cross counter variable Nz for the exposure lamp 56 and the last count value $N_{END2}$ is read in the zero-cross counter variable Nw for the fixing heater-lamp 58. At Step S311, the power supply circuits for the exposure lamp 56 and the fixing heater-lamp 58 are turned off. At Step S312, it is determined whether the soft-start ending flag $F_{ss1}$ for the exposure lamp 56 is set. At Step S313, it is determined whether the soft-start ending flag $F_{ss2}$ for the fixing heater-lamp 58 is set. If both flags are unset, the process proceeds to Step S314 to determine whether the zero-cross counter variable Nz for the exposure lamp 56 reaches the last count value $N_{END1}$. If not, the process proceeds to Step S315 to determine whether the zero-cross counter variable Nw for the fixing heater-lamp reaches the last count value $N_{END2}$. If not, the process proceeds to Step S316 to read time-intervals $t_i$ and $t_j$ corresponding to count values Nz and Nw, respectively, of zero-cross counter variables Nz and Nw from the simultaneous-light trigger-timing table 42B and preset the read-out values $t_i$ and $t_j$ on the timers T1 and T2 respectively. Both timers T1 and T2 start counting (at Step S317). The process then proceeds to Step S401 shown in FIG. 33.

At Step S401, it is determined whether the timer 1 counted up the preset time-interval. If not, the process proceeds to Step S402 to determine whether a time-up flag $F_{T2}$ for the timer T2 is set. When the flag $F_{T2}$ is set, the process returns to Step S401 to wait until the timer T1 counts up the preset time-interval. If the flag $F_{T2}$ is unset, the process proceeds to Step S403 to determine whether the timer T2 counted up the preset time-interval. If not, the process proceeds to determine whether a time-up flag $F_{T1}$ indicating a time-up of the timer T1 is set. With the flag $F_{T1}$ being set, the process returns to Step S403 to wait until the timer T2 counts up the preset time-interval. With the flag $F_{T1}$ being unset, the process returns to Step S401.

In this loop, when the timer T1 generates a time-up signal with an elapse of the preset time-interval $t_i$ (i=0, 1 . . . ), the process proceeds to Step S405 to set a time-up flag $F_{T1}$ for the timer T1. At Step S406, the driving circuit starts energizing the exposure lamp 56. At Step S407, the time-up flag $F_{T1}$ is reset for a next cycle of phase control. At Step S408, it is determined whether the soft-start ending flag $F_{ss1}$ is set. If the flag $F_{ss1}$ is unset, the process proceeds to Step S409 to increase the zero-cross counter variable Nz by 1. The light requesting Flags $F_1$, $F_2$ and $F_3$ are reset (at Step S415) and the inhibition of interrupt is removed (at Step S416), then the main routine is restored.

On the other hand, when the timer T2 generates a time-up signal with an elapse of time-interval $t_j$ (j=0, 1 . . . ), the process proceeds to Step S410 to set a time-up flag $F_{T2}$ for the timer T2. At Step S411, the driving circuit starts energizing the fixing heater-lamp 58. At Step S412, the time-up flag $F_{T2}$ is reset for a next cycle of phase control. At Step S413, it is determined whether the soft-start ending flag $F_{ss2}$ is set. If the flag $F_{ss1}$ is unset, the process proceeds to Step S414 to increase the zero-cross counter variable Nw by 1. The light requesting Flags $F_1$, $F_2$ and $F_3$ are reset (at Step S415) and the inhibition of interrupt is removed (at Step S416), then the main routine is restored.

At Step S311 in the process of a new zero-cross interrupt for next half-cycle phase-control, the exposure lamp 56 is turned off and the fixing heater-lamp 58 is also turned off. Since the simultaneous-light trigger-timing table 42B (table number #2) shown in FIG. 27B has been used, a time-interval $t_i$ is longer than that in the independent-light trigger-timing table 42A (table number #1) shown in FIG. 27A. Accordingly, a conduction time from the time-up moment to Step S311 for a new cycle, i.e., a conducting angle $\beta_i$ (i=0, 1 . . . ) is short enough to prevent inrush current from occurring in the AC plug socket of the power-supply cable even when the exposure lamp 56 and the fixing heater-lamp 58 are energized at the same time. This enables the copying machine to comply with the recently set-forth regulations for protecting peripheral appliances against external noises and disturbances. The above-mentioned phase-control can also prevent noise for the initial lamp-energizing period, protecting the copying machine from voluntarily stop or start in the operation.

The further operation of this embodiment is substantially identical to that described for the embodiment 1 and, therefore, is omitted.

The structure of the embodiment 9 may be also applied to or combined with any one of the before-described embodiments. The time-interval to be set on a timer (from a zero-cross interrupt to the beginning of power supply) may be determined by using a calculating software instead of the trigger-timing tables.

In a lamp lighting control system according to an aspect of the present invention, soft-starting of a lamp used in an image forming device, is realized by phase control of an alternating current power supply voltage for an initial lamp-energizing period in such a way that a conducting angle at which the voltage is applied to the lamp may be increased gradually per every unit which is composed of an even number of half-waves of alternating voltage of the power source. Furthermore, even number of cycles in the same unit have the same preset conducting angle, thereby to make noise components to be equal that may occur in positive and negative voltages in the lamp-driving circuit when full-wave rectifier is omitted to effectively cancel each other out. Namely, the system can effectively prevent the occurrence of electromagnetic noise without using any additional noise reducing circuit, thus eliminating the possibility of erroneous operation of the image forming device by noises for the initial lamp-energizing period and realizing the compactness of the device.

In a lamp lighting control system according to another aspect of the present invention, a time-interval from a zero cross-point to the beginning of a lamp energizing period is determined by referring to a trigger timing table specifying the time-interval corresponding to a zero-cross counter variable value at each cycle and is preset on a timer for gradually increasing the conducting angle. The use of the trigger timing table eliminates the necessity of calculating time intervals to be preset on the timer, thus improving the efficiency of processing operation of the device.

In a lamp lighting control system according to another aspect of the present invention, an even number of cycles composing a unit for gradual increasing conducting angle at an initial stage of the initial lamp-energizing period is preset to be larger than that composing another unit at later stage of the initial lamp-energizing period. The increased number of cycles in the unit for the initial stage of an initial energizing period allows only such a small driving current that may not produce inrush current and noise signals in the worst conditions. In this case, a total number of cycles is still relatively small, thus assuring relatively fast rising of the driving current of the lamp.

A lamp lighting control system according to another aspect of the present invention has a plurality of trigger-timing tables which are different from one another in the number of cycles and for correlating zero-cross counter with time-intervals for gradually increasing a conducting angle, and selects suitable one of the trigger timing tables according to a power-supply voltage detected when having received an instruction for forming an image. The use of trigger timing table selected according to the detected power-supply voltage can reliably suppress inrush current even with a variation of the voltage in operation with an image forming instruction and can rise the driving current of the lamp for a substantially specified duration in the initial energizing period.

A lamp lighting control system according to another aspect of the present invention has a plurality of trigger-timing tables which are different in the number of cycles and for correlating values of zero-cross counter variable with time-intervals set on a timer from zero cross-points to the beginning of power supply for gradually increasing a conducting angle and selects a trigger timing tables for each image-forming operation in suitably correspondent with the detected voltage. This system can reliably suppress inrush current even with a variation of the voltage due to a change in load of any peripheral electrical appliance and can rise a driving current of the lamp with in a substantially predetermined duration in the initial energizing period.

A lamp lighting control system according to another aspect of the present invention has a plurality of trigger-timing tables which are different from one another in the number of cycles corresponding to different frequencies of power supply and for correlating the variable values of zero-cross counter with time-intervals set on a timer for gradually increasing a conducting angle and selects a the trigger timing tables of the number of cycles suitably corresponding to the detected frequency, this system assure reliable suppressing of inrush current.

A lamp lighting control system according to another aspect of the present invention has a plurality of trigger-timing tables which are different from one another in the number of cycles in correspondence with a total count value of copies and for correlating variable values of zero-cross counter with time-intervals set on a timer for gradually increasing a conducting angle and selects suitable one of the trigger timing tables corresponding to a total number of counted copies i.e., the degree of deterioration of the lamp filament, this system assure reliable suppressing of inrush current regardless of the deterioration of the lamp filament.

A lamp lighting control system according to another aspect of the present invention has a plurality of trigger-timing tables which are different from one another in the number of cycles corresponding to a detected lamp temperature and for correlating values of a zero-cross counter variable with time-intervals set on a timer for gradually increasing a conducting angle and selects suitable a trigger timing tables corresponding to the detected lamp-temperature, this system enabling normal rising of lighting operation of the lamp while suppressing inrush current. This systems is effective especially in a high-speed image-forming device, when to quick rising of operation of the lamp while suppressing the inrush current at a normal high temperature.

A lamp lighting control system according to another aspect of the present invention has a trigger-timing table for correlating variable values of a zero-cross counter with time-intervals set on a timer for gradually increasing a conducting angle, which table is commonly usable for an exposure lamp and a fixing heater-lamp. The system can effectively suppress the inrush current while saving in its program storage capacity.

A lamp lighting control system according to another aspect of the present invention has a trigger-timing table for correlating variable values of a zero-cross counter with time-intervals set on a timer in reference with the table at each cycle, for gradually increasing a conducting angle, which is commonly usable for an exposure lamp and a fixing heater-lamp on the condition of driving them independently, and said system has another trigger timing table which contains time-intervals larger than those in the table on the condition of driving both lamps independently and is also usable in common for both exposure lamp and fixing heater-lamp on the condition of driving both lamps at a time. The exposure lamp and the fixing heater-lamp are normally asynchronously driven in independently. However, two lamps may sometime be driven at the same time resulting in production of an inrush current in an initial energizing period. In this system, said another trigger timing tables used when two lamps are driven simultaneously, wherein larger time-intervals to the beginning of power supply is set on a timer, thus effectively suppressing inrush current and preventing the occurrence of noises regardless of the two lamps used at a time.

What is claimed is:

1. A soft-starting system for a lamp in an image forming device, said soft-starting system comprising:

input means for connecting said system to a source of alternating voltage defining a continuous series of sinusoidal waveforms, each said sinusoidal waveform comprising a 180 degree positive portion and a 180 degree negative portion; and control means connected between said input means and said lamp for selecting, and for applying to said lamp during a predetermined initial lamp energizing period, a part of each said positive portion and a part of each said negative portion of each of said sinusoidal waveforms in said series;

wherein:

(i) said control means is adapted to divide each said positive portion and each said negative portion of each said waveform into an initial firing angle followed by a conducting angle, (ii) the part of each portion of each said sinusoidal waveform which is applied to said lamp is defined by said conducting angle, (iii) said conducting angle is the same for both said positive portion and said negative portion of each said waveform, (iv) said firing angle is gradually decreased and said conducting angle is gradually increased as said control means operates on each successive waveform of said series;

(v) said system comprises a trigger timing table, a zero-cross counter for continuously counting the number of times said alternating voltage has a value of zero, and a timer;

(vi) said trigger timing table includes predetermined firing angle and conducting angle value pairs associated with predetermined zero cross count value and timer value pairs;

(vii) the operation of said zero cross counter and said timer are initiated at the beginning of power application to said system; and, (viii) said control means senses said zero cross value and timer value pairs, and gradually increases said conducting angle by gradually decreasing said firing angle in increments corresponding to said predetermined values thereof contained in said trigger timing table as successive ones of said predetermined zero count value and timer value pairs are sensed.

2. A soft-starting system for a lamp in an image forming device according to claim 1, wherein said initial lamp energizing period is divided into units, each said unit containing a whole number of said alternating voltage waveforms; and wherein a unit for an initial stage of said initial lamp energizing period is set to be larger than a unit for another later stage of said initial lamp energizing period.

3. A soft-starting system for a lamp in an image forming device according to claim 2, further wherein said system includes:

a plurality of trigger-timing tables that differ from one another in the total number of predetermined firing angle and conducting angle value pairs associated with predetermined zero cross count value and timer value pairs;

detecting means for detecting a frequency of a voltage applied to said system;

reading means for reading the voltage frequency detected by said detecting means; and, selecting means for selecting a trigger timing table according to the detected frequency of the voltage.

4. A soft-starting system for a lamp in an image forming device according to claim 2, further wherein the system includes:

a plurality of trigger-timing tables that differ from one another in the total number of predetermined firing angle and conducting angle value pairs associated with predetermined zero cross count value and timer value pairs;

detecting means for detecting the temperature of said lamp;

reading means for reading the detected temperatures of said lamp; and, selecting means for selecting a trigger timing table corresponding to said detected lamp temperature.

5. A soft-starting system for a lamp in an image forming device according to claim 2, further wherein said system includes:

a plurality of said trigger-timing tables that differ from one another in the total number of predetermined firing angle and conducting angle value pairs associated with predetermined zero cross count value and timer value pairs;

detecting means for detecting a voltage applied to said system;

reading means for reading the voltage detected by said detecting means; and, selecting means for selecting a trigger timing table for each image-forming operation according to the detected voltage.

6. A soft-starting system for a lamp in an image forming device according to claim 12, further wherein the system includes:

a plurality of trigger-timing tables that differ from one another in the total number of predetermined firing angle and conducting angle value pairs associated with predetermined zero cross count value and timer value pairs;

detecting means for detecting a selected number of copies of a pre-selected image to be made by said system;

reading means for reading said selected number of copies detected by said detecting means; and, selecting means for selecting a trigger timing table according to said detected number of copies.

7. A soft-starting system for a lamp in an image forming device according to claim 1, further wherein the system includes:

a plurality of trigger-timing tables that differ from one another in the total number of predetermined firing angle and conducting angle value pairs associated with predetermined zero cross count value and timer value pairs;

detecting means for detecting a selected number of copies of a pre-selected image to be made by said system;

reading means for reading said selected number of copies detected by said detecting means; and, selecting means for selecting a trigger timing table according to said detected number of copies.

8. A soft-starting system for a lamp in an image forming device according to claim 1, further wherein the system includes:

a plurality of trigger-timing tables that differ from one another in the total number of predetermined firing angle and conducting angle value pairs associated with predetermined zero cross count value and timer value pairs;

detecting means for detecting the temperature of said lamp;

reading means for reading the detected temperatures of said lamp; and, selecting means for selecting a trigger timing table corresponding to said detected lamp temperature.

9. A soft-starting system for a lamp in an image forming device according to claim 1, further wherein the system is commonly usable for soft-starting an exposure lamp and a fixing heater-lamp.

10. A soft-starting system for a lamp in an image forming device according to claim 1, further wherein said system includes:

a first trigger timing table commonly usable for an exposure lamp and a fixing heater-lamp when said exposure lamp and said fixing lamp are independently driven; and, a second commonly used trigger timing table wherein said predetermined timer values are larger than those in said first trigger timing table, said second commonly usable trigger timing table being adapted for use when said system simultaneously drives both said exposure lamp and said fixing heater-lamp.

11. A soft-starting system for a lamp in an image forming device according to claim 1, further wherein said system includes:

a plurality of said trigger-timing tables that differ from one another in the total number of predetermined firing angle and conducting angle value pairs associated with predetermined zero cross count value and timer value pairs;

detecting means for detecting a voltage applied to said system;

reading means for reading the voltage detected by said detecting means; and, selecting means for selecting a trigger timing table corresponding to said detected voltage.

12. A soft-starting system for a lamp in an image forming device according to claim 1, further wherein said system includes:

a plurality of trigger-timing tables that differ from one another in the total number of predetermined firing angle and conducting angle value pairs associated with predetermined zero cross count value and timer value pairs;

detecting means for detecting a frequency of a voltage applied to said system;

reading means for reading the voltage frequency detected by said detecting means; and, selecting means for selecting a trigger timing table according to the detected frequency of the voltage.

* * * * *